Aug. 20, 1957 E. C. NELSON 2,803,401

ARITHMETIC UNITS FOR DIGITAL COMPUTERS

Original Filed Oct. 10, 1950 13 Sheets-Sheet 1

INVENTOR.
ELDRED C. NELSON
BY Nicholas T. Volsk
Atty.

INVENTOR.
ELDRED C. NELSON
BY Nicholas T Volsk
atty.

Aug. 20, 1957 E. C. NELSON 2,803,401

ARITHMETIC UNITS FOR DIGITAL COMPUTERS

Original Filed Oct. 10, 1950 13 Sheets-Sheet 3

*INVENTOR.*

ELDRED C. NELSON

*BY* Nicholas T Volsic atty.

INVENTOR.
ELDRED C. NELSON
BY
Nicholas T Volk
atty.

INVENTOR.
ELDRED C. NELSON
BY
Nicholas T Volsk
atty.

ARITHMETIC UNITS FOR DIGITAL COMPUTERS

Original Filed Oct. 10, 1950 13 Sheets-Sheet 6

INVENTOR.
ELDRED C. NELSON
BY
Nicholas T Volsk
atty.

INVENTOR.
ELDRED C. NELSON
BY Nicholas T Volsk
atty.

INVENTOR.
ELDRED C. NELSON
BY Nicholas T Volsk
atty.

INVENTOR.
ELDRED C. NELSON
BY Nicholas T. Volk
atty.

ARITHMETIC UNITS FOR DIGITAL COMPUTERS

Original Filed Oct. 10, 1950 13 Sheets-Sheet 10

INVENTOR.
ELDRED C. NELSON
BY
Nicholas T Volk
atty.

INVENTOR.
ELDRED C. NELSON
BY Nicholas T Volk
atty.

Aug. 20, 1957 E. C. NELSON 2,803,401

ARITHMETIC UNITS FOR DIGITAL COMPUTERS

Original Filed Oct. 10, 1950 13 Sheets-Sheet 12

INVENTOR.
ELDRED C. NELSON
BY Nicholas T. Volk
atty.

INVENTOR.
ELDRED C. NELSON
BY Nicholas T Volk
atty.

United States Patent Office 2,803,401

Patented Aug. 20, 1957

2,803,401

ARITHMETIC UNITS FOR DIGITAL COMPUTERS

Eldred C. Nelson, Los Angeles, Calif., assignor to Hughes Aircraft Company, Culver City, Calif., a corporation of Delaware Continuation of abandoned application Serial No. 189,318, October 10, 1950. This application August 31, 1956, Serial No. 607,494

29 Claims. (Cl. 235—61)

This invention relates generally to electronic computers and particularly to electronic apparatus for adding or subtracting quantities represented by voltage pulses or levels. This application is a continuation of application Serial No. 189,318 entitled, "Arithmetic Units for Digital Computers," filed October 10, 1950 by Eldred C. Nelson, now abandoned.

The circuits of this invention perform computations with signals having distinct values representative of numerical digits, in contrast to that class of computing devices which use continuously varying signals as the variables of computation, i. e., the disclosed computer elements are of the digital rather than the analog type. All computations are performed in the binary system of numbers which employs only two digits, 0 and 1.

As will be described in more detail later, the disclosed adding and subtracting circuits are composed of various combinations of the so-called "and" and "or" gate circuits. The physical properties of these "and" and "or" gates are described and rules for combining these two types of gates to produce any desired output signal response are given in terms of the basic response patterns of these two types of gates. It is shown that there are a number of possible combinations of "and" and "or" gates which will produce the same output signal response. Rules based on the physical properties of "and" and "or" gates are given which permit the derivation of all possible combinations of these gates capable of producing a given output signal. The simplest circuits for producing the output signal responses used in addition and subtraction are disclosed in detail and it is then demonstrated how these circuits may be combined or enlarged to obtain complete addition or subtraction of binary numbers.

The circuits disclosed have a physical structure consisting of resistors and diodes. The diodes may be of either the vacuum tube type or crystal type, but the crystal diodes are preferable because of their smaller size, greater reliability, lower cost, and shorter time delay as compared with the vacuum tube type. By reason of the insignficant time delays introduced by the crystal diodes, quite complex computer networks may be designed for operation at very high speeds.

Simple networks of "and" and "or" gates are disclosed which produce output signals corresponding to the sum of two binary digits. Other networks produce output signals corresponding to the difference of two binary digits. Still other networks produce output signals corresponding to either the sum or difference of two binary digits, depending on the position of a switching device. These relatively simple networks may be combined to form more complex networks which will add or subtract two binary numbers, each number consisting of a series of binary digits. The more complex adder circuits automatically add the carry digit from the addition of one pair of digits (one digit from each binary number) to the sum of the next pair of binary digits. The more complex subtracter circuits automatically include the carry digits of subtraction. Two general types of these more complex adders and subtracters are disclosed. The first type is known as a series circuit. In this type two time-varying signals representing the two binary numbers to be added or subtracted are fed into the adder or subtracter and the digits of the sum or difference appear in time sequence as a time-varying output signal. The second type is known as a parallel circuit. In this second type each binary digit of the two numbers to be added or subtracted is represented by a different input signal and all of these input signals are fed into the parallel device simultaneously. The digits of the sum or difference of the two binary numbers appear simultaneously at the output. The series type of circuit requires fewer circuit components than the parallel type, but the series type is proportionately slower than the parallel type in performing additions or subtractions. In the series type of adder or subtracter, in order to combine the carry digit signal at the proper time, it is necessary to use a memory circuit or delay line to store this carry digit signal for a predetermined length of time before combining it with the signals representing the next pair of digits to be added or subtracted.

It is, therefore, an object of this invention to provide networks composed of novel combinations of "and" and "or" circuits which are capable of adding or subtracting binary numbers in a rapid, accurate, and simple manner.

Another object of this invention is to provide networks composed of "and" and "or" circuits which produce output signal responses which correspond to the result and carry digits of a binary addition or subtraction of two binary digits which are represented by two input signals.

Another object of this invention is to provide networks composed of "and" and "or" circuits which give an output signal response which corresponds to the result digit of a binary addition or subtraction and another output signal response which corresponds to the carry digit of addition when a switching device is in one position and to the carry digit of subtraction when said switching device is in its other position.

Another object of this invention is to provide networks composed of "and" and "or" circuits, plus a delay circuit, which produce a time-varying output signal response corresponding to the digits of the binary sum or difference of two binary numbers which are represented by two time-varying input signals.

Another object of this invention is to provide networks composed of "and" and "or" circuits which produce a series of output signals corresponding to the digits of the binary sum or difference of two binary numbers, the digits of said binary numbers being represented by a series of input signals.

Still another object of this invention is to provide networks composed of diodes and resistors, said network being adapted to produce output signal responses which corresponding to the sum or difference of two binary numbers represented by the input signals to said network, these signals, normally having only two voltage levels, corresponding to the "off" and "on" positions of the input circuits.

The invention and its objects will be better understood from the following description considered in connection with the accompanying drawings, in which several embodiments of the invention are illustrated by way of examples. It is to be expressly understood, however, that the drawings are for the purpose of illustration and description only and are not intended as a definition of the limits of the invention.

Figure 1:
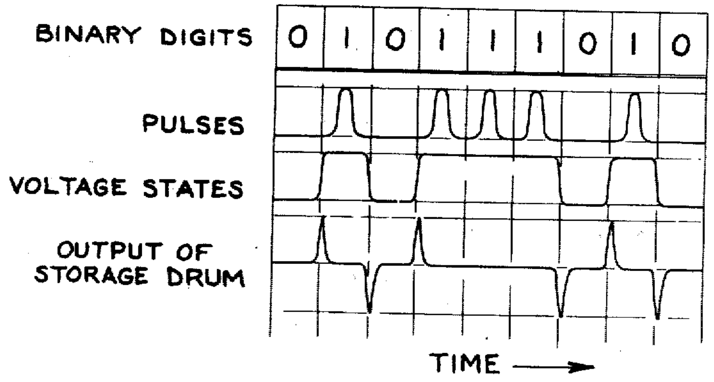
Fig. 1 is a composite diagram of signals which may be used for operating the circuits disclosed in this application.

The circuits which are disclosed in this application can be explained most conveniently by taking up the following topics in the order indicated:

1. The signals used in the disclosed computer circuits;
2. The physical properties of "and" and "or" gates having two input terminals;
3. A method of representing the operation of "and" and "or" gates which have two input terminals symbolically;
4. "And" and "or" gates which have more than two input terminals and the symbolic representation of these circuits;
5. "Half" adding and subtracting circuits, the simplest forms of adding and subtracting circuits that can be made up of "and" and "or" gates;
6. "Series" adding and subtracting circuits;
7. "Parallel" adding and subtracting circuits;
8. Delay circuits used in "series" adding and subtracting circuits.

The remainder of the disclosure will be divided into eight sections having the titles indicated above.

THE SIGNALS USED IN THE DISCLOSED COMPUTER CIRCUITS

The computations of the computer elements of this invention are made in the binary system of numbers which employs only two digits, 0 and 1. A complete discussion of this system of numeration is given in "Elementary Number Theory" by Uspenski and Heaslet, published in 1939 by McGraw-Hill Book Company, Inc., New York and London. The use of this system makes it necessary to distinguish only two values of signal level throughout the computer, for instance $E_1$ and $E_2$. The binary digit 1 may be arbitrarily correlated with the higher of the voltages, $E_1$, and the binary digit 0 may be arbitrarily correlated with the lower of the voltage values, $E_2$ (or vice versa). In the identification of a signal by a computer element utilizing the binary system of numbers, only the nearness of its voltage to $E_1$ or $E_2$ need be distinguished. Considerable variation in the values of $E_1$ or $E_2$ may be permitted without altering the reliability of the discrimination; hence the use of precision components can be avoided and small changes in the circuit components will not seriously affect computer operation. If a decimal system of computation were used, for example, it would be necessary to distinguish 10 separate voltage levels, one level corresponding to each decimal digit. Hence the type of signal used by the computer elements of this invention is one that gives very reliable operation.

In the dynamic operation of the computer, numbers and control signals are represented as time sequences of binary digits. A certain basic time interval is selected and each such time interval in a given period of time is a space for a binary digit—a binary time interval. Thus a signal in the computer will consist of a time varying voltage which varies between $E_1$ and $E_2$. If it rises to the value of $E_1$ during a binary time interval, the binary digit in that time interval is 1; if it remains at $E_2$ during the entire binary time interval, the binary digit in that time interval is 0.

Two types of wave forms of the voltage signal may be used in computers. In one type, the binary digit 1 is represented by a voltage pulse; i. e., the voltage rises from $E_2$ to $E_1$ and falls back to $E_2$ in a time smaller than the binary time interval. In the other type, the binary digit 1 is represented by a voltage state, the voltage rising to the value $E_1$ and remaining there throughout the binary time interval. In both types, the binary digit 0 is represented by the voltage being at the value $E_2$ throughout the binary time interval.

The output-input signal relation for the diode gates is independent of the type of signals used; i. e., the input and output signals will have the same representation in terms of binary digits regardless of whether voltage pulses or voltage states are used.

Figure 2:
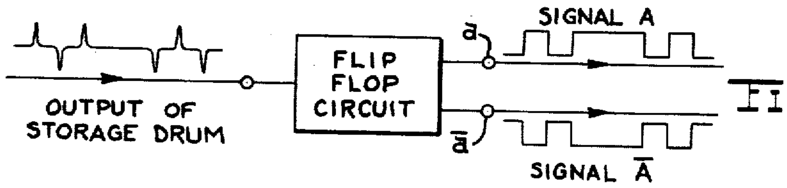
Fig. 2 is a block diagram of a flip-flop circuit to produce signals suitable for the binary adders and subtracters disclosed in this application.

The two types of signals, discussed above, are shown in Fig. 1. Both types of signals may be used in one computer. In magnetic storage drums which serve as memory units in some digital computers, it has been common to use the equivalent of the voltage state signal, a magnetic flux state signal. Data is stored on a magnetic storage drum until ready for use and is then detected by means of a magnetic head. This magnetic head responds only to changes in magnetic flux density. Hence the signal shown in Fig. 1 as a voltage state, if stored on a magnetic drum as a flux state would cause an output signal to appear on a positive pulse at the beginning and a negative pulse at the end of the first magnetic flux state as shown in Fig. 1. The output of the magnetic head, when scanning the next magnetic flux state lasting for three binary time intervals as shown in Fig. 1, gives a positive pulse at the beginning and a negative pulse at the end of the flux state. Thus, these output signal pulses contain the same information as the magnetic flux state signal, however, they are not in proper form for use in a computer circuit. If the computer circuit (adder, subtracter, etc.) is designed to use the pulse type signal, as is generally true in the prior art, it is necessary to use the output of the storage drum to operate a gate circuit which opens or closes whenever a pulse is received from the storage drum. A clock circuit must then be used to supply pulses through the open gate to the computer circuit. The invention described herein offers an improved method of utilizing the output of a storage device such as that described above, or any device with a similar output, by eliminating the necessity of this particular clock circuit. The omission of this clock circuit is made possible by the fact that the circuits of this invention will operate on either the pulse or voltage state signal types. Hence it is possible to use the output of the storage device to key a simple flip-flop circuit which then produces the desired voltage state signals for the computer directly. This arrangement is shown in Fig. 2 in block diagram form. However, it should be pointed out that the use of clock circuits in computer circuits employing the computer elements of this invention may still be desirable to time the recording of the signals on the drum.

The flip-flop circuit of Fig. 2 may be any one of many types of circuits, such as the Eccles-Jordan circuit. Basically, the flip-flop circuit is a device which has two stable states, corresponding to the voltage state signals described above. The flip-flop circuit may be designed to change from one state to another whenever a pulse is received at the input. The flip-flop of Fig. 2 responds to either positive or negative pulses. The particular type of flip-flop circuit employed is deemed immaterial to the disclosure of this invention, hence no separate circuit diagrams of flip-flop circuits have been disclosed.

There will be two outputs from the flip-flop circuit as shown, signal "A" at terminal "*a*" which is a reproduction of the "magnetic flux state" signal on the drum, and signal "$\bar{A}$" at terminal "$\bar{a}$." This signal A has the value 1 when signal A has the value 0; it has the value 0 when signal A has the value 1. The signal $\bar{A}$ is called the signal complementary to signal A. This notation will be followed throughout the disclosure, describing signals by letters, A, B, C, V, etc. and denoting their respective complementary signals $\bar{A}$, $\bar{B}$, $\bar{C}$, $\bar{V}$, etc. The two outputs of the flip-flop circuit may be applied directly to the input terminals of the computing circuits described herein which properly respond to the voltage state signals so generated. Thus an important feature of this invention is the simplification introduced by the fact that the signals used in the computer circuits may be generated directly by a flip-flop circuit, instead of by the use of clock and gating circuits.

THE PHYSICAL PROPERTIES OF "AND" AND "OR" GATES

Figure 3:
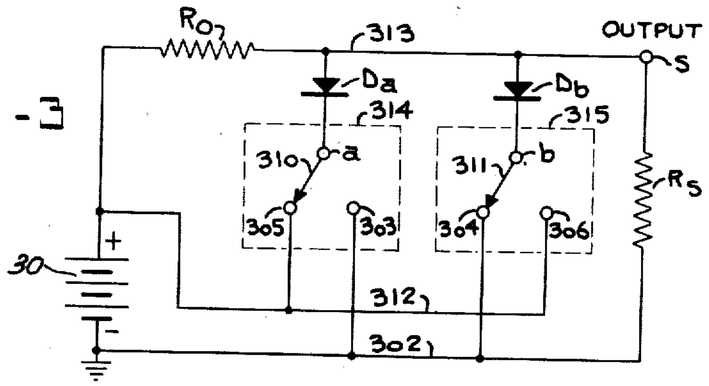
Fig. 3 is a schematic diagram of an "and" circuit.
Figure 4:
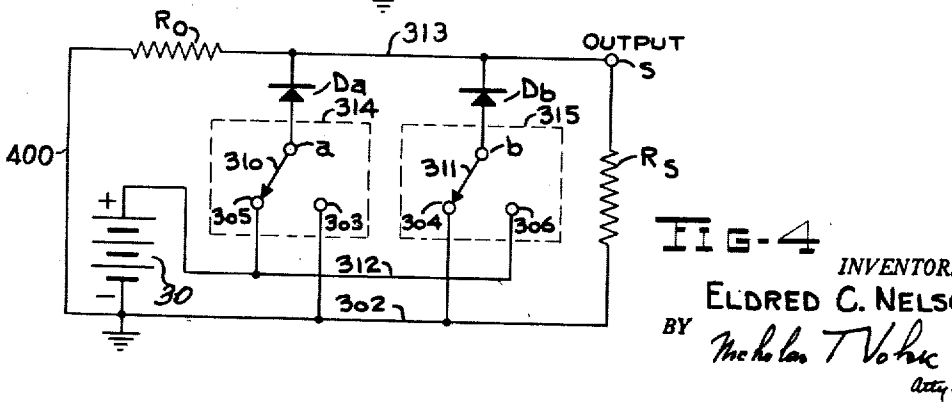
Fig. 4 is a schematic diagram of an "or" circuit.

The basic circuits which form the building blocks of the adding and subtracting circuits of this invention are shown in Figs. 3 and 4. These circuits have found use in the prior art in the following applications: reshaping of deteriorated pulses produced by various elements of electronic computers, selecting or inhibiting a certain one or groups of pulses from a pulse train, combining or isolating the outputs of several sources with different output impedances, and as selector circuits for use in changing binary numbers into decimal numbers at the input or output of a computer. The present invention consists primarily of the combination of these elementary gate circuits to form adders and subtracters.

The circuit shown in Fig. 3 is known as an "and" circuit. Referring to Fig. 3, a battery B is shown having a positive and a negative terminal. The negative terminal is connected directly to a negative bus 302. The positive terminal is connected to a gate resistor, $R_o$, which in turn is connected by a lead 313 to output terminal "*s*." Output resistor $R_s$ is connected at one end to output terminal "*s*" and is connected at its other end to bus 302. The anode terminals of two crystal diodes, $D_a$, $D_b$, are connected to conductor 313. The cathode terminals of the diodes are connected to the input terminals of the "and" circuit, "*a*," "*b*," respectively. Terminals "*a*," "*b*," are the output terminals of switches 314, 315, respectively, which in turn include movable switch arms 310, 311, respectively, and fixed contact points 305, 303, and 304, 306, respectively. Fixed contact points 305, 306 of switches 314, 315, respectively, are tied together and are connected by a conductor 312 to the positive terminal of the battery B while fixed switch points 303, 304 of switches 314, 315, respectively, are connected directly to negative bus 302.

The gate resistor, $R_o$, has a high resistance compared with the forward resistance of diodes $D_a$ and $D_b$. In practice, the diode forward resistances are of the order of several hundred ohms if the diodes are of the germanium crystal type. Resistor $R_s$ is high compared with resistor $R_o$, as are the back resistances of $D_a$ and $D_b$. In practice the resistance of resistor $R_o$ is usually in the range of 15,000 to 100,000 ohms and that of resistor $R_s$ about 1 megohm.

The operation of the circuit is as follows: When both input terminals "*a*," "*b*" are connected to the negative terminal of the battery, current flows from the positive terminal of the battery through resistor $R_o$ and then divides between the diodes and resistor $R_s$ with the major portion of the current flowing through diodes $D_a$ and $D_b$. Most of the voltage drop occurs across resistor $R_o$ since its resistance is much greater than the diode forward resistance, hence the terminal "*s*" is nearly at zero potential as indicated in Table 1.

*Table 1*

| Signal A: Voltage on terminal "*a*" | Signal B: Voltage on terminal "*b*" | Signal S: Voltage on output terminal "*s*" |
|---|---|---|
| 0 | 0 | 0 |
| +100 | 0 | 0 |
| 0 | +100 | 0 |
| +100 | +100 | +100 |

When terminal *a* has 100 volts applied and *b* is connected to the negative terminal of the battery, the current flows through resistor $R_o$ from the positive terminal of the battery and from terminal *a* through the back resistance of diode $D_a$ to the junction *s*, at which point the current divides between resistor $R_s$ and the forward resistance of diode $D_b$ and flows to ground. Now the parallel combination of resistor $R_s$ and the forward resistance of diode $D_b$ is essentially the resistance of diode $D_b$ since the resistance of resistor $R_s$ is much greater than the resistance $D_b$. Also both resistor $R_o$ and the back resistance of diode $D_a$ are much greater than the forward resistance of diode $D_b$, and hence most of the voltage drop will occur across resistor $R_o$ and the back resistance of diode $D_a$. So again terminal *s* is essentially at zero potential. The same result is obtained if the voltages on *a* and *b* are reversed since the circuit is symmetrical.

When *a* and *b* are both at 100 volts, current flows through the parallel combination of resistor $R_o$ and the back resistances of both diodes to *s* and from *s* through resistor $R_s$ to ground. The back resistances of the diodes are much greater than the resistance of resistor $R_o$ so the parallel combination of these three resistances is essentially equal to the resistance of resistor $R_o$. Now the resistance of resistor $R_s$ is much greater than that of resistor $R_o$ and, hence, most of the voltage drop will occur across resistor $R_s$ and the voltage at *s* will be nearly the battery voltage, here assumed to be 100 volts.

The circuit disclosed in Fig. 3 is known in the computer art as an "and" circuit because the output voltage will be high only if terminal *a* and terminal *b* are connected to high voltage. Therefore, the circuit in Fig. 3 may be defined as follows: If, and only if, the voltage at terminal *a* and the voltage at terminal *b* are high, will the output voltage be high. If either or both input voltages are low, then the output voltage will be low.

In Fig. 3 and the subsequent figures of this disclosure the input signals are shown as being supplied from a battery and one or more switches which are connectable to either terminal of the battery. This arrangement is merely shown for the purpose of explanation, and is not to be understood as being a preferred embodiment. In actual practice electronic "switches" in the form of flip-flops or other circuits would be used to supply the input signals. Since the particular type of signal source is immaterial to the discussion of this invention, a form of signal source which is simple to understand has been illustrated throughout this disclosure.

Fig. 4 is a diagram of an "or" circuit. It differs from the circuit of Fig. 3 in that the battery and the diode connections are reversed, so that the current flows through the diodes and resistor $R_o$ in the opposite direction. Referring to Fig. 4, the cathode terminals of diodes $D_a$ and $D_b$ are now connected to lead 313 and the anode terminals are connected to input terminals *a*, *b*. Lead 313 is connected to one end of resistor $R_o$ and the other end of resistor $R_o$ is connected to the negative terminal of the battery through a lead 400. The other connections are as in Fig. 3. The relationships between the values of the resistances are the same as for the "and" circuit.

The operation of the "or" circuit will be as indicated in Table 2.

*Table 2*

| Signal A: Voltage on terminal "a" | Signal B: Voltage on terminal "b" | Signal S: Voltage on output terminal "s" |
|---|---|---|
| 0 | 0 | 0 |
| +100 | 0 | +100 |
| 0 | +100 | +100 |
| +100 | +100 | +100 |

This table may be explained as follows:

If the voltages at *a* and *b* are both zero, it is clear that no current will flow and *s* will also be at a zero potential. If the voltage at *a* is 100 volts and that at *b* is zero, current flows through the forward resistance of diode $D_a$, dividing at the junction with lead 313 and flowing through resistors $R_o$, $R_s$, and the back resistance of diode $D_b$ to ground. Since the parallel combination of these three resistances is much greater than the forward resistance of diode $D_a$, most of the voltage drop will occur across resistors $R_o$ and $R_s$, and diode $D_b$, and the potential at *s* will be nearly the battery voltage of 100 volts. If the voltages on *a* and *b* are reversed, the result is the same, the circuit being symmetrical. If both *a* and *b* are at 100 volts, current flows through the forward resistances of both diodes and divides between resistors $R_o$ and $R_s$ in flowing to ground. Again, most of the voltage drop is across the parallel combination of resistors $R_o$ and $R_s$ and the voltage at *s* is almost the same as that at *a* and *b*.

The "or" circuit may be defined in words as follows:

If either or both input voltages are high, then the output voltages will also be high. If, and only if, both input voltages are low, will the output voltage be low. The same circuit is also defined as follows: If either the voltage at terminal *a* is higher or the voltage at terminal *b* is high, then the output voltage will be high.

If we consider voltages near 0 volts to correspond to the binary digit 0, and voltages near +100 volts to correspond to the binary digit 1 in Tables 1 and 2, we may define the operation of the "and" circuit as in Table 3 and the "or" circuit as in Table 4.

*Table 3*

| A | B | S |
|---|---|---|
| 0 | 0 | 0 |
| 1 | 0 | 0 |
| 0 | 1 | 0 |
| 1 | 1 | 1 |

*Table 4*

| A | B | S |
|---|---|---|
| 0 | 0 | 0 |
| 1 | 0 | 1 |
| 0 | 1 | 1 |
| 1 | 1 | 1 |

A METHOD OF REPRESENTING THE OPERATION OF "AND" AND "OR" GATES SYMBOLICALLY

The circuits of Figs. 10 through 22 all include "and" and "or" gates. In order to simplify the discussion of these more complex circuits, a symbolic notation for the operation of "and" and "or" gates will be introduced. This method of describing the simple gate circuits will make it possible to use very simple algebraic expressions to describe completely the complex adding and subtracting circuits of Figs. 10 through 22, both as to circuit connections and as to the form of output signal which is produced.

The operation of the elementary gates of Figs. 3 and 4 can be described symbolically, since each gate receives the input signals, A and B, and generates an output signal, S, which depends on the signals A and B. The output signal is a signal of the same type as the input signals.

Mathematically, the gates can be considered as performing a binary operation on the input signals which yields an output signal that is determined by the input signals, the correspondence between the input and output signals being given in Tables 1 and 2. The gate shown in Fig. 3 performs one binary operation, which may be denoted {A, B}, and the gate shown in Fig. 4 performs another binary operation, denoted [A, B], on the signals A and B. In other terms, the output signal, S, of an "and" gate may be considered to be a function of the two input signals A and B, this function being defined by Table 3 and the mathematical expression for the function being given by the symbols $S=\{A, B\}$. Similarly the "or" gate output signal is a function of the two input signals which may be stated mathematically as $S=[A, B]$. The use here of the word "function" is just as in ordinary mathematics. The definition is: A function of a signal variable A is a rule that assigns to each value of A (0 or 1), a value "F(A)" (which also is 0 or 1); e. g., the complement, $\overline{A}$, of a signal, A, can be considered as a function of A.

$$F(A)=\overline{A}$$

This function is a rule that assigns to $A=0$ the value 1 and to $A=1$ the value 0.

Owing to the restriction on the values of the signal variable (it must be 0 or 1), the number of possible functions is limited. There are only four possible functions of a single variable; i. e., there are only four possible ways of assigning to each value of A (0 or 1) a value F(A) which is 0 or 1. These functions are shown in Table 5.

*Table 5*

| A | $F_1$ | $F_2$ | $F_3$ | $F_4$ |
|---|---|---|---|---|
| 0 | 0 | 0 | 1 | 1 |
| 1 | 0 | 1 | 0 | 1 |

They may be written in equation form by inspection as:

$$F_1(A)=0$$
$$F_2(A)=A$$
$$F_3(A)=\overline{A}$$
$$F_4(A)=1$$

Two of these functions, $F_1$ and $F_4$, are trivial. Circuitwise, they need not involve any connection to the source of the signal A. $F_1$ can be produced by means of a wire connected to the source of low voltage; $F_4$ can be produced by means of a wire connected to the source of high voltage.

Figs. 10 through 17 show adding and subtracting circuits which produce output signals which are functions of two input signal variables. The explanation of these circuits will be simplified by the discussion that follows.

Functions of two variables are defined in a manner similar to that for a single variable. A function of two signal variables, say A and B, is a rule that assigns to each pair of values of A and B a value "$F(A, B)$." There are sixteen possible functions of two variables; i. e., there are sixteen possible ways of assigning to each pair of values of A and B a value $F(A, B)$ which is 0 or 1. These functions are shown in Table 6.

$F_3$, $F_4$, and $F_5$ also may be produced by "and" gates, the necessary signal inputs being, by inspection $$F_3(A,B)=\{\bar{A},B\}$$

$$F_4(A,B)=\{A,\bar{B}\}$$

$$F_5(A,B)=\{A,B\}$$

An "or" gate produces a 1 output signal if either or both input signals are 1. It produces a 0 signal only if both input signals are 0; hence those output signals that are 0 for only one of the combinations of two binary digits (or 1 for three of the combinations) can be produced from "or" gates. $F_{12}$, $F_{13}$, $F_{14}$, and $F_{15}$ are functions of this type. The connections of the "or" gates

*Table 6*

| A | B | $F_1$ | $F_2$ | $F_3$ | $F_4$ | $F_5$ | $F_6$ | $F_7$ | $F_8$ | $F_9$ | $F_{10}$ | $F_{11}$ | $F_{12}$ | $F_{13}$ | $F_{14}$ | $F_{15}$ | $F_{16}$ |
|---|---|---|---|---|---|---|---|---|---|---|---|---|---|---|---|---|---|
| 0 | 0 | 0 | 1 | 0 | 0 | 0 | 1 | 1 | 1 | 0 | 0 | 0 | 1 | 1 | 1 | 0 | 1 |
| 0 | 1 | 0 | 0 | 1 | 0 | 0 | 1 | 0 | 0 | 1 | 1 | 0 | 1 | 1 | 0 | 1 | 1 |
| 1 | 0 | 0 | 0 | 0 | 1 | ,0 | 0 | 1 | 0 | 1 | 0 | 1 | 1 | 0 | 1 | 1 | 1 |
| 1 | 1 | 0 | 0 | 0 | 0 | 1 | 0 | 0 | 1 | 0 | 1 | 1 | 0 | 1 | 1 | 1 | 1 |

The function $F_5$ may be recognized as that produced by the "and" gate, and the function $F_{15}$ may be recognized as that produced by the "or" gate. In terms of the notation which is used above $$F_6(A, B)=\{A, B\}$$
$$F_{15}(A, B)=[A, B]$$

It is possible to obtain each of the other possible output signal functions by means of combinations of "and" and "or" gates properly connected. It is assumed that the complementary input signals, $\bar{A}$ and $\bar{B}$, are available, as well as the primary signals, A and B. Thus to obtain $F_7$, for example, a wire connected to the source of the signal $\bar{B}$ may be used.

The circuits and connections required to produce the output signal functions above may be derived as follows. By comparison with the A and B signals, $F_1$, $F_6$, $F_7$, $F_{10}$, $F_{11}$, and $F_{16}$ may be seen to be $$F_1(A, B)=0$$
$$F_6(A, B)=\bar{A}$$
$$F_7(A, B)=\bar{B}$$
$$F_{10}(A, B)=B$$
$$F_{11}(A, B)=A$$
$$F_{16}(A, B)=1$$

The circuit necessary to produce these output signals is, in each case, simply a wire connecting the source of the specified signal to the output signal terminal. Thus $F_1$ is produced by a wire to the source of low voltage, $F_6$ by a wire to the source of signal $\bar{A}$, etc.

The other signals require the use of "and" and "or" gates. The "and" gate produces a 1 output signal only if both of the input signals are 1; otherwise it produces a 0 signal; hence those output signals that are 1 only for one of the combinations of two binary digits can be formed from "and" gates. To produce signal $F_2$ which is a signal of this type, an "and" gate may be used to which the signals $\bar{A}$ and $\bar{B}$ are supplied. $\bar{A}$ and $\bar{B}$ are 1 when A and B are 0, hence a 1 output signal will be produced by this circuit when A and B are 0, as required. For no other $A.B$ signal will A and B be 1, hence the output of this "and" gate will be 0 for the other A,B signals. $F_2$ may then be written as $$F_2(A,B)=\{\bar{A},\bar{B}\}$$

to the signal inputs are defined by the expressions:

$$F_{12}(A,B)=[\bar{A},\bar{B}]$$

$$F_{13}(A,B)=[\bar{A},B]$$

$$F_{14}(A,B)=[A,\bar{B}]$$

$$F_{15}(A,B)=[A,B]$$

These expressions are obtained by a consideration of the signal pair required to give a 0 "or" gate output signal when the A, B signal pair requires a 0 output in Table 6. For example, $F_{13}$ requires a 0 signal when $A=1$ and $B=0$. An "or" gate which meets this requirement must have both input signals equal to 0 when $A=1$ and $B=0$, hence signals $\bar{A}$ and B are used.

More complex circuits are required to produce the functions $F_8$ and $F_9$. First consider the circuit for $F_8$. This function has a 1 signal for the same A, B signal that produces a 1 in $F_2$. It also has a 1 signal corresponding to the 1 in $F_5$. If an "or" gate is connected to receive as input signals $F_2$ and $F_5$ it will produce an output signal $F_8$, since a 1 signal at either input of an "or" gate produces a 1 output signal. Thus to produce $F_8$ all that is required is a network composed of two "and" gates to form the signals $F_2$ and $F_5$ and an "or" gate to combine the outputs of the two "and" gates. This network may be expressed in terms of the functions $F_2$ and $F_5$ as follows $$F_8=[F_2,F_5]$$

indicating an "or" gate with inputs $F_2$ and $F_5$. The complete circuit for the network can be expressed in terms of the input signals as follows $$F_8=[\{\bar{A},\bar{B}\},\{A,B\}]$$

indicating two "and" gates having input signals $\bar{A}$,$\bar{B}$ and A,B, respectively, feeding into an "or" gate.

The circuit for $F_9$ may be analyzed similarly. $F_9$ has 1 signals corresponding to the 1 signals of $F_3$ and $F_4$. Hence an "or" gate supplied with $F_3$ and $F_4$ as input signals will produce $F_9$. In equation form $$F_9=[F_3,F_4]$$

and writing out $F_3$ and $F_4$ $$F_9=[\{\bar{A},B\},\{A,\bar{B}\}]$$

which indicates two "and" gates having input signals $\bar{A}$,B and A,$\bar{B}$, respectively, feeding into an "or" gate. Thus all possible functions of two variables may be produced either by direct connection to the sources of input signals or by simple combinations of "and" and "or" gates. The expressions for the output signal functions show the types of circuits required, the connections of the circuits to the sources of input signals, and the interconnections of the circuits.

In general, there are a number of circuits which will generate the same output signal. Each of these circuits corresponds to a different expression for the same output signal function. In order to obtain the class of circuits which will produce a particular output signal, certain properties of "and" and "or" gates must be investigated. To facilitate this investigation a form of algebra known to mathematicians as Boolean algebra will be used. (See Birkhoff and MacLane, "A Survey of Modern Algebra," pp. 331–332, published by The Macmillan Co. of New York in 1949.) The rules of this system of algebra correspond exactly to the operations performed by the "and" and "or" gates. Only two operations are defined in this algebra. It is customary, in algebra, when a system has two operations to call them addition and multiplication. From Table 1 it can be seen that the operation of the "and" gate has the properties of ordinary multiplication. It will be called "logical" multiplication and denoted symbolically by a dot; i. e., the operation that has been denoted in previous paragraphs by {A,B} will be denoted by $A.B$ in the remainder of this disclosure.

The rules for "logical" multiplication of signals are given in Table 7.

*Table 7*

0.0=0

0.1=0

1.0=0

1.1=1

The operation of the "or" gate, as shown in Table 2, has some of the properties of ordinary addition. It will be called "logical" addition and will be denoted symbolically by a + sign; i. e., the binary operation denoted in the preceding paragraphs by [A,B] will be denoted in the remainder of this disclosure by $A+B$. The rules for "logical" addition of signals are given in Table 8.

*Table 8*

0+0=0

0+1=1

1+0=1

1+1=1

The last rule, 1+1=1, differs from the ordinary rule for addition.

In ordinary algebra, the operations inverse to addition and multiplication, viz., subtraction and division, are defined. In this algebra, the inverse operations do not exist, hence the cancellation laws for addition and multiplication do not hold; i. e., from $A+B=A+C$, it cannot be inferred that $B=C$ and from $A.B=A.C$, it cannot be inferred that $B=C$.

The rules for "logical" multiplication and addition of computer signals may be used to derive the identities given in Equations 1 through 7 below.

(1) $A+\bar{A}=1$ (2) $A.\bar{A}=0$ (3) $A+A=A$ (4) $A.A=A$ (5) $A.(B+C)=A.B+A.C$ (6) $A.(B.C)=A.B.C$ (7) $A+(B+C)=A+B+C$ Equation 5 is known as the distributive law of Boolean algebra and Equations 6 and 7 are known as the associative laws.

Since these identities are derived from the rules of operation of the "and" and "or" gates, it is assured that they validly define equivalent circuits, i. e., circuits which produce the same output signal. For example, Equation 1 means that the output signal which is 1 at all times may be obtained either by a wire from the source of high voltage or from the output of an "or" gate having input signals A and $\bar{A}$ applied. These identities state seven important properties of "and" and "or" gates. The mathematical steps involved in their derivation are quite simple. For example, Equation 1 can be checked as follows. When A is 1, $\bar{A}$ is 0 and their "logical" sum is 1. When A is 0, $\bar{A}$ is 1 and the sum is 1.

The physical meaning of identities (2) through (7) is as follows: Equation 2 means that if the signals A and $\bar{A}$ are applied to the input terminals of an "and" gate, the output signal will be 0. This equation and the subsequent equations may be checked by a process of reasoning similar to that above.

From Equations 1 and 2, it is clear that there are two ways of generating the signal functions $F_1$ and $F_{16}$ in Table 6. Instead of using a wire from the source of low voltage to produce $F_1$, an "and" gate to which the signals A and $\bar{A}$ are applied could be used. Similarly an "or" gate having signals A and $\bar{A}$ applied could be used in place of a wire to the source of high voltage to produce $F_{16}$.

Equations 3 and 4 mean that if the signal A is applied to both input terminals of an "or" gate and the output signal will be A, and likewise if the circuit is an "and" gate. Equation 5 means that the output signal of an "and" gate receiving as input signals A and $(B+C)$ is the same as the output signal of an "or" gate receiving as input signals $A.B$ and $A.C$.

Equation 6 means that the output signal of an "and" gate receiving two input signals, A and $B.C$, is the same as the output signal of an "and" gate having three input terminals and receiving three input signals, A, B, and C. "And" and "or" gates with more than two input terminals will be discussed more fully in connection with Figs. 8 and 9.

Equation 7 means that the output signal of an "or" gate receiving two input signals, A and $B+C$, is the same as the output signal of an "or" gate having three input terminals and receiving three input signals, A, B, and C.

These identities thus represent equivalencies between certain "and" and "or" gate circuit configurations on the basis of the output signal which is produced. These equivalencies were determined solely by use of the rules of "logical" addition and multiplication which describe the operation of "and" and "or" gates. The notation of Boolean algebra is used because it will be convenient in describing the more complex circuits.

The functions of Table 6 can now be written in terms of Boolean algebra notation, using a dot to indicate an "and" circuit and a plus sign to indicate an "or" circuit, as follows $$F_1(A, B)=0$$
$$F_2(A, B)=\bar{A}.\bar{B}$$
$$F_3(A, B)=\bar{A}.B$$
$$F_4(A, B)=A.\bar{B}$$
$$F_5(A, B)=A.B$$
$$F_6(A, B)=\bar{A}$$
$$F_7(A, B)=\bar{B}$$
$$F_8(A, B)=F_2+F_5=\bar{A}.\bar{B}+A.B$$
$$F_9(A, B)=F_3+F_4+\bar{A}.B+A.\bar{B}$$

$F_{10}(A, B)=B$
$F_{11}(A, B)=A$
$F_{12}(A, B)=\bar{A}+\bar{B}$
$F_{13}(A, B)=\bar{A}+B$
$F_{14}(A, B)=A+\bar{B}$
$F_{15}(A, B)=A+B$
$F_{16}(A, B)=1$ The derivation of equivalent circuits to supply these signals will now be described in detail.

It has been noted that these functions of Table 6 can be written in several different ways; e. g., $F_6$, which has two ones and two zeros can be written as the sum $F_2$ and $F_3$, each of which has one one and three zeros.

(8) $$F_6=F_2+F_3=\bar{A}.\bar{B}+\bar{A}.B$$

Here the distributive property of Boolean algebra given in Equation 5, can be used.

(9) $$F_6=\bar{A}.(\bar{B}+B)$$

Then Equation 1 may be used to simplify $F_6$.

(10) $$F_6=\bar{A}.(1)=\bar{A}$$

Thus, the same function, the same assignment of a functional value to the values of the arguments (in this case A and B), may have different algebraic forms, but these various algebraic forms can be transformed into each other by means of algebraic operations. Although these various algebraic forms represent the same function, i. e., the same set of signals, they correspond to different circuits. The form (10) for $F_6$ in circuit form is just a wire connecting the source of signal $\bar{A}$ to the output signal terminal. To draw the circuits which correspond to Equation 7 and 8, the following rules may be followed: a plus sign between successive quantities of a series of signal quantities indicates an "or" circuit having its input terminals connected to the different points in the computer network at which the signal quantities appear; a dot between successive quantities of a series of signal quantities indicates an "and" circuit having its input terminals connected to the different points in the computer network at which the signal quantities appear. Given an equation for the output signal of a circuit, it is possible to construct the circuit in every detail by use of the above rules.

Figure 6:
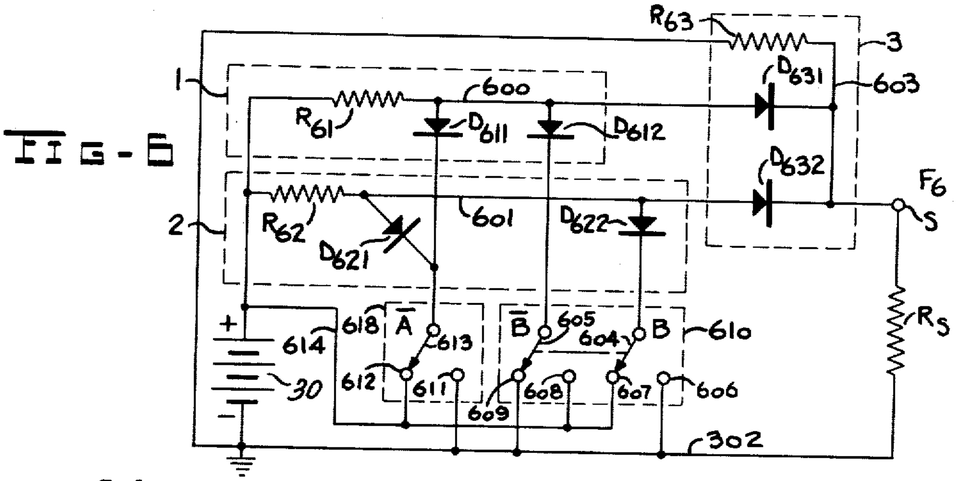
Figs. 5, 6, 7 are schematic diagrams of circuits which produce identical output signals, but which use different circuit elements and have different connections to the sources of input signals.
Figure 5:
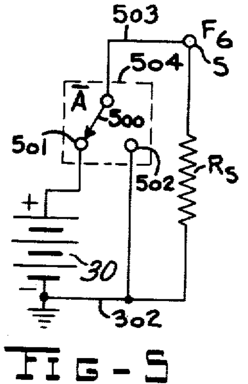
Figure 7:
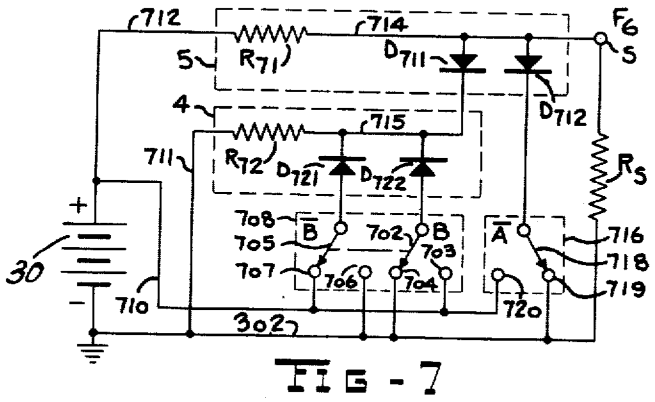

The form (8), then has two "and" gates and one "or" gate; and the form (9) has one "or" gate and one "and" gate. The circuits corresponding to Equations 8, 9, and 10, respectively, are shown in Figs. 6, 7, and 5, respectively. Referring to Fig. 5, a battery B is disclosed having positive and negative terminals. The negative terminal is connected to negative bus 302 and the positive terminal is connected to fixed contact point 501 of switch 504. Negative bus 302 is connected to fixed contact point 502 of switch 504 and to one end of resistor $R_s$. The other end of resistor $R_s$ is connected to output terminal "s" which in turn is connected by a wire 503 to movable switch arm 500 of switch 504. This wire 503 constitutes the circuit required by Equation 10. The signal $\bar{A}$ appears on movable switch arm 500, and the output signal $F_6=\bar{A}$ appears at terminal "s."

Fig. 6 shows a battery B whose negative terminal is tied to negative bus 302 and whose positive terminal is connected to "and" circuit 1 composed of a resistor $R_{61}$, diodes $D_{611}$, $D_{612}$, and a lead 600, and to "and" circuit 2 which is parallel to "and" circuit 1 and is composed of a resistor $R_{62}$, diodes $D_{621}$, $D_{622}$, and a lead 601. The leads 600, 601 of the "and" circuits 1 and 2 are connected to the anode terminals of diodes $D_{631}$, $D_{632}$, respectively, whose cathode terminals are connected together by a conductor 603 to form "or" circuit 3. The output of "or" circuit 3 appears on conductor 603 and the output terminal "s" which has a conductive path to ground bus 302 through the parallel resistors $R_{63}$, $R_s$. The cathodes of diodes $D_{611}$, $D_{621}$ are connected to movable switch arm 613 of switch 618. The movable switch arm 613 of switch 618 contacts either fixed contact point 612 which is connected to the positive terminal of the battery or fixed contact point 611 which is connected to negative bus 302. A double-pole double-throw switch 610 has one movable switch arm 605 connected to the cathode terminal of diode $D_{612}$, and another movable switch arm 604 connected to the cathode terminal of diode $D_{622}$. Arm 605 of switch 610 is adapted to contact either fixed contact point 609 which is connected directly to negative bus 302, or fixed contact point 608 which is connected to the positive terminal of the battery. Likewise, arm 604 of switch 610 is adapted to contact either fixed contact point 607 which is connected to fixed contact point 608 or fixed contact point 606 which is connected directly to negative bus 302.

The operation of this circuit is as follows: "And" circuit 1 forms the "logical" signal product $\bar{A}.\bar{B}$; "and" circuit 2 forms the "logical" product $\bar{A}.B$; and "or" circuit 3 receives as inputs the output signals of "and" circuits 1 and 2 and forms the "logical" signal sum $\bar{A}.\bar{B}+\bar{A}.B$, which is $F_6$. The $F_6$ signal appears as the output of "or" circuit 3 at terminal "s."

Fig. 7 shows a battery B having a positive terminal and a negative terminal, the negative terminal of which is tied to negative bus 302. The positive terminal of battery B is connected to "and" circuit 5 comprising a resistor $R_{71}$, diodes $D_{711}$, $D_{712}$, and a lead 714, with lead 714 being connected to output terminal "s." "s" is connected to resistor $R_s$ which is, in turn, connected to ground bus 302. "Or" circuit 4, including a resistor $R_{72}$, diodes $D_{721}$, $D_{722}$, and a lead 715, is connected at its resistor $R_{72}$ end by a conductor 711 to negative bus 302, and is connected through lead 715 to the cathode terminal of diode $D_{711}$. The anode terminals of diodes $D_{721}$, $D_{722}$ of "or" circuit 4 are tied to the two movable switch arms 705, 702, respectively, of a double-pole double-throw switch 708. Movable switch arm 705 is adapted to contact either fixed contact point 707 which is connected to a conductor 710 which is in turn connected to the positive terminal of the battery, or fixed contact point 706 which is connected directly to negative bus 302. Movable arm 702 is adapted to contact either fixed contact point 704 which is connected directly to negative bus 302, or fixed contact point 703 which is connected to conductor 710. The cathode terminal of diode $D_{712}$ is tied directly to movable switch arm 718 of a switch 716 and is thereby adapted to be connected to either fixed contact point 720 which is connected to conductor 710, or fixed contact point 719 which is connected directly to negative bus 302.

The operation of this circuit is as follows: "Or" circuit 4 forms the "logical" sum $B+\bar{B}$. "And" circuit 5 forms the "logical" product of $\bar{A}$ and the output of "or" circuit 4 to give $\bar{A}.(B+\bar{B})$, which is $F_6$, at output terminal "s."

The same signal, $F_6$, can thus be generated by different circuits, the complexity of which varies considerably. By representing the output signal in algebraic form, the number and type of gates required to produce the specified signal is shown in convenient form. The derivation of other circuits which will produce the same output signal is made a matter of simple algebraic manipulation, once the equivalence between the configurations of "and" and "or" gates defined by Equations 1 through 7 is known.

Each of the various algebraic forms of a given function corresponds to a different circuit, but all of these circuits produce the same output signal response to a given set of input signals. It is convenient to express the entire class of circuits which will produce a given output signal in equation form. The function $F_8$ of Table 6 in Boolean algebra notation is $$F_8=\bar{A}.\bar{B}+A.B$$

Both sides of this equation can be multiplied by unity without changing the output-input signal relationship; i. e., it still represents the response listed in Table 8 under $F_8$ to the input signals A and B. Similarly, we can add zero to both sides without changing the signal relationship. Now let G. (A, $\bar{A}$, B, $\bar{B}$) be a function of the input signals which is equal to unity for all values of A, $\bar{A}$, B, and $\bar{B}$. Such a function can be constructed from the identities (1), (2), (3), (4). For example, $$G=A+\bar{A}+(A.\bar{A})+(B.\bar{B})+(B.B).(\bar{B}+\bar{B})=1$$

for all values of A, $\bar{A}$, B, $\bar{B}$. If H (A, $\bar{A}$, B, $\bar{B}$) is a similar function identically equal to unity and J (A, $\bar{A}$, B, $\bar{B}$) is a function identically equal to zero, we may write $F_8$ as $$F_8=\bar{A}.\bar{B}.G+A.B.H+J$$

where G, H, and J are chosen from the class of functions:

$$G=1$$
$$H=1$$
$$J=0$$

for all values of A, $\bar{A}$, B, $\bar{B}$. In this form, $F_8$ expresses the same output signal regardless of the choice of expressions for G, H, and J. In other words, $F_8$, in this form, is the equation representing the entire class of circuits which will produce a given output signal. However, each different form of G, H, J denotes a different overall form of $F_8$ and hense a different circuit. After G, H, and J have been chosen, it is still possible to manipulate the expression for $F_8$ according to the distributive and associative laws of Boolean algebra (6) and (7), as was seen in connection with $F_6$ in Figs. 6, 7, 8 in the preceding paragraphs. Further examples will be given in the course of this disclosure. It will be seen that there are situations in which the particular output signal function will have several forms, each expressing a circuit with the same number of diodes. After manipulation of the expression for $F_8$, it then becomes a simple matter to mechanize the final expression electrically, in accordance with the rules relating to "and" and "or" circuits, defined above. Thus, in the simple cases considered thus far, where only two input signal variables are utilized, the number of dots in the final expression determines the number of "and" circuits, while each plus sign signifies an "or" circuit. The connections between the input signal sources and each "and" and "or" circuit are determined by the signal quantities in the final expression which appear on opposite sides of each dot and plus. Finally, the connections between the "and" and "or" circuits are defined by the complex signal quantities, that is each group of two signal quantities, appearing on opposite sides of the plus or dot.

As an example of this mechanization, consider again Equation 8 and its corresponding circuit, as shown in Fig. 6. In Equation 8, there are two dot signs and one plus sign. Accordingly, the mechanized network should include two "and" circuits and one "or" circuit, as shown in Fig. 6. The signal quantities on opposite sides of the first dot sign are $\bar{A}$ and $\bar{B}$. Therefore, one "and" circuit, namely, circuit 1 of Fig. 6, has two input terminals connected to the sources of $\bar{A}$ and $\bar{B}$, respectively. Similarly, the other "and" circuit, namely, circuit 2 of Fig. 6, has two input terminals connected to the sources of $\bar{A}$ and B, respectively. On the other hand, the plus sign in Equation 8 appears between successive complex signal quantities. Therefore, the "or" circuit corresponding to this plus sign is not connected directly to the input signal sources, but is connected to the two sources of the complex signal quantities. Thus, "or" circuit 3 of Fig. 6 has one input terminal connected to the output terminal of circuit 1 and the other input terminal connected to the output terminal of circuit 2. The output signal of circuit 3 constitutes the output signal of the mechanized network.

The principle of mechanizing an equation in the form of an electrical network including an "or" circuit, or an "and" circuit, or combinations of "and" and "or" circuits, forms the basic concept of this invention. As set forth below, this basic concept is extended to apply to electronic computer components for adding or subtracting two binary digits. Furthermore, the same concept is applicable to the addition or subtraction of three or more binary digits. Finally, as set forth below, the concept is applied to binary numbers in general to form full adders or full subtracters, the basic components of all electronic digital computers.

In many circuits, such as the circuits of Figs. 6 and 7, both a signal and its complement are needed to generate the desired output signal, as seen above. The complement signal may be obtained from tube circuits; e. g., it can be obtained from the primary signal by using an inverter. Sometimes signals in the computer are generated by flip-flops. Most types of flip-flops have two outputs which generate complementary signals.

The complement of an alegebraic expression is not obtained by taking the complement of the signals making up the expression. Thus, the complement of $A.B.$ is not $\bar{A}.\bar{B}$. From Table 6, it can be seen that the complement of $A.B.=F_5$ is $F_{12}+\bar{A}+\bar{B}$. Furthermore, the complement of $F_1=\bar{A}.\bar{B}.$ is $F_{16}=A+B$. The rule suggested by these examples is the correct rule; viz., to form the complement of an algebraic expression of computer signals, replace each signal by its complement, replace all products by sums, and replace all sums by products. Thus the complement of $$\bar{A}.\bar{B}.+A.B=F_8 \text{ is } (A+B).(\bar{A}+\bar{B})=A.\bar{A}+A.\bar{B}+B.\bar{A}+B.\bar{B}=A.\bar{B}+B.\bar{A}=F_9$$

Here (2) has been used to reduce the expression.

In connection with Tables 3 and 4, the binary digit 1 was correlated with the higher voltage, $E_1$, and the binary digit 0 with the lower voltage, $E_2$. If the complementary correlation has been made, i. e., the binary digit 1 correlated with $E_2$ and the binary digit 0 with $E_1$, the resulting computer circuits would be complementary. An "and" gate would give one 0 and three 1 signals and an "or" gate would give one 1 and three 0 signals. In this case the "or" gate's operation could be called multiplication and the "and" gate's, addition. The various functions of Table 6 could thus be produced by using "and" gates in place of "or" gates and "or" gates in place of "and" gates. The choice as to whether a 1 or a 0 signal is to be correlated with the high voltage is completely arbitrary; one choice leading to the use of "and" and "or" gates in the relationships which are explicitly indicated in this disclosure, the other choice leading to "and" and "or" gates in an exactly reciprocal relationship. Thus henceforth, when a circuit is expressed algebraically, it is to be understood that the symbols used thus far to indicate an "and" gate imply the correlation of the binary digit 1 with the higher signal voltage, and that the same symbols may be interpreted to mean an "or" gate with the binary digit 1 correlated with the lower signal voltage. The same statement holds true, of course, with reference to the symbols used thus far to indicate an "or" gate, i. e., these symbols can also mean an "and" gate with the binary digit 1 correlated with the lower signal voltage.

"AND" AND "OR" GATES WHICH HAVE MORE THAN TWO INPUT TERMINALS AND THE SYMBOLIC REPRESENTATION OF THESE CIRCUITS

The circuits of Figs. 18 through 22 produce output signals which are functions of three independent input signal variables. The explanation of these circuits will be simplified by a discussion of "and" and "or" gates which give an output signal response to more than two input signal variables.

Functions of more than two variables can also be defined just as for the cases of one or two variables. These functions can be written in algebraic form as sums and products of the signal variables; i. e., they are polynomials in the signal variables. The construction of polynomial forms of functions can be made easy with the aid of a certain class of polynomials called minimal polynomials. The minimal polynomials of *n* variables are the products of these *n* variables and their complements. For one variable, there are only two minimal polynomials.

$$A, \overline{A}$$

for two variables, there are four minimal polynomials $$A.B,\ A.B,\ A.B,\ A.B$$

and for three variables, there are eight minimal polynomials $$A.B.C,\ \overline{A}.B.C,\ A.\overline{B}.C,\ A.B.\overline{C},\ \overline{A}.\overline{B}.C,\ \overline{A}.B.\overline{C},\ A.\overline{B}.\overline{C},\ \overline{A}.\overline{B}.\overline{C}$$

In general, there are $2^n$ minimal polynomials of *n* variables, for there are 2 choices of variables (the primary variable and its complement) for each of the *n* positions in the product. These minimal polynomials are important because, as the *n* variables range over their permitted values, the minimal polynomial has the value of 1 only when all of the variables in the product have the value 1.

Any function, with the exception of the function that is identically zero, can be expressed as the sum of minimal polynomials. To represent a function as the sum of minimal polynomials, determine those values of the variables for which the function has the value 1. The function can be expressed as the sum of those minimal polynomials that are 1 for those values of the variables. This method of construction can be used to count the number of possible functions of *n* variables. Since each of these $2^n$ minimal polynomials is either present or absent in the sum representing a function, there are $2^{2n}$ possible functions of *n* variables. The function which is identically zero is included in this count.

In circuit form, a product of three variables corresponds to an "and" circuit with three input terminals. A product of *n* variables corresponds to an "and" circuit with *n* input terminals.

Figure 8:
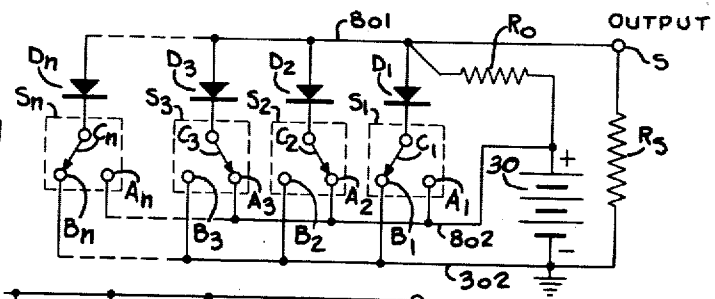
Fig. 8 is a schematic diagram of an N-terminal "and" circuit.

An *n*-terminal "and" circuit is shown in Fig. 8. It includes a battery B whose negative terminal is tied to negative bus 302. The positive terminal of the battery is tied to a bus 801 through resistor $R_o$. The anodes of diodes $D_1$, $D_2$, $D_3$ . . . $D_n$ are connected to bus 801. The cathodes of these diodes are connected respectively to movable switch arms $C_1$, $C_2$, $C_3$ . . . $C_n$ of the switches $S_1$, $S_2$, $S_3$ . . . $S_n$, respectively. These individually movable switch arms are adapted to contact either fixed contact points $A_1$, $A_2$, $A_3$ . . . $A_n$ or $B_1$, $B_2$, $B_3$ . . . $B_n$. The "A" series of fixed contact points is connected to a bus 802 which in turn is connected to the positive terminal of battery B. The "B" series of fixed contact points is connected directly to negative bus 302. The bus 801 is connected to output terminal "*s*," which in turn is connected to one end of a resistor $R_s$, the other end of resistor $R_s$ being connected to negative bus 302.

In the *n*-terminal "and" circuit of Fig. 8, if $n=2$, we have the circuit of Fig. 3. If $n=3$, for example, the output voltage will be high only if arms $C_1$, $C_2$, and $C_3$ are connected to high voltage. If any or all input signals are low, the output voltage will be low. The physical operation is just as in the 2 terminal case. The operation of this circuit can be described as in Table 9 where A, B, and C are the input signals and S is the output.

*Table 9*

| A | B | C | S |
|---|---|---|---|
| 0 | 0 | 0 | 0 |
| 0 | 0 | 1 | 0 |
| 0 | 1 | 0 | 0 |
| 0 | 1 | 1 | 0 |
| 1 | 0 | 0 | 0 |
| 1 | 0 | 1 | 0 |
| 1 | 1 | 0 | 0 |
| 1 | 1 | 1 | 1 |

We shall employ the expression $A.B.C=S$ to denote the operation of this circuit. The operation of a four terminal "and" circuit is denoted $A.B.C.D=S$, etc.

Figure 9:
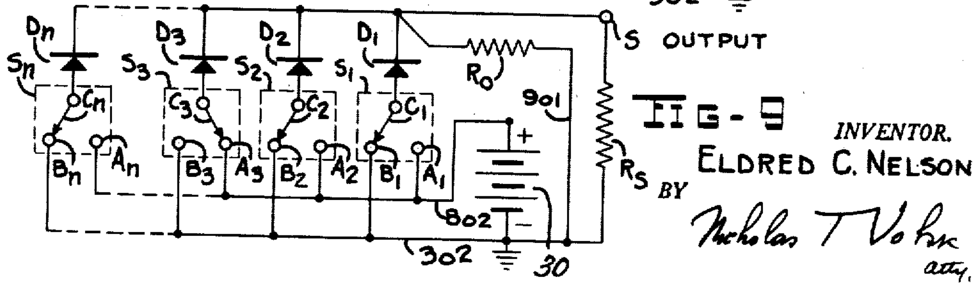
Fig. 9 is a schematic diagram of an N-terminal "or" circuit.

An "or" circuit may be expanded similarly as shown in Fig. 9. Here, resistor $R_o$ is connected to negative bus 302 through a lead 901, rather than to the positive terminal of the battery B. The connections of diodes $D_1$, $D_2$, $D_3$ . . . $D_n$ are reversed, so that current flows in the opposite direction through the diodes and resistor $R_o$, as compared with the circuit of Fig. 8. Taking the three terminal "or" circuit as an example, the output at "s" will be high if the input signal on any of arms $C_1$, $C_2$, or $C_3$ is high. If, and only if, all input signals are low, will the output be low. The operation of this circuit is as shown in Table 10, where A, B, and C are the input signals and S is the output.

*Table 10*

| A | B | C | S |
|---|---|---|---|
| 0 | 0 | 0 | 0 |
| 0 | 0 | 1 | 1 |
| 0 | 1 | 0 | 1 |
| 0 | 1 | 1 | 1 |
| 1 | 0 | 0 | 1 |
| 1 | 0 | 1 | 1 |
| 1 | 1 | 0 | 1 |
| 1 | 1 | 1 | 1 |

We can denote the operation of this circuit as $S=A+B+C$, while a four terminal "or" circuit would be denoted $S=A+B+C+D$, etc.

The process of designing a gating circuit by the use of minimal polynomials can now be formulated as follows: First determine the number of input variables (a variable and its complement are not counted separately) from the input signals to be used. Then determine the values of the output signal desired for each set of values of the input signals. Select those input signal combinations that give a 1 output signal. The output signal can be represented as the sum of the minimal polynomials corresponding to those input signal combinations. This sum is the function and a circuit can be constructed from the gates indicated by the products and sums. The necessary rules are as given in connection with Figs. 5, 6, and 7 in the discussion of $F_6$. The number of "and" and "or" gate circuits, the number of input terminals of each circuit, the connections of the gate circuits to the sources of signals, and the connections between gate circuits are thus determinable directly from the expression for the output signal of the circuit in algebraic form by means of a straight forward application of these rules. Other equivalent circuits can be found by performing algebraic operations on the expression obtained from the minimal polynomials. All these expressions can be studied and the one having certain desired properties, such as minimum number of gates or certain impedance properties, can be selected.

This process may be used to derive circuits which produce a given response to two, three, or more input signal variables. When only two input signals, A and B, are used a simpler process may be used. Simply compare the desired output signal with the signal functions of Table 6. Use the circuit which is determined by the equation given in connection with Table 6 for the function corresponding to the desired output signal, or its equivalent.

"HALF" ADDING AND SUBTRACTING CIRCUITS—THE SIMPLEST FORMS OF ADDING AND SUBTRACTING CIRCUITS THAT CAN BE MADE UP OF "AND" AND "OR" GATES

The basic element of the arithmetic section of a digital computer is a binary adder. Binary adders can be constructed from diode networks, since binary addition can be written in terms of "logical" sums and products.

In binary addition, two binary digits are added together, in the usual arithmetic sense, to give one binary digit representing the sum, or result, and other binary digit representing the carry digit to be added to the sum of the next set of binary digits which are added.

In a decimal system, for example, 6+7 equals a result digit equal to 3 plus a carry digit equal to 1. Let A and B be the binary digits to be added and let R and C be the result digit and carry digits, respectively. The rules for binary addition are given in table 11.

*Table 11*

| A | B | C | R |
|---|---|---|---|
| 0 | 0 | 0 | 0 |
| 1 | 0 | 0 | 1 |
| 0 | 1 | 0 | 1 |
| 1 | 1 | 1 | 0 |

Now let A and B represent the signals applied to the input of an electronic adder and R and C be the output signals. We may then define an electronic binary adder as a device which, when the signals listed in Table 11 are applied to the input, gives the response indicated under columns R and C in Table 11 at the output terminals.

Figure 10:
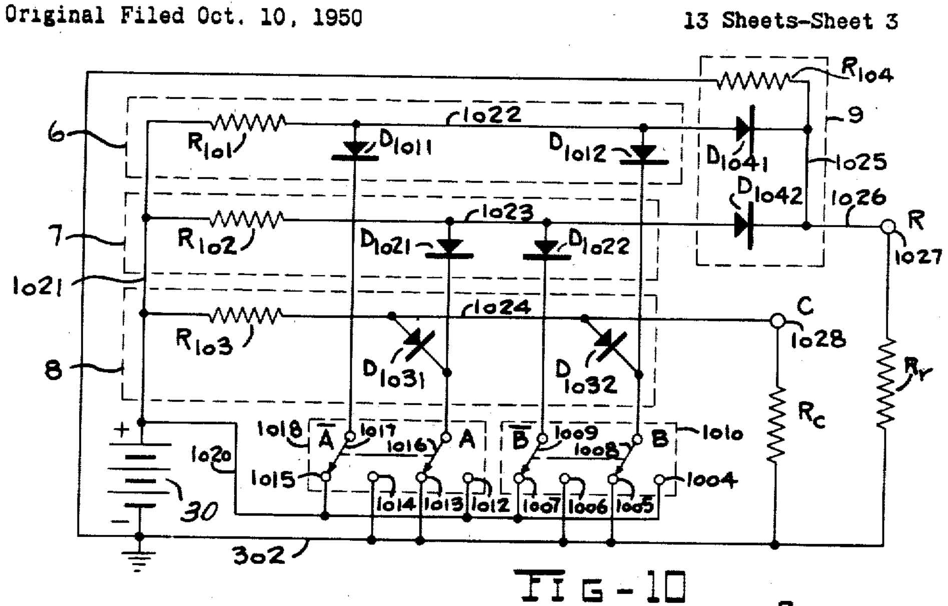
Figs. 10 and 11 are schematic diagrams of different half-adder circuits.

The "half-adder" circuit of Fig. 10 gives this response when input signals A and B are applied at the appropriate input terminals.

The signals R and C can be expressed as algebraic functions of A and B and their complements. This is done by comparing Tables 11 and 6. The R function of Table 11 is listed in Table 6 as $F_9$. C is listed as $F_5$. Then, from the equations derived in connection with Table 6

$$R=\overline{A}.B+A.\overline{B}$$
$$C=A.B$$

Now, using the rules for the construction of circuits from the output signal functions, we obtain the circuit for this binary adder shown in Fig. 10.

This circuit includes a battery B whose negative terminal is connected to negative bus 302. The positive terminal of the battery is connected to "and" circuits 6, 7 and 8 consisting of resistor $R_{101}$, diodes $D_{1011}$, $D_{1012}$, lead 1022; resistor $R_{102}$, diodes $D_{1021}$, $D_{1022}$, lead 1023; and resistor $R_{103}$, diodes $D_{1031}$, $D_{1032}$, and lead 1024, respectively. Leads 1022 and 1023 of "and" circuits 6, 7 are connected to the anodes of diodes $D_{1041}$, $D_{1042}$, respectively, the cathodes of these diodes being connected together by a conductor 1025 to form a portion of "or" circuit 9. Conductor 1026 connects output lead 1025 of "or" circuit 9 to one end of a resistor $R_r$ at terminal 1027 at which point the signal representing the result digit of the answer appears. The other end of resistor $R_r$ is connected to negative bus 302. The "or" circuit 9 is completed in structure by a resistor $R_{104}$ connected from conductor 1025 to negative bus 302.

Resistor $R_c$ is connected between negative bus 302 and lead 1024 of "and" circuit 8 and produces at the point of junction, 1028, a signal representing the carry digit of the answer. The input switching system for the half-adder comprises 2 double-pole double-throw switches 1018, 1010, respectively. Switch 1018 contains two movable switch arms, 1017 and 1016 while switch 1010 also contains two movable switch arms, 1008 and 1009. Movable switch arm 1017 of switch 1018 is adapted to move between fixed contact points 1015 and 1014 and movable switch arm 1016 is adapted to move between fixed contact points 1013 and 1012. In switch 1010, the movable switch arm 1009 is adapted to move between fixed contact points 1007 and 1006 and movable switch arm 1008 is adapted to move between fixed contact points 1005 and 1004. Fixed contact points 1015, 1012, 1007, 1004 are all connected to a bus 1020 which in turn is connected to the positive terminal of battery B. Fixed contact points 1014, 1013, 1006, 1005 are connected directly to negative bus 302. It should be noted that the two movable contact arms of both switch 1018 and 1010 are adapted to move together in the conventional manner of a double-pole double-throw switch. For example, when movable switch arm 1017 contacts fixed contact point 1015, the movable switch arm 1016 contacts point 1013. The same holds true for switch 1010. The movable switch arm 1017 is connected to the cathode of diode $D_{1011}$, and movable switch arm 1016 is connected to the cathodes of diodes $D_{1012}$ and $D_{1031}$. Movable switch arm 1009 is connected directly to the cathode of diode $D_{1022}$, and movable switch arm 1008 is connected to the cathodes of diodes $D_{1021}$ and $D_{1032}$. Resistor $R_{104}$ of "or" circuit 9 may be omitted if it is desired that the "and" circuits connected to "or" circuit 9 feed into a high resistance. In some circuits, to be discussed, the "or" circuit resistors have been omitted on this basis.

Typical values of the circuit elements are as follows:

$$R_{101}=R_{102}=R_{103}=15{,}000 \text{ ohms}$$
$$R_{104}=1 \text{ megohm}$$
$$R_c=R_r=200{,}000 \text{ ohms}$$

A circuit constructed with these values of resistances will perform as predicted and give correct answers. However, quite considerable variations in these values are permissible for satisfactory operation, so long as the impedance relations discussed in connection with Fig. 3 are maintained. In the discussion of subsequent figures the values of the resistances will not be specifically pointed out, but it will be assumed that the proper impedance relations are maintained. In general, it is possible to make the gate resistors of the gates which are directly connected to the sources of input signals about 15,000 ohms, the output impedances about 200,000 ohms, and the gate resistances of the gates which receive input signals from other gates 1 megohm or more.

The operation of this half-adder can be understood by considering the effects of the separate "and" and "or" circuits as follows: Circuit 6 is an "and" circuit which gives a response to signals $\overline{A}$ and B according to the rules given in Table 3; i. e., it "logically" multiplies $\overline{A}$ and B to give the output signal $\overline{A}.B$ on lead 1022. As will be noted, "and" circuit 6 has its input terminals connected to the particular switch arms of switches 1018 and 1010 on which the signals $\overline{A}$ and B appear. Circuit 7 gives a response $A.\overline{B}$ on lead 1023. Circuit 8 performs "logical" multiplication of the signals A and B and its output is taken off directly as the carry signal, $C=A.B$ at terminal 1028. Circuit 9 combines the outputs of circuits 6 and 7. It is an "or" circuit and hence as it follows the rules in Table 4, performs "logical" addition of the input signals. Here the inputs are $\overline{A}.B$ and $A.\overline{B}$, hence the output signal R, is $\overline{A}.B+A.\overline{B}$. That this signal is the desired output listed in Table 11 as the signal R may be seen directly from Table 13.

*Table 13*

| (1) | (2) | (3) | (4) | (5) | (6) | (7) |
|---|---|---|---|---|---|---|
| $\bar{A}$ | B | $\bar{A}.B$ | A | $\bar{B}$ | $A.\bar{B}$ | $\bar{A}.B+A.\bar{B}$ |
| 1 | 0 | 0 | 0 | 1 | 0 | 0 |
| 1 | 1 | 1 | 0 | 0 | 0 | 1 |
| 0 | 0 | 0 | 1 | 1 | 1 | 1 |
| 0 | 1 | 0 | 1 | 0 | 0 | 0 |

We obtain column (3), $\bar{A}.B$, from the rules in Table 3, column (6), $A.\bar{B}$, similarly, and column (7) from the rules in Table 4, performing the process of "logical" addition on the signals in columns (3) and (6). From Table 7 we find that 1+0=1, 0+1=1; and 0+0=0, hence the results listed in column (7).

It is possible to derive other circuits from the expressions for R and C above, which will all give the same output signals. The general expressions for R and C may be written as:

$$R=A.\bar{B}.F+\bar{A}.B.G+H$$
$$C=A.B.J+K$$

where F, G, H, J and K are functions of the input signals A, $\bar{A}$, B, and $\bar{B}$ having the values:

$$F=1$$
$$G=1$$
$$H=0$$
$$J=1$$
$$K=0$$

for all values of the input signals. Each of these functions is constructed in accordance with the identities of Equations 1, 2, 3, 4. There are, in general, a number of forms of the general R and C equations corresponding to each choice of the functions F, G, H, J, K. These additional forms of the general equations may be obtained by use of the distributive and associative laws of Boolean algebra, as was seen previously in the discussion of the circuits of Figs. 5, 6 and 7.

Figure 11:
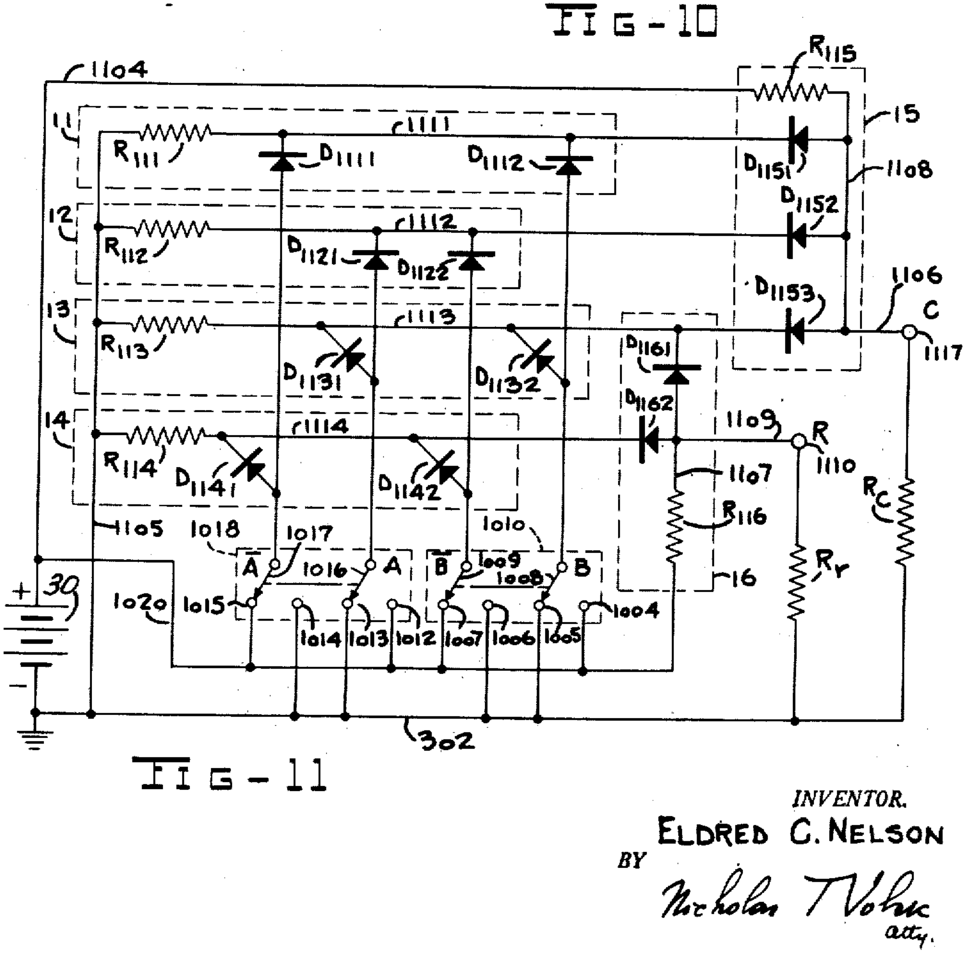

An example of a half-adder circuit derived in the manner above is illustrated in Fig. 11. This circuit was derived from the equation representing the circuit of Fig. 10. Start with the generalized equations for R and C.

$$R=A.\bar{B}.F+\bar{A}.B.G+H$$
$$C=A.B.J+K$$

Let the expressions for F, G. H, J, and K be as follows:

$$F=1$$
$$G=1$$
$$H=A.\bar{A}+B.\bar{B}=0$$
$$J=A+\bar{A}+B+\bar{B}=1$$
$$K=B.B.\bar{B}+A.A.\bar{A}+\bar{A}.\bar{B}.B+\bar{A}.\bar{B}.A=0$$

These expressions are chosen arbitrarily, the only restriction being that the values be 1 or 0 as indicated for all values of A, $\bar{A}$, B, and $\bar{B}$. The equations for R and C may now be written as $$R=A.\bar{B}+\bar{A}.B+A.\bar{A}+B.\bar{B}$$
$$C=A.B.(A+\bar{A}+B+\bar{B})+B.B.\bar{B}+A.A.\bar{A}+\bar{A}.\bar{B}.B+\bar{A}.\bar{B}.A$$

Now making use of the distributive and associative laws (5) and (6)

$$R=(A+B).(\bar{A}+\bar{B})$$
$$C=A.B.A+A.B.\bar{A}+A.B.B+A.B.\bar{B}+B.B.\bar{B}+A.A.\bar{A}+\bar{A}.\bar{B}.B+\bar{A}.\bar{B}.\bar{A}$$
$$\bar{C}=(A+B).(\bar{A}.A+A.\bar{B}+A.B+B.B)$$
$$C=(A+B).(\bar{A}+B).(A+B)$$

Now the circuit of Fig. 11 may be constructed quite readily, using the functional forms for R and C derived above where:

$$R=(A+B).(\bar{A}+\bar{B})$$
$$C=(A+B).(\bar{A}+B).(A+\bar{B})$$

From the rules for mechanizing equations, set forth above, it can be seen that the network for producing result signal R should include two "or" circuits and one "and" circuit, each circuit having two input terminals and one output terminal. The input signals to the "or" circuits are A and B, and $\bar{A}$ and $\bar{B}$, respectively, while the input signals to the "and" circuit are the output signals of the "or" circuits. Similarly, the network for producing the carry signal C should include three "or" circuits and two "and" circuits. It should be noted, however, that one of the "or" circuits required for the C signal producing network is identical with the first-mentioned "or" circuit for the R signal producing network. In addition, although the C equation contains two dot signs, the operation required by these dot signs may be performed by a single "and" circuit having three input terminals. In other words, the two dot signs may be treated as a single "logical" multiplication of the three signal quantities, this single multiplication being mechanized as a three-terminal "and" circuit. Accordingly, a combined network for producing the R and C signals, as shown in Fig. 11, would include four two-terminal "or" circuits, one two-terminal "and" circuit, and one three-terminal "and" circuit.

In Fig. 11, the network includes a battery B whose negative terminal is connected to negative bus 302. Also connected to negative bus 302 are the four paralleled "or" circuits, 11, 12, 13 and 14, consisting of resistor $R_{111}$, diodes $D_{1111}$, $D_{1112}$, lead 1111; resistor $R_{112}$, diodes $D_{1121}$, $D_{1122}$, lead 1112; resistor $R_{113}$, diodes $D_{1131}$, $D_{1132}$, lead 1113, resistor $R_{114}$, diodes $D_{1141}$, $D_{1142}$, lead 1114, respectively. Leads 1111, 1112, 1113 of "or" circuits 11, 12 and 13 are connected to the cathodes of diodes $D_{1151}$, $D_{1152}$, and $D_{1153}$, respectively, while the anodes of these diodes are connected together by a conductor 1108 to form a portion of "and" circuit 15. The terminal 1117 at which signal C, representing the carry digit of the answer appears, is connected to negative bus 302 by a resistor $R_c$, and is connected to conductor 1108 by a conductor 1106. Conductor 1108 is also connected to the positive terminal of battery B through a resistor $R_{115}$ and a conductor 1104 to complete the structure of "and" circuit 15. Lead 1113 and 1114 of "or" circuits 13 and 14, are connected to the cathodes of diodes $D_{1161}$ and $D_{1162}$, respectively, the anodes of which are connected together by a conductor 1109 to form a portion of "and" circuit 16. Terminal 1110 at which the signal R, representing the result digit of the binary addition appears, is connected to negative bus 302 through a resistor $R_r$ and is also connected to conductor 1109. Conductor 1109 is connected to the positive terminal of battery B through a resistor $R_{116}$ and a conductor 1020 to complete the structure of "and" circuit 16. The fixed switch arms of the two double-pole double-throw switches 1018, 1010 are connected in the same manner as shown for the fixed switch arms of the half adder in Fig. 10. However, the movable switch arm 1017 of switch 1018 is connected to the anodes of diodes $D_{1111}$ and $D_{1141}$, while the movable switch arm 1016 of switch 1018 is connected to the anodes of diodes $D_{1121}$ and $D_{1131}$. The movable switch arm 1009 of switch 1010 is connected to the anodes of diodes $D_{1122}$ and $D_{1142}$, while the movable switch arm 1008 of switch 1010 is connected to the anodes of diodes $D_{1112}$ and $D_{1132}$.

The operation of this circuit is as follows: "Or" circuits 13 and 14 form the "logical" sums $A+B$ and $\bar{A}+\bar{B}$, respectively. The output signals of these "or" circuits are fed through conductors 1113 and 1114 into "and" circuit 16 which forms the "logical" product $$(A+B).(\bar{A}+\bar{B})$$

which is the result signal R. This result signal is fed through lead 1109 to output terminal 1110. The carry signal is formed as follows. "Or" circuits, 11, 12, and 13 form the "logical" sums $\bar{A}+B$, $A+\bar{B}$, and $A+B$, respectively. These signals are fed through conductors 1111, 1112, and 1113 into the three terminal "and" circuit 15 which forms the "logical" product $$(\bar{A}+B).(A+\bar{B}).(A+B)$$

which is the carry signal C. This carry signal is supplied through lead 1106 to output terminal 1117. Here "or" circuit 13 provides the signal $A+B$ which is used in forming both R and C; both "and" circuit 15 and "and" circuit 16 have one input terminal connected to lead 1113 to receive this $A+B$ signal.

The circuit of Fig. 11 gives an output signal identical to the output signal of the circuit of Fig. 10. Entirely different combinations of "and" and "or" gates are used in the two circuits, however. The R circuits of both figures require the same number of diodes. In the Fig. 10 circuit, the input signals are fed into the two "and" gates and the outputs of the "and" gates are combined in an "or" gate. In the Fig. 11 circuit the gates are reversed, the input being fed into two "or" circuits and their outputs being fed into an "and" circuit. The C circuit in Fig. 11 is more complicated than that of Fig. 10, three two-terminal "or" circuits and one three-terminal "and" circuit being required in Fig. 11 as compared with one two-terminal "and" circuit in Fig. 10. Any number of other variations can be obtained by the same process employed above, each circuit giving identical output signals.

Binary subtraction is very similar to addition. The rules for subtraction are given in Table 14. Let A be the signal representing the minuend and B be the signal representing the subtrahend.

*Table 14*

| A | B | C | R |
|---|---|---|---|
| 0 | 0 | 0 | 0 |
| 0 | 1 | 1 | 1 |
| 1 | 0 | 0 | 1 |
| 1 | 1 | 0 | 0 |

Figure 12:
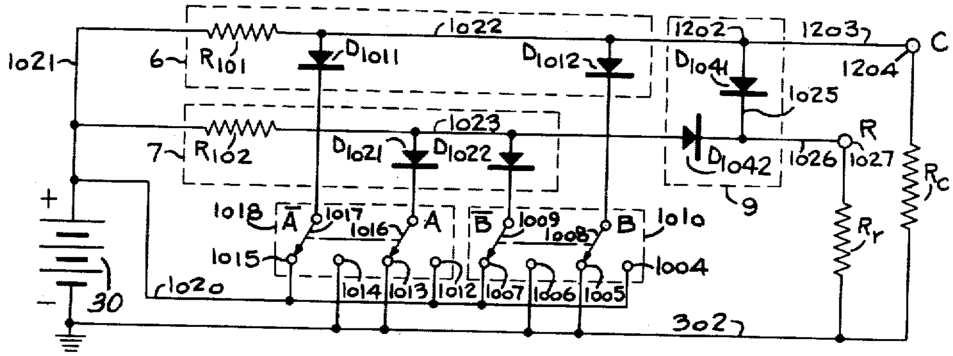
Figs. 12 and 13 are schematic diagrams of different half-subtracter circuits.

The carry digit in subtraction is subtracted from the next pair of binary digits which are to be subtracted. In decimal computation it could be said that 23 minus 18 is computed by forming 3 minus 8 equals 5 plus a carry equal to 1 which must be subtracted from the answer of 2 minus 1 to give a final answer of 5. An electronic subtractor unit would then give the response R, C to the input signals A, B according to Table 14 where 1 and 0 represent voltages of 100 and 0, for example. The circuit of Fig. 12 gives this response. Other circuits disclosed will either add or subtract according to the rules above, depending on the position of a selector switch, and will store the carry digit and add it in at the proper time so that numbers with any number of digits may be added or subtracted. The processes of multiplication and division in a computer are ordinarily carried out by means of adders and subtracters properly connected.

In many computers, subtraction is carried out by forming the complement of the subtrahend signal and adding this complementary signal to the minuend signal. However, by means of a very simple modification, the binary adder may be made to carry out direct subtraction. A comparison of Tables 11 and 14 will show that the result digit, R, is the same for all cases of binary addition and subtraction; hence the signal representing R can be produced by the same device for both addition and subtraction. The only difference is in the carry digit, C. In subtraction, the carry digit is 0 except for the case 0 minus 1, when it is 1; in addition the carry digit is 0 except for the case 1+1 when it is 1. A comparison of Table 14 with Table 8 shows that C is given by $$C=\bar{A}.B$$

The result digit is the same as for addition.

$$R=\bar{A}.B.+A.\bar{B}$$

Here C can be produced by the "and" circuit which forms the "logical" product $\bar{A}.B$ used in forming the R signal.

The circuit for a half-subtracter is shown in Fig. 12. It is similar to the half-adder circuit shown in Fig. 10, except that "and" circuit 8, terminal 1028, and resistor $R_{104}$ are omitted. Terminal 1204 is added to the half-adder circuit and is connected to negative bus 302 through resistor $R_c$, and is also connected to the lead 1002 of "and" circuit 6 at junction 1202 by a conductor 1203. The signal, C, representing the carry digit of subtraction appears at terminal 1204.

This circuit is simpler than that for the analogous half-adder of Fig. 10. The R circuit is exactly as in Fig. 10, "and" circuits 6 and 7 forming the "logical" products $\bar{A}.B$ and $A.\bar{B}$, respectively, on conductors 1022 and 1023, and "or" circuit 9 forming the "logical" sum of the "and" circuit outputs, $\bar{A}.B+A.\bar{B}$. The C circuit consists of "and" circuit 6 which forms the "logical" product $\bar{A}.B$. at junction 1202 which in turn is fed to the C signal output terminal 1204.

As before, it is possible to obtain other circuits which give the same output signals by algebraic manipulation of the expressions for R and C. The generalized form for the subtraction signals may be expressed as $$R=\bar{A}.B.F+A.\bar{B}.G+H$$
$$C=\bar{A}.B.J+K$$

where F, G, H, J, and K are functions of the signal variables A, $\bar{A}$, B, and $\bar{B}$ having the values:

$$F=1$$
$$G=1$$
$$H=0$$
$$J=1$$
$$K=0$$

for all values of the signal variables.

Another example of the derivations of an equivalent circuit will be carried out. Let the forms of F, G, and H be the same as for the case of the half-adder example carried out in connection with Fig. 11.

$$F=1$$
$$G=1$$
$$H=A.\bar{A}+B.\bar{B}=0$$

Let J and K be given by $$J=1$$
$$K=B.\bar{B}$$

Then $$R=(A+B).(\bar{A}+\bar{B})$$
$$C=\bar{A}.B+B.\bar{B}$$

and using the distributive and associative laws (5) and (6)

$$C=(\bar{A}+\bar{B}).B$$

Now it is possible to construct a circuit using the equations for R and C derived above $$R=(A+B).(\bar{A}+\bar{B})$$
$$C=(\bar{A}+\bar{B}).B$$

As before, R requires two "or" circuits to form the logical sums $A+B$ and $\bar{A}+B$. An "and" circuit is needed to form the logical product of these two sums to give R. To form C, it is possible to use one of the "or" circuits used in forming the R signal. An "and" circuit is needed to form the product of the B signal and the output of the "or" circuit used to form the sum $\bar{A}+\bar{B}$.

Figure 13:
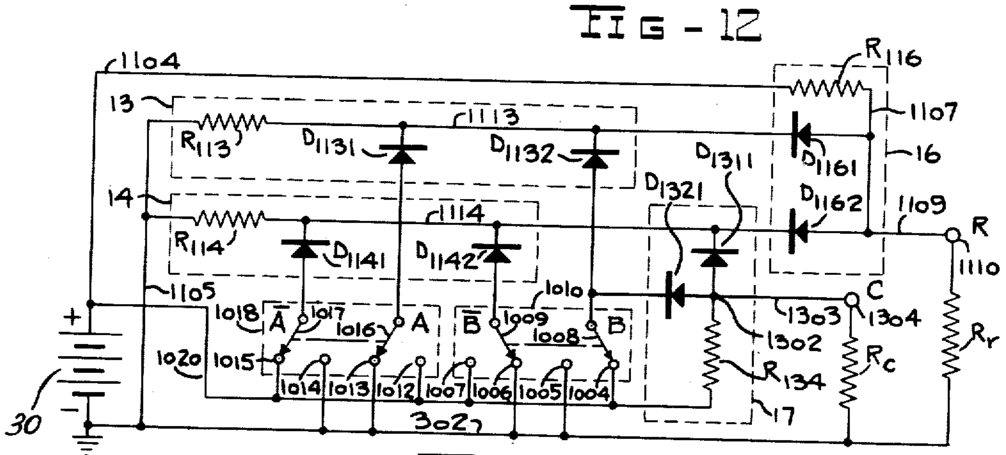

The circuit corresponding to the above equation is shown in Fig. 13. In Fig. 13 "or" circuits 13 and 14, "and" circuit 16, output resistor $R_r$, and the input signal switching connections are exactly the same as in Fig. 11. "Or" circuits 11 and 12 and "and" circuit 15 which form the carry digit network for the adder circuit in Fig. 11 are here replaced by "and" circuit 17, which, in combination with "or" circuit 14, forms the carry digit network for the subtracter. "And" circuit 17 consists of diodes $D_{1311}$ and $D_{1321}$ and a resistor $R_{134}$. The cathode of diode $D_{1321}$ is connected to movable switch arm 1008. The cathode of diode $D_{1311}$ is connected to lead 1114 to receive the output of "or" circuit 14. The anodes of diodes $D_{1311}$ and $D_{1321}$ are connected to terminal 1304 by a lead 1303, terminal 1304 being connected to negative bus 302 through resistor $R_c$ and producing the signal C.

"Or" circuit 13 forms the "logical" sum, $A+B$; "or" circuit 14 forms the "logical" sum $\bar{A}+\bar{B}$. The outputs of "or" circuits 13 and 14 feed into "and" circuit 16 which forms the "logical" product $(A+B).(\bar{A}+\bar{B})$ which is R. The output of "or" circuit 14 and the signal B are fed into "and" circuit 17 which forms the product $(\bar{A}+\bar{B}).B$ which is C. Here the number of diodes required is eight as compared with six in the circuit of Fig. 12. An entirely different circuit configuration is thus required by the different forms of the generalized equations for R and C, the output signals being identical.

In each circuit of this invention, it will be possible to manipulate the output signal equations to obtain alternative forms in the fashion described above. First, choose expressions identically zero or one, by using the identities (1), (2), (3), (4) as required for the F, G, H functions. Next, express the R and C signals in terms of the particular expressions chosen. This represents one particular circuit and a number of others may be obtained from this particular choice of F, G, H functions by manipulation of the equations by using the distributive and associative laws (5), (6), and (7). In the remainder of this disclosure the generalized form of the output signal equation will be given for each circuit, and only one circuit will be discussed in connection with each output signal equation. Other circuits may be obtained by the process described above, for the construction of the circuit, once the equation for it has been determined, is purely routine.

Since the R signal for both adders and subtracters is the same, $R=\bar{A}.B+A.\bar{B}$, it is quite simple to make a circuit which can act as either an adder or subtracter by providing a switch so that the carry signal may be taken from different points in the circuit.

Figure 14:
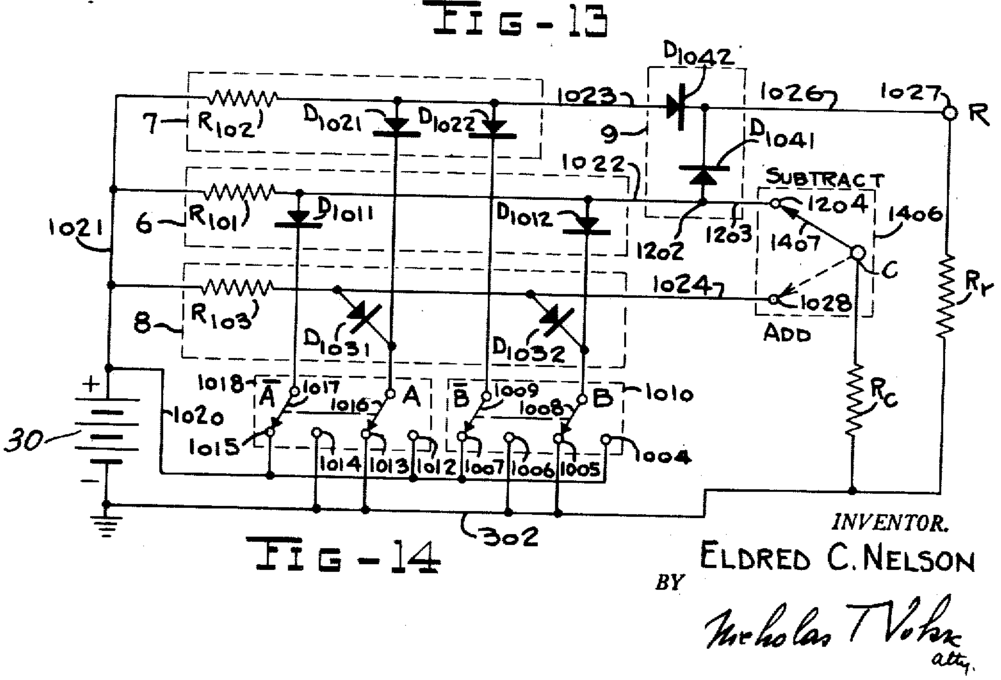
Figs. 14 and 15 are schematic diagrams of two circuits, each of which may function either as a half-adder or as a half-subtracter.

A half-adder-subtracter is shown in Fig. 14. This circuit is identical to the half-adder circuit of Fig. 10 with certain additions. Terminal 1204 is connected by lead 1203 to junction 1202 which in turn is connected to lead 1022. The movable switch arm 1407 of switch 1406 is connected through resistor $R_c$ to negative bus 302. Movable switch arm 1407 acts as the carry digit output terminal and may be connected to either terminal 1028 for addition or terminal 1204 for subtraction.

When the switch is in the add position a comparison with Fig. 10 will show that the circuits of Fig. 10 and 14 are identical. When the switch is in subtract position, "and" circuit 8 has no effect and the active part of the circuit of Fig. 14 is identical with the circuit of Fig. 12.

The output signal equations for this circuit may be written in generalized form as:

$$R=\bar{A}.B.F+A.\bar{B}.G+H$$
$$C=a(A.B.J+K)+\bar{a}(\bar{A}.B.L+M)$$

where $$a=1$$
$$\bar{a}=0$$

for addition and $$a=0$$
$$\bar{a}=1$$

for subtraction. The functions F, G, H, J, K, L, and M have the values:

$$F=1$$
$$G=1$$
$$H=0$$
$$J=1$$
$$K=0$$
$$L=1$$
$$M=0$$

for all values of the signal variables.

A switch having two positions is indicated by the letters $a$ and $\bar{a}$. When the switch is in the add position, the carry digit output terminal receives a signal expressed in its simplest form as $A.B$, and when the switch is in the subtract position the carry digit output terminal receives a signal $\bar{A}.B$, in simplest form.

In general, there may be more than one location in a circuit in which a switch may be connected. However, it is always possible to locate the switch as indicated in Fig. 14 between the output terminals of the two separate carry digit networks, regardless of the choice of the particular form in which the C signals for addition and subtraction are expressed. For example, an adder-subtracter could be constructed to mechanize the equations of the output signals of the circuits of Figs. 11 and 13. The adder-subtracter equations would be $$R=(A+B).(\bar{A}+\bar{B})$$
$$C=a(\bar{A}+\bar{B}).B+\bar{a}(A+B).(\bar{A}+B).(A+\bar{B})$$

where $$a=0$$
$$\bar{a}=1$$

for addition and $$a=1$$
$$\bar{a}=0$$

for subtraction. Two separate carry digit networks using different diodes throughout are required. A switch is used which is connectable to the output terminal of either carry digit network, just as in the circuit of Fig. 14. This is the only possible switch location in this particular circuit.

In each case the equations for the output signals should be inspected for common terms. Where such terms exist, the same "and" and "or" circuit may be used to provide the signal represented by the common term, whether present in the result or carry digit signal. For example, the use of one "and" circuit to form the carry digit signal for subtraction and to form part of the result signal is illustrated by "and" circuit 6 in Fig. 12. A further simplification may be possible in the construction of an adder-subtracter by locating the switch in such a way that two independent carry digit networks are not required. Such a choice of switch location will usually result in an adder-subtracter circuit with a lower number of diodes than is necessary if the switch is put on the output. When the carry digit signal expressions for addition and subtraction differ only in that a first input signal in one expression is replaced by a second input signal in the other expression, a switch may be connected to supply the first input signal in one position and the second signal in the other position.

Figure 15:
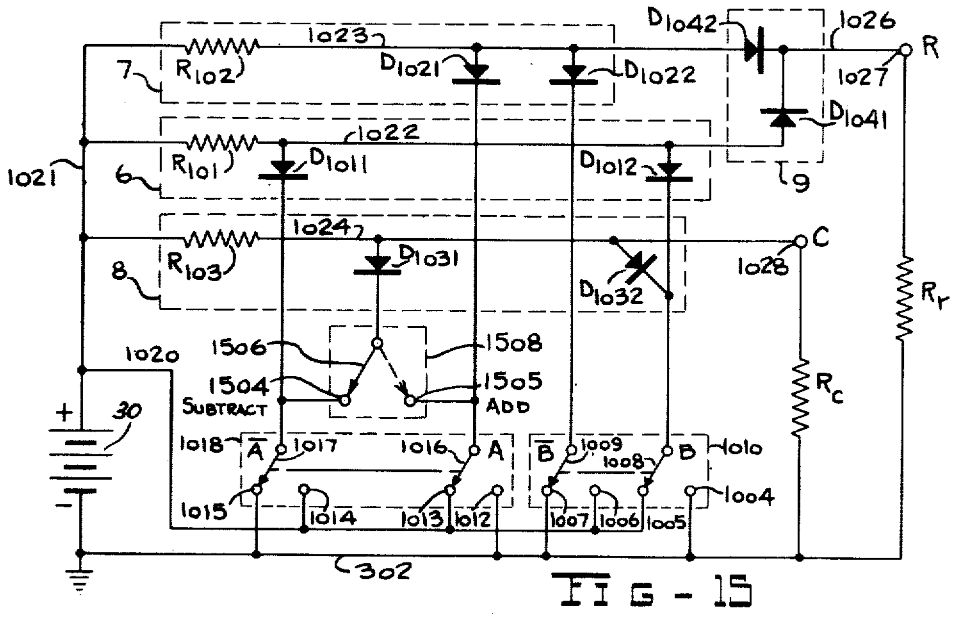

For example, the circuit of Fig. 14 may be modified to use a switch connected between the input terminals supplying A and $\bar{A}$ as shown in Fig. 15.

In Fig. 15, the switch 1406, as shown in Fig. 14, is replaced by a switch 1508. The cathode of diode $D_{1031}$ is now connected to the movable switch arm 1506 of switch 1508, arm 1506 being adapted to contact either fixed contact point 1504 of switch 1508 which, in turn, is connected to movable switch arm 1017 of switch 1018, or fixed contact point 1505 of switch 1508 which, in turn, is connected to movable switch arm 1016 of switch 1018. The carry signal in this arrangement appears on terminal 1028 as it did for the half-adder of Fig. 10. Terminal 1204 is omitted in this arrangement and all of the remaining structure is identical to that found in the circuit shown in Fig. 14.

Here the two diodes of "and" circuit 8 act as the carry digit network for both addition and subtraction. In this particular case, however, no decrease in the total number of diodes is obtained by relocating the switch, because in the circuit of Fig. 14 is was possible to construct the carry digit network for subtraction completely from one section of the result digit network. In general, of course, this will not be possible. It will be seen in connection with the full-adder-subtracter circuits that a considerable decrease in the number of diodes can be brought about by proper choice of the switch location. Similarly, half-adder-subtracter circuits of a more complex form than those of Figs. 14 and 15 could be constructed in which there would be an advantageous switch location.

For some purposes it may be necessary to provide the signals $\overline{R}$ and $\overline{C}$ complementary to signals R and C. These signals can, of course, be generated from the R and C signals by the use of appropriate tube circuits; however, it is also possible to obtain them from the input signals $\overline{A}$, A, $\overline{B}$, B by means of "and" and "or" circuits. The complement of R is:

$$\overline{R}=\overline{\overline{A}.B+A.\overline{B}}$$
$$=(A+\overline{B}).(\overline{A}+B)$$
$$=A.\overline{A}+A.B+\overline{B}.\overline{A}+\overline{B}.B$$
$$=A.B+\overline{A}.\overline{B}$$

the complement of the carry signal for addition is $$\overline{C}_+=\overline{A.B}=\overline{A}+\overline{B}$$

and for subtraction $$\overline{C}_-=\overline{\overline{A}.B}=A+\overline{B}$$

Accordingly, the forms of the equations for producing the output signals R, $\overline{R}$, $C_+$, and $\overline{C}_+$ are as follows:

$$R=\overline{A}.B+A.\overline{B}$$
$$\overline{R}=A.B+\overline{A}.\overline{B}$$
$$C_+=A.B$$
$$\overline{C}_+=\overline{A}+\overline{B}$$

Now, mechanization of the equation for R requires two "and" circuits and one "or" circuit, while mechanization of the equation for $\overline{R}$ requires two additional "and" circuits and one additional "or" circuit. The carry signal $C_+$ may be obtained from one of the "and" circuits required for signal $\overline{R}$, while the complementary carry signal $\overline{C}_+$ requires an additional "or" circuit. Accordingly a combined network for producing all four output signals requires four "and" circuits and three "or" circuits.

Figure 16:
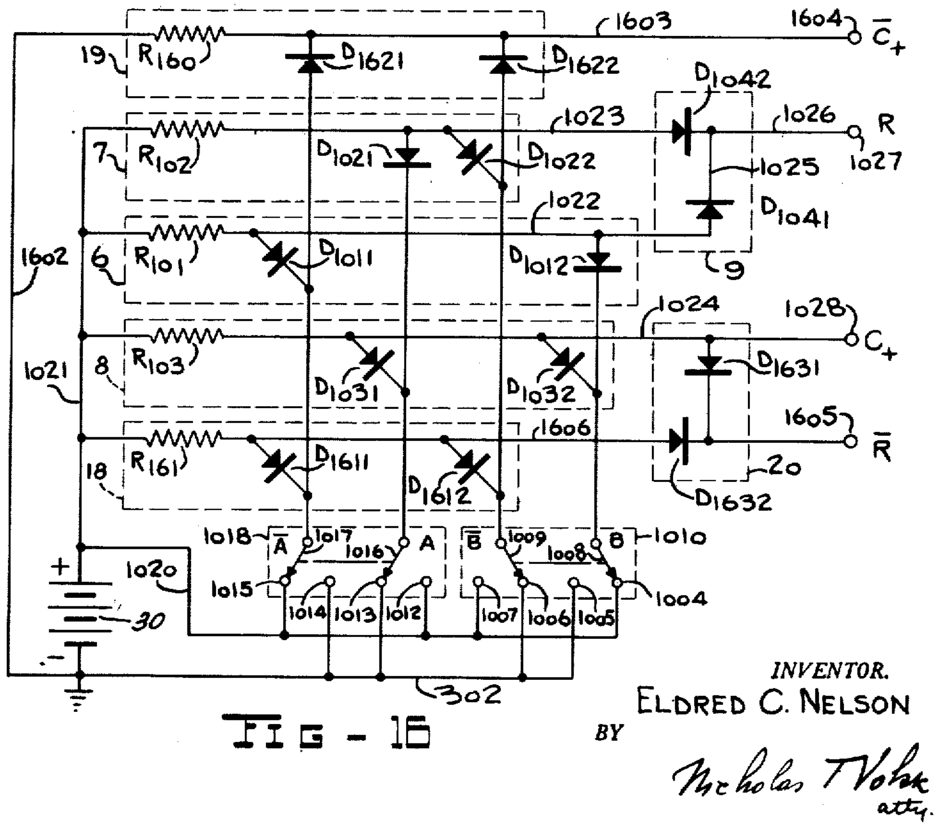
Fig. 16 is a schematic diagram of a half-adder which produces the complementary output signals.

A half-adder which supplies the output signals R, $\overline{R}$, $C_+$, and $\overline{C}_+$ is shown in Fig. 16. This circuit contains all the structure of the half-adder circuit in Fig. 10, except that resistor $R_{104}$ of "and" circuit 9, connected between conductor 1025 and negative bus 302, is omitted. The additional structure included in this circuit includes "or" circuit 19 which is composed of resistor $R_{160}$, diodes $D_{1621}$, $D_{1622}$ and lead 1603. One side of resistor $R_{160}$ is connected directly to negative bus 302 and a lead 1603 is connected to a terminal 1604 at which point a complementary carry signal $\overline{C}$ appears. The anode of diode $D_{1621}$ is connected to movable switch arm 1017 of switch 1018 and the anode of diode $D_{1622}$ is connected to movable switch arm 1009 of switch 1010. "And" circuit 18 comprising resistor $R_{161}$, diodes $D_{1611}$, $D_{1612}$ and lead 1606, is connected at one end to the positive terminal of battery B. Lead 1606 is connected to the anode of diode $D_{1632}$ and lead 1024 from "and" circuit 8, as discussed in the description of Fig. 10, is connected to the anode of diode $D_{1631}$. The cathodes of diodes $D_{1631}$ and $D_{1632}$ are connected together to form an "or" circuit 20, the output of which appears at a terminal 1605 and is a result signal complementary to that appearing at terminal 1027. The cathode of diode $D_{1611}$ of "and" circuit 18 is connected directly to movable switch arm 1017 of switch 1018 and the cathode of diode $D_{1612}$ is connected to movable switch arm 1009 of switch 1010. Tho output impedances have been omitted in Fig. 16 and all subsequent drawings.

The operation of this circuit is as follows. "And" circuits 6, 7, and 8, and "or" circuits 9 produce the R and $C_+$ signals for addition, just as in the circuit of Fig. 10. The carry digit complementary signal $\overline{C}_+$ is produced by "or" circuit 19 which forms the "logical" sum $\overline{A}+\overline{B}$. The complementary result signal $\overline{R}$ is produced by "and" circuits 8 and 18 and "or" circuit 20. "And" circuits 8 and 18 produce signals $A.B$ and $\overline{A}.\overline{B}$, respectively, while "or" circuit 20 produces the "logical" sum of the above signals, $A.B+\overline{A}.\overline{B}$ which is $\overline{R}$.

As before, this is only one of the many possible circuits which give this output signal. The generalized expression for the complementary signal half-adder may be given as:

$$R=\overline{A}.B.F+A.\overline{B}.G+H$$
$$\overline{R}=A.B.J+\overline{A}.\overline{B}.K+M$$
$$C_+=A.B.N+P$$
$$\overline{C}_+=\overline{A}.Q+\overline{B}.S+T$$

where F, G, H, J, K, M, N, P, Q, S, and T are functions of A, $\overline{A}$, B, and $\overline{B}$, having the values:

$$F=1$$
$$G=1$$
$$H=0$$
$$J=1$$
$$K=1$$
$$M=0$$
$$N=1$$
$$P=0$$
$$Q=1$$
$$S=1$$
$$T=0$$

for all values of the input signals.

Figure 17:
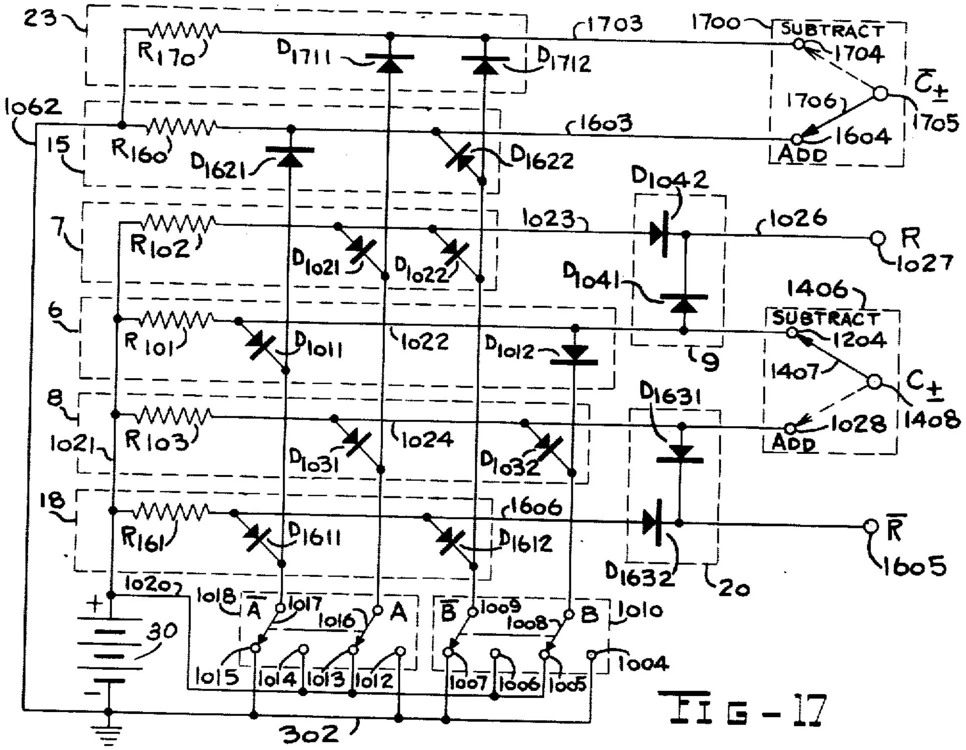
Fig. 17 is a schematic diagram of a circuit which may function either as a half-adder or as a half-subtracter, and which produces the complementary output signals.

A half-adder subtractor which supplies the complementary output signals is shown in Fig. 17. It is composed of the circuit shown in Fig. 16 with certain additions. The first addition consists of "or" circuit 23 connected at one end to the negative bus 302 circuit 23 including a resistor $R_{170}$, diodes $D_{1711}$, $D_{1712}$ and lead 1703. Lead 1703 is connected to a terminal 1704 at which point the complementary carry signal of binary subtraction, $\overline{C}_-$, appears. This signal is the "logical" sum of input signals A and $\overline{B}$. Movable switch arm 1706 of switch 1700 is adapted to contact either terminal 1704 or terminal 1604 and to thereby present on terminal 1705 of switch 1700 a complementary carry signal of either addition or subtraction. The anode of diode $D_{1711}$ is connected to movable switch arm 1016 of switch 1018 to receive signal A and the anode of diode $D_{1712}$ is connected directly to movable switch arm 1009 of switch 1010 to receive signal $\overline{B}$. The other addition to the circuit shown in Fig. 16 to secure the structure disclosed in Fig. 17 is switch 1406 consisting of movable switch arm 1407 and terminal 1408. Movable switch arm 1407 is adapted to connect either terminal 1028 or terminal 1204 to terminal 1408. Terminal 1408 presents a signal representing the carry digit of either addition or subtraction. As will be noted, this switch 1406 and connections thereto are the same as that found in Fig. 14. The carry digit for addition, $A.B$, is supplied by "and" circuit 8 and the carry digit for subtraction, $\overline{A}.B$, is supplied by "and" circuit 6. R and $\overline{R}$ are supplied by circuits identical to those of the half-adder circuit of Fig. 16.

A half-subtracter which supplies the complementary signals R and $\overline{C}_-$ would consist of a circuit like the one in Fig. 17 without the switches 1700 or 1406, or the $C_+$ output terminals. "And" circuit 15 which supplies signal $\overline{C}_+$ could be eliminated. The "and" circuit 8 which supplies signal $C_+$ is still necessary, as it is used in forming the $\overline{R}$ signal.

The generalized equations for the half-subtracter circuit supplying complementary signals are:

$$R=\overline{A}.B.F+A.\overline{B}.G+H$$
$$\overline{R}=A.B.J+\overline{A}.\overline{B}.K+M$$
$$C_-=\overline{A}.B.N+P$$
$$\overline{C}_-=A.Q+\overline{B}.S+T$$

where F, G, H, J, K, M, N, P, Q, S, and T are functions of A, $\overline{A}$, B, and $\overline{B}$, having the values:

$$F=1$$
$$G=1$$
$$H=0$$
$$J=1$$
$$K=1$$
$$M=0$$
$$N=1$$
$$P=0$$
$$Q=1$$
$$S=1$$
$$T=0$$

values of the input signals.

The generalized expressions for the half-adder-subtracter circuit which supplies the complementary signals are $$R=\overline{A}.B.F+A.\overline{B}.G+H$$
$$\overline{R}=A.B.J+\overline{A}.\overline{B}.K+M$$
$$C=a(A.B.N+P)+\overline{a}(\overline{A}.B.Q+S)$$
$$\overline{C}=a(\overline{A}.T+\overline{B}.U+V)+\overline{a}(A.W+\overline{B}.X+Y)$$

where $$a=1$$
$$\overline{a}=0$$

for addition and $$a=0$$
$$\overline{a}=1$$

for subtraction, and where F, G, H, J, K, M, N, P, Q, S, T, U, V, W, X, Y, are functions of A, $\overline{A}$, B, and $\overline{B}$ having the values:

$$F=1$$
$$G=1$$
$$H=0$$
$$J=1$$
$$K=1$$
$$M=0$$
$$N=1$$
$$P=0$$
$$Q=1$$
$$S=0$$
$$T=1$$
$$U=1$$
$$V=0$$
$$W=1$$
$$X=1$$
$$Y=0$$

for all values of the input signals.

"SERIES" ADDING AND SUBTRACTING CIRCUITS

The circuits described thus far have no provision for performing successive additions or subtractions. For example, the half-adder of Fig. 10, as it stands, will add any combination of two binary digits and present the sum as the outputs R and C. In order to add two binary numbers, each of which contains more than one binary digit, the carry digit from the addition of the first pair of digits (one digit from each number) must be added to the sum which is produced by the addition of the next pair of digits, the carry digit resulting from this second addition must be added to the sum of the next pair, etc. To illustrate this carry process in terms of ordinary decimal arithmetic, suppose we have to add:

$$\begin{array}{r} 59 \\ +22 \\ \hline 81 \end{array}$$

When we add 9 to 2, we obtain 11 which makes it necessary for the decimal digit 1 to be carried over and added to the sum of the next succeeding pair of digits, 5 and 2.

Two types of adder circuits can be used to accomplish this process. The first type is known as a series adder and the second type is known as a parallel adder. In a series adder the additions of the successive pairs of digits (such as 9+2 and 5+2 in the example above) are carried out at different times by the same unit, the carry digits being added in at the proper times. In a parallel adder the additions of the successive pairs of digits are carried out simultaneously by different units, with connections between units to supply the carry signals from the first unit to the second, from the second to the third, etc. The series adder, then, produces a single time varying output signal and the parallel adder produces a series of output signals, corresponding to the sums of the successive pairs of digits, including carry digits.

A complete series adder may then be defined as a device that receives signals A and B, representing the numbers being added, and a signal D, representing the carry digit from the previous addition. It produces a signal R representing the sum digit and a signal C representing the carry digit of the addition of the three digits represented by the signals A, B, and D. As before, it may be necessary to supply the complementary signals $\overline{A}$, $\overline{B}$, $\overline{D}$ from auxiliary circuits.

Since the carry digit has to be added to (or subtracted from) the next sum (or difference) a complete series adder (or subtracter) must perform two successive additions (or subtractions), and hence requires two units of the type previously described. Thus the circuits which have been discussed previously are known as half-adders or half-subtracters.

A function representing a complete series adder can be constructed by writing down in tabular form the relation of R and C to the input signals A, B, and D and then writing the function as a sum or minimal polynomials. Another function representing a complete series adder can be constructed from the half-adder functions. This latter procedure will be used here. Let $R_o$ be the sum digit signal for a first half-adder adding numbers represented by the signals A and B and let $C_o$ be the carry digit signal for this half-adder.

$$R_o=A.\overline{B}+\overline{A}.B \quad (10)$$
$$C_o=A.B \quad (11)$$

The complete binary sum is obtained by adding the sum from the first half-adder to the carry digit, D, from the previous addition by means of a second half-adder. Let R be the signal representing the complete binary sum and let $C_1$ be the signal representing the carry digit from the second half-adder.

$$R=R_o.\overline{D}+\overline{R}_o.D \quad (12)$$
$$C_1=R_o.D \quad (13)$$

A carry digit may occur in either the first addition or the second addition, but not in both simultaneously; hence C, the signal representing the carry digit for the complete addition, may be represented as the "logical" sum of $C_0$ and $C_1$.

(14) $$C=C_0+C_1$$

R can be written directly in terms of A and B by substituting the expression (10) for $R_0$ into (12)

(15) $$R=(A.\overline{B}+\overline{A}.B).\overline{D}+(\overline{A}.\overline{B}+A.B).D$$

Multiplying out the expressions so as to remove the parentheses gives

(16) $$R=A.\overline{B}.\overline{D}+\overline{A}.B.\overline{D}+\overline{A}.\overline{B}.D+A.B.D$$

This function is the one that would have been obtained by forming the sum of minimal polynomials from a table of signal relationships.

Similarly, C can be expressed directly in terms of A, B, and D.

(17) $$C=A.B+R_0.D=A.B+(\overline{A}.\overline{B}+\overline{\overline{A}}.B).D=A.B.+A.\overline{B}.D+\overline{A}.B.D$$

The expression (17) can be further simplified by making use of identities (1) and (3)

(18) $$\begin{aligned}C&=A.B(D+\overline{D})+A.\overline{B}.D+\overline{A}.B.D\\&=A.B.D+A.B.\overline{D}+A.\overline{B}.D+\overline{A}.B.D\\&=A.B.D+A.B.D+A.B.D+A.B.\overline{D}+\\&\quad A.\overline{B}.D+\overline{A}.B.D=A.B.(D+\overline{D})+\\&\quad A.D(B+\overline{B})+(A+\overline{A}).B.D=A.B+A.D+B.D\end{aligned}$$

Figure 18:
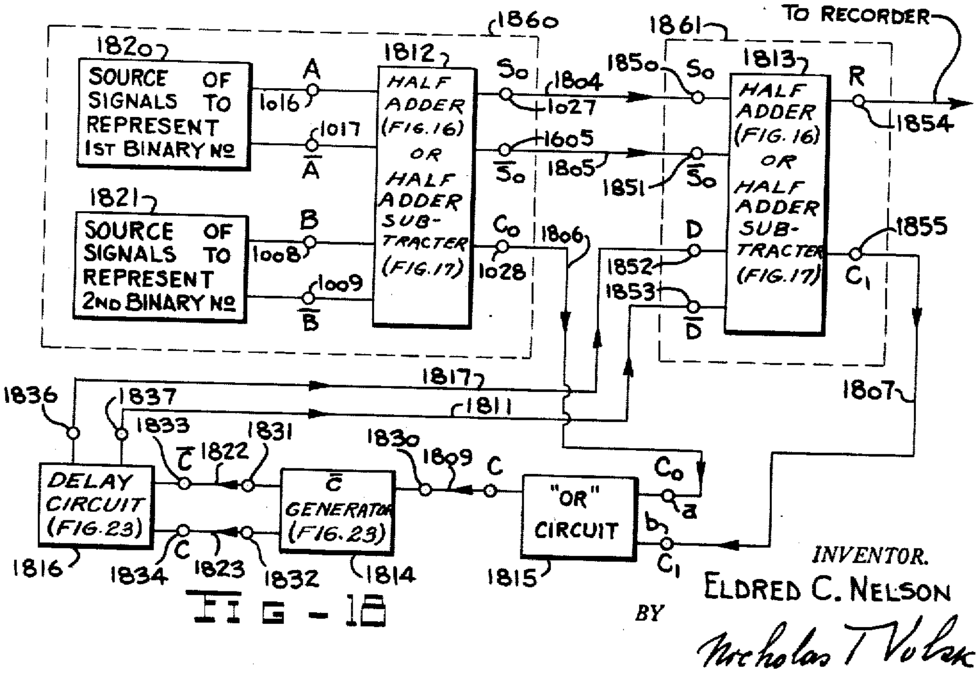
Fig. 18 is a block diagram of a complete series adder circuit.

A complete adder in block diagram form is shown in Fig. 18. The sources 1820 and 1821 are connected to the input terminals 1016, 1017, 1008, 1009 of a first half-adder section 1812, with output signals appearing at terminals 1027, 1605, 1028. As will be noted, this first grouping as indicated by block 1860 is identical to the half-adder circuit shown in Fig. 16 with the exception that no complementary carry signal circuit is included. A second half-adder 1813, as indicated by block 1861 has input terminals 1850, 1851, 1852, 1853, and output terminals 1854 and 1855. It is the same circuit as that shown in Fig. 10, with the input signals supplied from the other half-adder instead of a battery and switches. Conductor 1804 connects output terminal 1027 of the first half-adder 1812 to the input terminal 1850 of the second half-adder 1813. Likewise, conductor 1805 connects output terminal 1605 of 1812 to input terminal 1851 of 1813. The terminal 1028 of the half-adder 1812 is connected by conductor 1806 to terminal "*a*" of "or" circuit 1815 and output terminal 1855 of second half-adder 1813 is connected by conductor 1807 to input terminal "*b*" of "or" circuit 1815. This "or" circuit 1815 is identical to the one shown in Fig. 5 except that no input switching means are included. The output terminal "*s*" of "or" circuit 1815 is connected to input terminal 1830 of $\overline{C}$ generator 1814 by conductor 1809. This $\overline{C}$ generator may take the form of an inverter tube, for example. Output terminals 1831 and 1832 of the $\overline{C}$ generator are connected respectively to the input terminals 1833 and 1834 of the delay circuit 1816 by conductors 1822 and 1823, respectively. The ouput terminals 1836 and 1837 of delay circuit 1816 are connected respectively to input terminals 1852, 1853 of the second half-adder circuit 1813 by conductors 1817 and 1811, respectively.

In this figure the circuits correspond to Equations 10, 11, 12, and 13. The first half-adder combines signals A, $\overline{A}$, B, and $\overline{B}$ to give the result and carry signals $R_0$ and $C_0$ of Equations 10 and 11. $R_0$ is also generated by the first half-adder. Accordingly, the equations to be mechanized by the first half-adder are identical with those mechanized in the network of Fig. 16, with $R_0$, $\overline{R}_0$, and $C_0$ substituted for R, $\overline{R}$, and $C_+$. Therefore, four "and" circuits and two "or" circuits are required for the first half-adder, "and" circuit 19 of Fig. 16, for producing signal $\overline{C}_+$, being omitted from the first half-adder.

The second half-adder combines signals, $R_0$, $\overline{R}_0$, D, and $\overline{D}$ to produce the result and carry signals R and $C_1$, or Equations 12 and 13. $\overline{R}$ is not produced. From Equations 12 and 13, it is seen that the second half-adder requires three "and" circuits and one "or" circuit, the input signals to this half-adder being $R_0$, $\overline{R}_0$, D and $\overline{D}$. In other words, the second half-adder is equivalent to circuits 6, 7, 8 and 9 of Fig. 16, or to the network of Fig. 10. The signals D and $\overline{D}$ are obtained by adding $C_0$ and $C_1$ in the "or" circuit 1815 as shown to produce a total carry signal C, then generating the signal $\overline{C}$ complementary to C in a tube circuit, and delaying the signals C and $\overline{C}$ one binary time interval. The delayed C and $\overline{C}$ signals are called D and $\overline{D}$, respectively. The output signal of the second half-adder, R, appearing at terminal 1854 is a time varying signal representing the sum of two N-digit binary numbers. A and B are here representative of the N-digit binary numbers, and are also time varying signals. The carry digits from succeeding additions of the digit pairs being added are combined automatically so that the signal R represents the complete result. For example, if the two three-digit binary numbers 110 and 101 are added, four signals will appear in time sequence as the signal R as follows: 1, 1, 0, 1. The digit pairs are added from right to left as usual:

$$\begin{array}{r}110\\+101\\\hline 1011\end{array}$$

All carry signals are included automatically.

Figure 19:
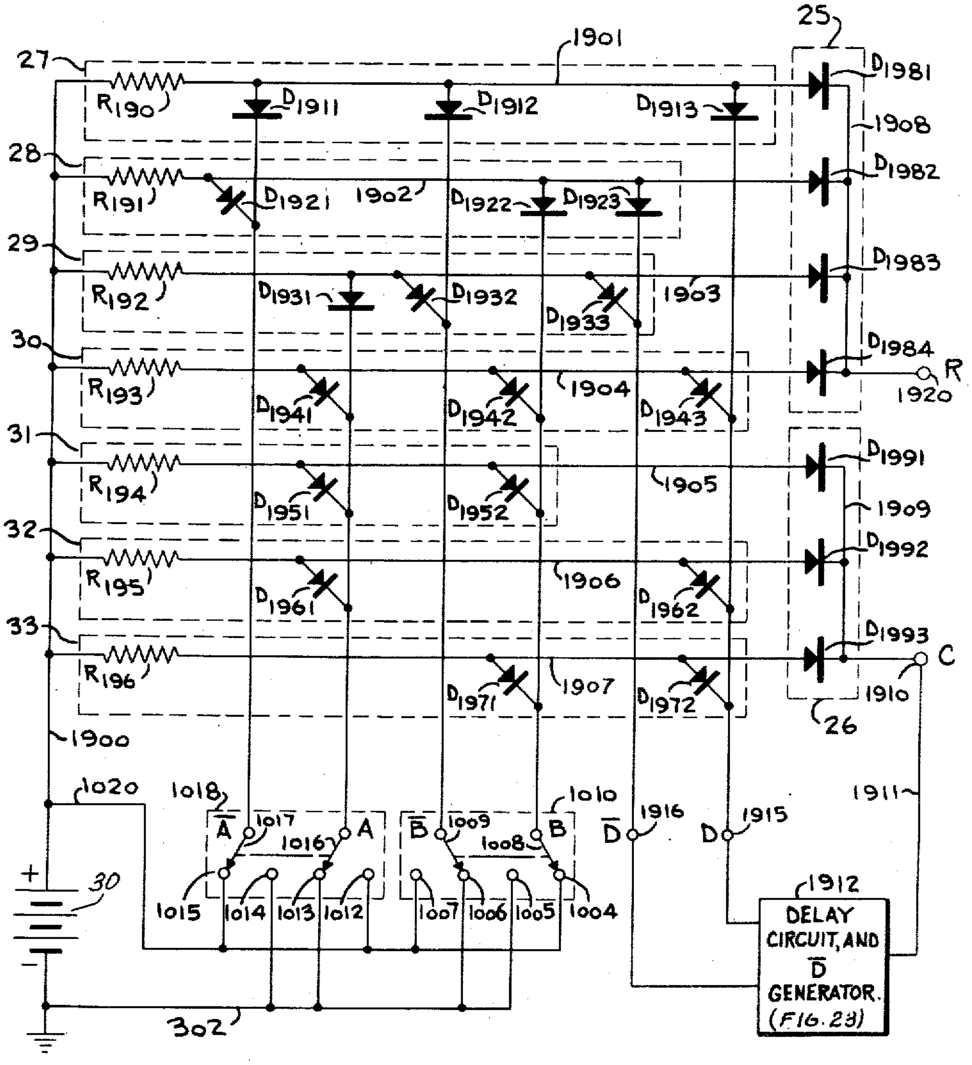
Fig. 19 is a schematic diagram of a complete series adder circuit.

Another form of the complete series adder, shown in schematic form in Fig. 19, corresponds to the Equations 16 and 18.

From Equation 16, it can be seen that the network for producing signal R requires at least four "and" circuits and at least one "or" circuit. If a single "or" circuit is utilized to perform the "logical" addition indicated by Equation 16, then this "or" circuit should have four input terminals and one output terminal. This requirement follows from the fact that Equation 16 requires the "logical" addition of four complex signal quantities.

It should be apparent, however, that the "logical" addition indicated by Equation 16 may also be performed by three two-terminal "or" circuits, or by one three-terminal "or" circuit and one two-terminal "or" circuit. Thus, where three "or" circuits are utilized, the first circuit would perform the "logical" addition of two of the complex signal quantities, the second circuit would perform the "logical" addition of the other two complex signal quantities, while the third circuit would perform the "logical" addition of the output signals of the first and second circuits. Similarly, where two circuits are utilized, the three-terminal circuit would perform the "logical" addition of three of the complex signal quantities, while the two-terminal circuit would perform the "logical" addition of the fourth complex signal quantity and the output signal of the three-terminal circuit.

In each of these arrangements for performing the "logical" addition indicated by Equation 16, the number of diodes required would be different. As a general rule, it may be stated that the number of diodes required for either an "and" circuit or an "or" circuit is equal to the number of input terminals, and therefore, to the number of signal quantities to be acted upon by the circuit. Accordingly, the single "or" circuit requires four diodes, the three "or" circuits require a total of six diodes, and the two "or" circuits require a total of five diodes. Obviously, the optimum network, both from the standpoint of number of components and network performance, is the network requiring the minimum number of diodes. In Fig. 19, therefore, the four-terminal "or" circuit is shown.

In Equation 16, four separate "logical" multiplications are indicated, each multiplication including three signal quantities. According to the basic concept of this invention, each multiplication may be performed by a three-terminal "and" circuit. On the other hand, each multiplication may also be performed by two two-terminal "and" circuits, the first performing the "logical" multiplication of two of the signal quantities, and the second performing the "logical" multiplication of the third signal quantity and the output signal of the first circuit. Again, for optimum conditions, the single three terminal "and" circuit is shown in Fig. 19.

In Equation 18, the number of possible circuit arrangements is considerably less. Three "logical" multiplications are indicated, each requiring a two-terminal "and" circuit. On the other hand, the "logical" addition indicated in Equation 18 may be performed by a single three-terminal "or" circuit, or by two two-terminal "or" circuits. In Fig. 19, the three-terminal circuit is shown.

In Fig. 19, the battery B has its negative terminal connected to negative bus 302 and its positive terminal connected to a conductor 1900. A group of parallel "and" circuits, 27, 28, 29, 30, 31, 32, 33, including a resistor $R_{190}$, diodes $D_{1911}$, $D_{1912}$, $D_{1913}$, lead 1901; a resistor $R_{191}$, diodes $D_{1921}$, $D_{1922}$, $D_{1923}$, lead 1902; a resistor $R_{192}$, diodes $D_{1931}$, $D_{1932}$, $D_{1933}$, lead 1903; a resistor $R_{193}$, diodes $D_{1941}$, $D_{1942}$, $D_{1943}$, lead 1904; a resistor $R_{194}$, diodes $D_{1951}$, $D_{1952}$, lead 1905; a resistor $R_{195}$, diodes $D_{1961}$, $D_{1962}$, lead 1906; a resistor $R_{196}$, diodes $D_{1971}$, $D_{1972}$, lead 1907; respectively, are tied at one end to conductor 1900. Leads 1901, 1902, 1903, 1904 of "and" circuit 27, 28, 29, 30, respectively, are connected to the anodes of diodes $D_{1981}$, $D_{1982}$, $D_{1983}$, $D_{1984}$, respectively, the cathodes of said diodes being connected together by a conductor 1908 to form an "or" circuit 25. The output of "or" circuit 25 appears on terminal 1920 as a signal R representing the result digit of the binary addition. Leads 1905, 1906, 1907, are connected to the anodes of diodes $D_{1991}$, $D_{1992}$, $D_{1993}$, respectively; the cathodes of these diodes being connected together by a conductor 1909 to form an "or" circuit 26. The output of "or" circuit 26 appears on terminal 1910 as a signal C representing the carry digit of the binary addition. The terminal 1910 is connected by a conductor 1911 to a delay circuit and $\overline{D}$ signal generator 1912. The output of the delay circuit and $\overline{D}$ signal generator 1912 appears on terminals 1915 and 1916. Terminal 1916 is connected to the cathodes of diodes $D_{1923}$, $D_{1933}$ while terminal 1915 is connected to the cathodes of diodes $D_{1913}$, $D_{1943}$, $D_{1962}$, $D_{1972}$. All the fixed contact points of double-pole double-throw switches 1018 and 1010 are connected in the manner shown for Fig. 10. The movable switch arm 1017 of switch 1018 is connected to the cathodes of diodes $D_{1911}$, $D_{1921}$ while the movable switch arm 1016 of switch 1018 is connected to the cathodes of diodes $D_{1931}$, $D_{1941}$, $D_{1951}$, $D_{1961}$. Movable switch arm 1009 of switch 1010 is connected to the cathodes of diodes $D_{1912}$, $D_{1932}$, while the movable switch arm 1008 is connected to the cathodes of diodes $D_{1922}$, $D_{1942}$, $D_{1952}$, $D_{1971}$.

The three signal "products," such as $A.B.D$, in the expression for R in Equation 16 means that a three-terminal "and" circuit is required. As explained in connection with Fig. 8, such a circuit only produces a high output signal when signals A, B, and D are high. Four of such three-terminal "and" circuits are required to form the four three-signal products for the R signal. These four products are then combined in a four-terminal "or" circuit to give the signal R. The expression for R shows that R is 1 only when A is 1 and B and D are 0, or when B is 1 and A and D are 0, or when D is 1 and A and B are 0, or when A and B and D are all 1. The expression for C shows that C is 1 when any two of the signals A, B, D are 1. The operation of the circuit is as follows:

"And" circuit 27 is a three-terminal "and" circuit which forms the product signal $\overline{A}.\overline{B}.D$. "And" circuit 28 forms the product signal $\overline{A}.B.\overline{D}$, while "and" circuit 29 forms the product signal $A.\overline{B}.\overline{D}$. "And" circuit 30 forms the product signal $A.B.D$. These four product signals are combined by four-terminal "or" circuit 25, to give the signal R, as given by Equation 16.

"And" circuits 31 through 33 in combination with "or" circuit 26 form the C signal from the input signals as follows: "and" circuit 31 forms the product signal $A.B$, while "and" circuit 32 forms the product signal $A.D$. "And" circuit 33 forms the product signal $B.D$. These three product signals are combined in three-terminal "or" circuit 26 to give the carry signal C, as given by Equation 18. The signals D and $\overline{D}$ are here supplied as follows. The carry signal C is fed into a tube circuit which generates the signal $\overline{C}$ complementary to C, and then C and $\overline{C}$ are passed through a delay circuit which delays them one binary time interval. D and $\overline{D}$ are the delayed C and $\overline{C}$ signals. When the next pair of digits to be added arrive as the A, B signals, D and $\overline{D}$ are fed in simultaneously.

The circuit of Fig. 18 requires 22 diodes, 12 for the first half-adder which is of the type shown in Fig. 16, but without the $\overline{C}$ circuit, 8 for the second half-adder which need not product $\overline{R}$, and 2 for the "or" gate. The circuit of Fig. 19 requires 25 diodes, 4.3+4=16 to produce R, and 3.2+3=9 to produce C.

Both of these circuits correspond to particular forms of the generalized expressions for the complete series adder. The generalized expressions can be obtained from Equations 16 and 18 in the usual manner as follows $$R=A.\overline{B}.\overline{D}.F+\overline{A}.\overline{B}.D.G+\overline{A}.\overline{B}.D.H+A.B.D.J+K$$

$$C_{+}=A.B.M+A.D.N+B.D.P+Q$$

where F. G, H, J, K, M, N, P, and Q are functions of A, $\overline{A}$, B, $\overline{B}$, D and $\overline{D}$ having the values:

$$F=1$$
$$G=1$$
$$H=1$$
$$J=1$$
$$K=0$$
$$M=1$$
$$N=1$$
$$P=1$$
$$Q=0$$

for all values of the input signals.

These circuits can also be modified to perform binary subtraction. The result digit signal R for addition is the same as that for subtraction just as was the case for half-adders, but the carry signal is altered. Just as for the adder, the function for the carry signal, C−, can be constructed by considering the combining of two half-subtracters. Let $C_0$ be the carry signal from the unit unit and $C_1$ the carry signal from the second unit.

$$C_{-}=C_0+C_1 \tag{19}$$

$$C_0=\overline{A}.B. \tag{20}$$

$$C_1=\overline{R}_0.D \tag{21}$$

$$\begin{aligned}C_{-}&=\overline{A}.B+\overline{R}_0.D=\overline{A}.\overline{B}+(\overline{A}.\overline{B}+A.B).D=\overline{A}.B+\\&\overline{A}.\overline{B}.D+A.B.D=\overline{A}.B.(D+\overline{D})+\overline{A}.\overline{B}.D+A.B.D\\&=\overline{A}.B.(D+\overline{D})+\overline{A}.B.D+\overline{A}.B.D+\overline{A}.\overline{B}.D+A.B.D\\&=\overline{A}.B.(D+\overline{D})+\overline{A}.D.(B+\overline{B})+(\overline{A}+A).B.D\\&=\overline{A}.B+\overline{A}.D+B.D\end{aligned} \tag{22}$$

Thus the function for the carry signal for subtraction given by Equation 22 differs from the function for the carry signal for addition only in that A is replaced by $\bar{A}$. The combination adder-subtracter has the same number of diodes as an adder, if the location of the add-subtract switch is chosen correctly, because the same "and" and "or" circuits may be used for both addition and subtraction, just as in Fig. 15.

Figure 20:
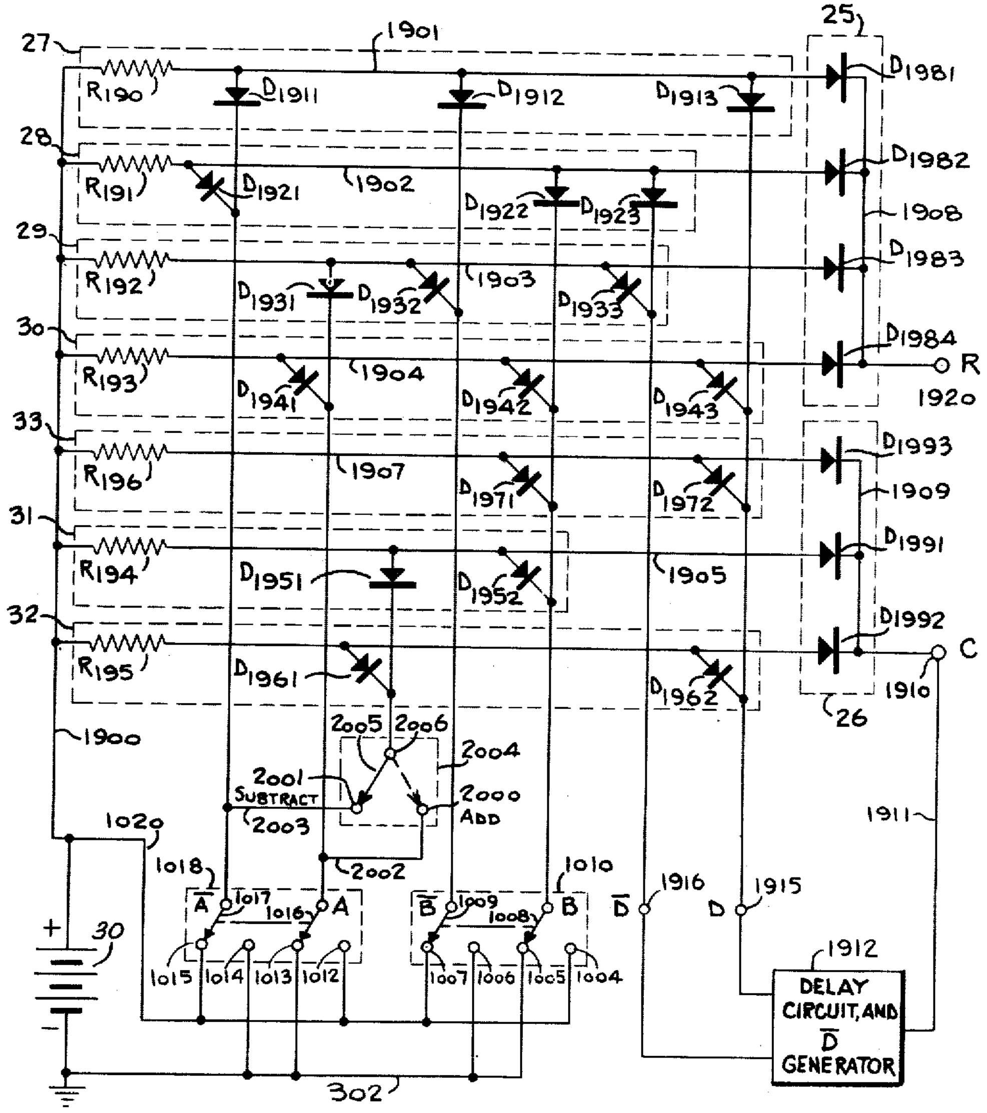
Fig. 20 is a schematic diagram of a circuit which may function as an adder or as a subtracter.

Fig. 20 shows a complete series adder-subtracter. This circuit includes the same structure as shown for the full adder in Fig. 19 with the addition of a switch 2004 and a slight revision of certain diode connections. The cathodes of diodes $D_{1951}$ and $D_{1961}$ are connected directly to movable switch arm 2005 of the switch 2004, instead of as formerly shown. The movable switch arm 2005 is adapted to connect these two diodes to either fixed contact point 2001 or fixed contact point 2000 of switch 2004. Fixed contact point 2001 is connected through a conductor 2003 to movable contact arm 1017 of switch 1018 and fixed contact point 2000 of switch 2004 is connected through a conductor 2002 to movable switch arm 1016 of switch 1018.

The operation of this circuit is as follows. When movable switch arm 2005 of switch 2004 is connected to fixed contact point 2000, the circuit is an adder. "And" circuits 27, 28, 29, 30 and "or" circuit 25 constitute the result signal network, as in Fig. 19, and perform the same operations that they did in Fig. 19. "And" circuits 31 and 32 receive input signals A, B and A, D, respectively, just as in Fig. 19. "And" circuit 33 receives signals B, D as in Fig. 19, regardless of the position of switch 2004. Thus "or" circuit 26 receives the same signals that it did in Fig. 19 and the carry signal $C_+$ is identical.

When movable switch arm 2005 of switch 2004 is connected to fixed contact point 2001, the circuit is a subtracter. "And" circuits 31 and 32 now receive signals, $\bar{A}$, B and $\bar{A}$, D, respectively, as required by Equation 22. "And" circuit 33 again receives B and D, and the outputs of "and" circuits 31, 32, and 33 are applied to "or" circuit 26 which produces carry signal $$C_-=\bar{A}.B+\bar{A}.D+B.D$$

The result signal, R, is the same in both switch positions. In both cases, the signals D and $\bar{D}$ are generated in the same way as they were generated in the adder circuit of Fig. 19.

A complete subtracter is not shown separately but its construction is apparent from Fig. 20 which includes all of the elements of the subtracter. When switch 2004 is in the subtract position, the circuit is the same as for a subtracter, no extra elements being involved. The generalized equations for the complete subtracter may be written from Equations 16 and 22 as follows:

$$R=A.\bar{B}.\bar{D}.F+\bar{A}.B.\bar{D}.G+\bar{A}.\bar{B}.D.H+A.B.D.J+K$$
$$C_-=\bar{A}.B.M+\bar{A}.D.N+B.D.P+Q$$

where F, G, H, J, K, M, N, P, and Q are functions of the input signals A, $\bar{A}$, B, $\bar{B}$, D, and $\bar{D}$ having the values $$F=1$$
$$G=1$$
$$H=1$$
$$J=1$$
$$K=0$$
$$M=1$$
$$N=1$$
$$P=1$$
$$Q=0$$

for all values of the input signals.

The generalized equations for the complete adder-subtracter are given by $$R=A.\bar{B}.\bar{D}.F+\bar{A}.B.\bar{D}.G+\bar{A}.\bar{B}.D.H+A.B.D.J+K$$
$$C=a(A.B.M+A.D.N+B.D.P+Q)+\bar{a}(\bar{A}.B.S+\bar{A}.D.T+B.D.V+W)$$

where $$a=1$$
$$\bar{a}=0$$

for addition and $$a=0$$
$$\bar{a}=1$$

for subtraction and where F, G, H, J, K, M, N, P, Q, S, T, V, and W are functions of the input signals A, $\bar{A}$, B, $\bar{B}$, D, and $\bar{D}$ having the values $$F=1$$
$$G=1$$
$$H=1$$
$$J=1$$
$$K=0$$
$$M=1$$
$$N=1$$
$$P=1$$
$$Q=0$$
$$S=1$$
$$T=1$$
$$V=1$$
$$W=0$$

for all values of the input signals.

The complete adders and subtracters may be constructed to supply the complementary output signals. The circuit functions may be derived by taking the complements of the expressions for R, $C_-$ and $C_+$ as follows.

(23) $$\bar{R}=(\bar{A}+B+D).(A+\bar{B}+D).(A+B+\bar{D}).(\bar{A}+\bar{B}+\bar{D})$$
$$=(\bar{A}.A+\bar{A}.\bar{B}+\bar{A}.D+B.A+B.\bar{B}+B.D+D.A+D.\bar{B}+D.D).(A.\bar{A}+A.\bar{B}+A.\bar{D}+B.\bar{A}+B.\bar{B}+B.\bar{D}+\bar{D}.\bar{A}+\bar{D}.\bar{B}+\bar{D}.\bar{D})$$
$$=(\bar{A}.\bar{B}+\bar{A}.D+A.B+B.D+A.D+\bar{B}.D+D).(A.\bar{B}+A.\bar{D}+B.\bar{A}+B.\bar{D}+\bar{D}.\bar{A}+\bar{D}.\bar{B}+\bar{D})$$
$$=(\bar{A}.\bar{B}+D+A.B).(A.\bar{B}+\bar{D}+B.\bar{A})$$
$$=\bar{A}.\bar{B}.\bar{D}+A.B.\bar{D}+A.\bar{B}.D+\bar{A}.B.D$$

(24) $$\bar{C}_+=(A+B).(A+D).(B+D)$$
$$=(\bar{A}.\bar{A}+\bar{A}.\bar{D}+\bar{A}.\bar{B}+\bar{B}.\bar{D}).(\bar{B}+\bar{D})$$
$$=(\bar{A}+\bar{A}.\bar{D}+\bar{A}.\bar{B}+\bar{B}.\bar{D}).(\bar{B}+\bar{D})$$
$$=\bar{A}.\bar{B}+\bar{A}.\bar{D}.\bar{B}+\bar{A}.\bar{B}.\bar{D}+\bar{B}.\bar{D}.\bar{B}+\bar{A}.\bar{D}+\bar{A}.\bar{D}.\bar{D}+\bar{A}.\bar{B}.\bar{D}+\bar{B}.\bar{D}.\bar{D}$$
$$=\bar{A}.\bar{B}+\bar{A}.\bar{B}.\bar{D}+\bar{A}.\bar{D}+\bar{B}.\bar{D}$$
$$=\bar{A}.\bar{B}.(D+\bar{D})+\bar{A}.\bar{B}.\bar{D}+\bar{A}.D+B.D$$
$$=\bar{A}.\bar{B}.D+\bar{A}.\bar{B}.\bar{D}+\bar{A}.\bar{B}.\bar{D}+\bar{A}.\bar{D}+\bar{B}.\bar{D}$$
$$=\bar{A}.\bar{B}.D+\bar{A}.\bar{B}.\bar{D}+\bar{A}.\bar{D}+\bar{B}.\bar{D}$$
$$=\bar{A}.\bar{B}.(D+\bar{D})+\bar{A}.\bar{D}+\bar{B}.\bar{D}$$
$$=\bar{A}.\bar{B}+\bar{A}.\bar{D}+\bar{B}.\bar{D}$$

(25) $$\bar{C}_-=(A+\bar{B}).(A+\bar{D}).(\bar{B}+\bar{D})$$
$$=(A+A.\bar{D}+\bar{B}.A+\bar{B}.\bar{D}).(\bar{B}+\bar{D})$$
$$=A.\bar{B}+A.\bar{D}+B.\bar{D}$$

Figure 21:
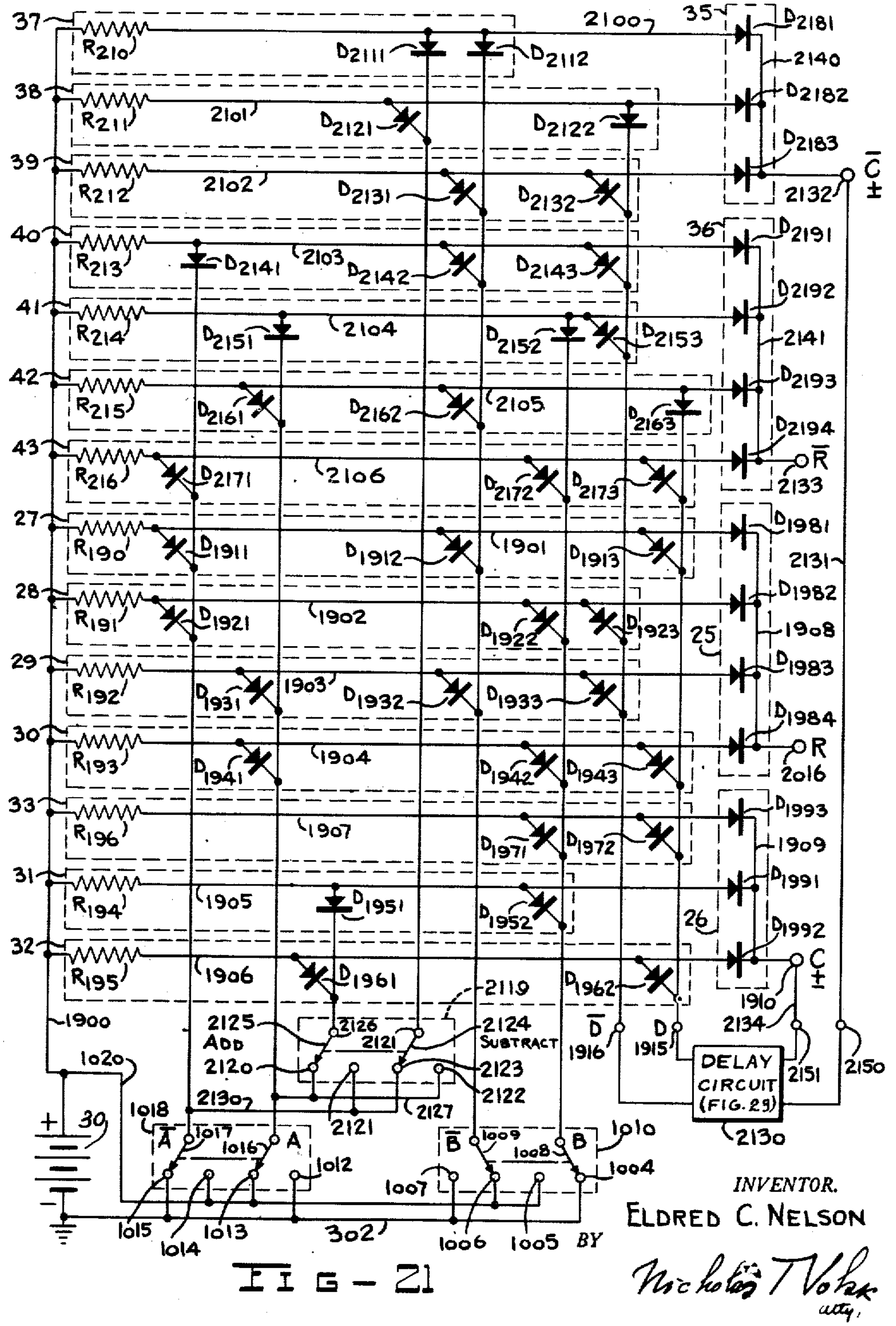
Fig. 21 is a schematic diagram of a circuit which may function either as an adder or a subtracter, and which produces the complementary output signals.

The circuits corresponding to these functions are all included in the circuit of Fig. 21 which shows a complete adder-subtracter for supplying the complementary output signals. This circuit contains a majority of the structure shown in the complete adder circuit of Fig. 19. In addition to the structure shown in Fig. 19, a group of paralleled "and" circuits 37, 38, 39, 40, 41, 42, 43 comprising a resistor $R_{210}$, diodes $D_{2111}$, $D_{2112}$, lead 2100; a resistor $R_{211}$, diodes $D_{2121}$, $D_{2122}$, lead 2101; a resistor $R_{212}$, diodes $D_{2131}$, $D_{2132}$, lead 2102; a resistor $R_{213}$, diodes $D_{2141}$, $D_{2142}$, $D_{2143}$, lead 2103; a resistor $R_{214}$, diodes $D_{2151}$, $D_{2152}$, $D_{2153}$, lead 2104; a resistor $R_{215}$, diodes $D_{2161}$, $D_{2162}$, $D_{2163}$, lead 2105; and a resistor $R_{216}$, diodes $D_{2171}$, $D_{2172}$, $D_{2173}$, lead 2106, respectively, are all connected to positive bus 1900. Leads 2100, 2101, 2102 of "and" circuits 37, 38, 39 are connected to the anodes of diodes $D_{2181}$, $D_{2182}$, $D_{2183}$, respectively, with the cathodes of these diodes being connected together by a conductor 2140 to form "or" circuit 35. The output of "or" circuit 35 appears as a complementary carry signal $C_{+}$ on terminal 2132. Leads 2103, 2104, 2105, 2106 of "and" circuits 40, 41, 42, 43, are connected to the anodes of diodes $D_{2191}$, $D_{2192}$, $D_{2193}$, $D_{2194}$, respectively, with the cathodes of said diodes being connected together by a conductor 2141 to form "or" circuit 36. The output of "or" circuit 36 appears on terminal 2133 as a complementary result signal $\overline{R}$. Terminals 2132 and 1910 are connected to the input terminals 2150, 2151 of delay circuit 2130 by conductors 2131 and 2134, respectively. Output terminal 1916 of delay circuit 2130 is connected to the cathodes of diodes $D_{2122}$, $D_{2132}$, $D_{2143}$, and $D_{2153}$, in addition to those diodies connected as described for Fig. 19. Cathodes of additional diodes $D_{2163}$, $D_{2173}$ are connected to output terminal 1915 of delay circuit 2130. The fixed contact points of both switches 1018 and 1010 are connected as described for Fig. 19. The cathodes of diodes $D_{2141}$, and $D_{2171}$ are connected to movable switch arm 1017 of switch 1018, and the cathodes of diodes $D_{2151}$, and $D_{2161}$ are connected to the movable switch arm 1016 of switch 1018 in addition to those diode connections already described. The cathodes of diodes $D_{2112}$, $D_{2131}$, $D_{2142}$, $D_{2162}$, are connected to movable switch arm 1009 of switch 1010, and the cathodes of diodes $D_{2152}$, $D_{2172}$ are connected to movable switch arm 1008 of switch 1010 in addition to those diode connections described for Fig. 19. An additional double-pole double-throw switch 2119, comprising fixed contact points 2120, 2121, 2122, 2123 and movable switch arms 2125 and 2124, is included in this circuit. Fixed contact points 2120 and 2122 of switch 2119 are connected to movable switch arm 1016 of switch 1018, while fixed contact points 2121 and 2123 of switch 2119 are connected to movable switch arm 1017 of switch 1018. Movable switch arm 2125 of switch 2119 is connected to the cathodes of diodes $D_{1951}$, and $D_{1961}$, while the movable switch arm 2124 of switch 2119 is connected to the cathodes of diodes $D_{2111}$ and $D_{2121}$. The movable switch arm 2125 of switch 2119 is adapted to contact either fixed contact point 2120 or 2121, while movable switch arm 2124 is adapted to contact simultaneously with movable switch arm 2125 either fixed contact point 2123 or 2122.

The operation of this circuit is as follows: The result signal, R, of Equation 16 is produced by "and" circuits 27, 28, 29, 30, and "or" circuit 25, as in the circuits of Figs. 19 and 20. The carry signals $C_{+}$ and $C_{-}$ are produced by "and" circuits 31, 32, 33, and "or" circuit 26, just as in the circuit of Fig. 20. Here, the switch 2004 has been replaced by the half of switch 2119 consisting of movable switch arm 2125 and the associated contact points. When movable switch arm 2125 is connected to fixed contact point 2120 the carry signal for addition, $C_{+}$ is produced at terminal 1910. When movable switch arm 2125 is connected to fixed contact point 2121, the carry signal for subtraction, $C_{-}$, is produced at terminal 1910. The complementary result signal, $\overline{R}$, is produced as follows: "And" circuits 40, 41, 42, and 43 produce output signals $\overline{A}.\overline{B}.\overline{D}$, $A.B.\overline{D}$, $A.\overline{B}.D$, and $\overline{A}.B.D$, respectively. These signals are fed into "or" circuit 36 which produces their "logical" sum at terminal 2133 as $\overline{R}$. The complementary carry signals, $\overline{C}_{+}$ and $\overline{C}_{-}$, are produced as follows: "And" circuit 39 produces the signal $\overline{B}.\overline{D}$ which is common to both $\overline{C}_{+}$ and $\overline{C}_{-}$. When movable switch arm 2124 of switch 2119 is connected to fixed contact point 2123, "and" circuits 37 and 38 produce signals $\overline{A}.\overline{B}$ and $\overline{A}.\overline{D}$. respectively. These signals are combined with the output signal from "and" circuit 39 in "or" circuit 35 to produce the complementary carry signal for addition, $\overline{C}_{+}$, as given by Equation 24, at terminal 2123. When movable switch arm 2124 of switch 2119 is connected to fixed contact point 2122, "and" circuits 37 and 38 receive the A signal rather than $\overline{A}$ and hence produce signals $A.\overline{B}$ and $A.\overline{D}$, respectively. As before, these signals are combined with the output signal of "and" circuit 39 in "or" circuit 35. The output of "or" circuit 35 at terminal 2132 is the complementary carry signal for subtraction, $\overline{C}_{-}$, as given by Equation 25. The outputs of "or" circuits 26 and 35, C and $\overline{C}$, are fed into a delay circuit which delays these signals one binary time interval to produce signals D and $\overline{D}$. It will be noted that no tube circuits are required in this case to produce $\overline{C}$.

The circuits for adders and subtracters which supply complementary signals are not shown separately. An adder circuit is identical to the circuit of Fig. 21 when the switch 2119 is in the add position. The generalized equations for these circuits and for the adder-subtracter can be derived from Equations 16, 18, 22, 23, 24, and 25. The circuits for R and $\overline{R}$ are required for all three circuits, and the equations are written as follows.

$$R=A.\overline{B}.\overline{D}.F_1+\overline{A}.B.\overline{D}.G_1+\overline{A}.\overline{B}.D.H_1+9.B.D.J_1+K_1$$

$$\overline{R}=\overline{A}.\overline{B}.\overline{D}.F_2+A.B.\overline{D}.G_2+A.\overline{B}.D.H_2+\overline{A}.B.D.J_2+K_2$$

where $F_1$, $F_2$, $G_1$, $G_2$, $H_1$, $H_2$, $J_1$, $J_2$, $K_1$, and $K_2$ are functions of A, $\overline{A}$, B, $\overline{B}$, D, and $\overline{D}$, having the values:

$$F_1=1$$
$$G_1=1$$
$$H_1=1$$
$$J_1=1$$
$$K_1=0$$
$$F_2=1$$
$$G_2=1$$
$$H_2=1$$
$$J_2=1$$
$$K_2=0$$

for all values of the input signals.

The adder circuit requires the additional circuits for $C_{+}$ and $\overline{C}_{+}$, the equations being as follows.

$$C_{+}=A.B.M_1+A.D.N_1+B.D.P_1+Q_1$$

$$\overline{C}_{+}=\overline{A}\ \overline{B}\ M_2+\overline{A}\ \overline{D}\ N_2+\overline{B}\ \overline{D}\ P_2=Q_2$$

where $M_1$, $M_2$, $N_1$, $N_2$, $P_1$, $P_2$, $Q_1$, and $Q_2$ are functions of the signals A, $\overline{A}$, B, $\overline{B}$, D and $\overline{D}$ having the values:

$$M_1=1$$
$$N_1=1$$
$$P_1=1$$
$$Q_1=0$$
$$M_2=1$$
$$N_2=1$$
$$P_2=1$$
$$Q_2=0$$

for all values of the input signals.

The adder-substracter circuit has, in addition to the R and $\overline{R}$ circuits, the $C_{+}$, $\overline{C}_{+}$, $C_{-}$, and $\overline{C}_{-}$ circuits and switches between $C_{+}$ and $C_{-}$ and between $\overline{C}_{+}$ and $\overline{C}_{-}$. As seen in Fig. 21, it may be possible in certain circuits to use the same diodes to form the $\overline{C}_+$ and $\overline{C}_-$ signals. The equations for the carry circuits are as follows.

$$C=a(A.B.M_1+A.D.N_1+B.D.P_1+Q_1)+\overline{a}(\overline{A}.B.M_3+A.D.N_3+B.D.P_3+Q_3)$$

$$\overline{C}=a(\overline{A}.\overline{B}.M_2+\overline{A}.\overline{D}.N_2+\overline{B}.\overline{D}.P_2+Q_2)+\overline{a}(A.\overline{B}.M_4+A.\overline{D}.N_4+\overline{B}.\overline{D}.P_4+Q_4)$$

where $$a=1$$
$$\overline{a}=0$$

for addition and $$a=0$$
$$\overline{a}=1$$

for subtraction, and where $M_1$, $M_2$, $M_3$, $M_4$, $N_1$, $N_2$, $N_3$, $N_4$, $P_1$, $P_2$, $P_3$, $P_4$, $Q_1$, $Q_2$, $Q_3$, and $Q_4$ are functions of the signals A, $\overline{A}$, B, $\overline{B}$, D, $\overline{D}$, having the values given above in the adder and subtracter equations.

Each of the series circuits discussed thus far includes a delay circuit and a connection through that delay circuit from the carry signal output to the D and $\overline{D}$ input terminals. Let the term "series" circuit be restricted to this type of circuit configuration, including a delay circuit connecting the carry signal output to the D and $\overline{D}$ inputs. It is useful to be able to refer to the circuits which have been discussed without including the delay circuit. The term "full" adder will be used to refer to a circuit of the type shown in Figs. 18 and 19 where the delay circuit is omitted. To restate this terminology: a "half" adding or subtracting circuit is a device of the character shown in Figs. 10 through 17, having four input terminals to receive two independent input signal variables, and having two to four output terminals at which two independent output signal variables are produced, representing the result and carry digits of a binary addition or subtraction of the digits represented by the two independent input signal variables; a "full" adding or subtracting circuit is a device of the character shown in Figs. 18 through 21, having six input terminals to receive three independent input signal variables, and having two to four output terminals at which two independent output signal variables are produced, representing the result and carry digits of a binary addition or subtraction of the digits represented by the three independent input signal variables; a "series" adding or subtracting circuit is a "full" adding or subtracting circuit which includes in addition a delay circuit and connections from the carry signal output through the delay circuit to the input of the series circuit, whereby the delayed carry signal acts as one of the three independent input signal variables.

"PARALLEL" ADDING AND SUBTRACTING CIRCUITS

It is possible to combine half-adders and full-adders to form a parallel adder. A parallel adder adds two N-digit numbers, all N digits simultaneously and presents the sum as $N+1$ output signals at $N+1$ different output terminals. By combining half-subtracters and full-subtracters a parallel subtracter can be formed, and similarly half and full-adder-subtracters can be combined to form a parallel adder-subtracter. Delay circuits are not used in parallel circuits, since the result signals must appear simultaneously. The parallel circuits are composed of "full" adding or subtracting circuits as opposed to "series" adding or subtracting circuits, observing the distinction in terminology explained above.

Figure 22:
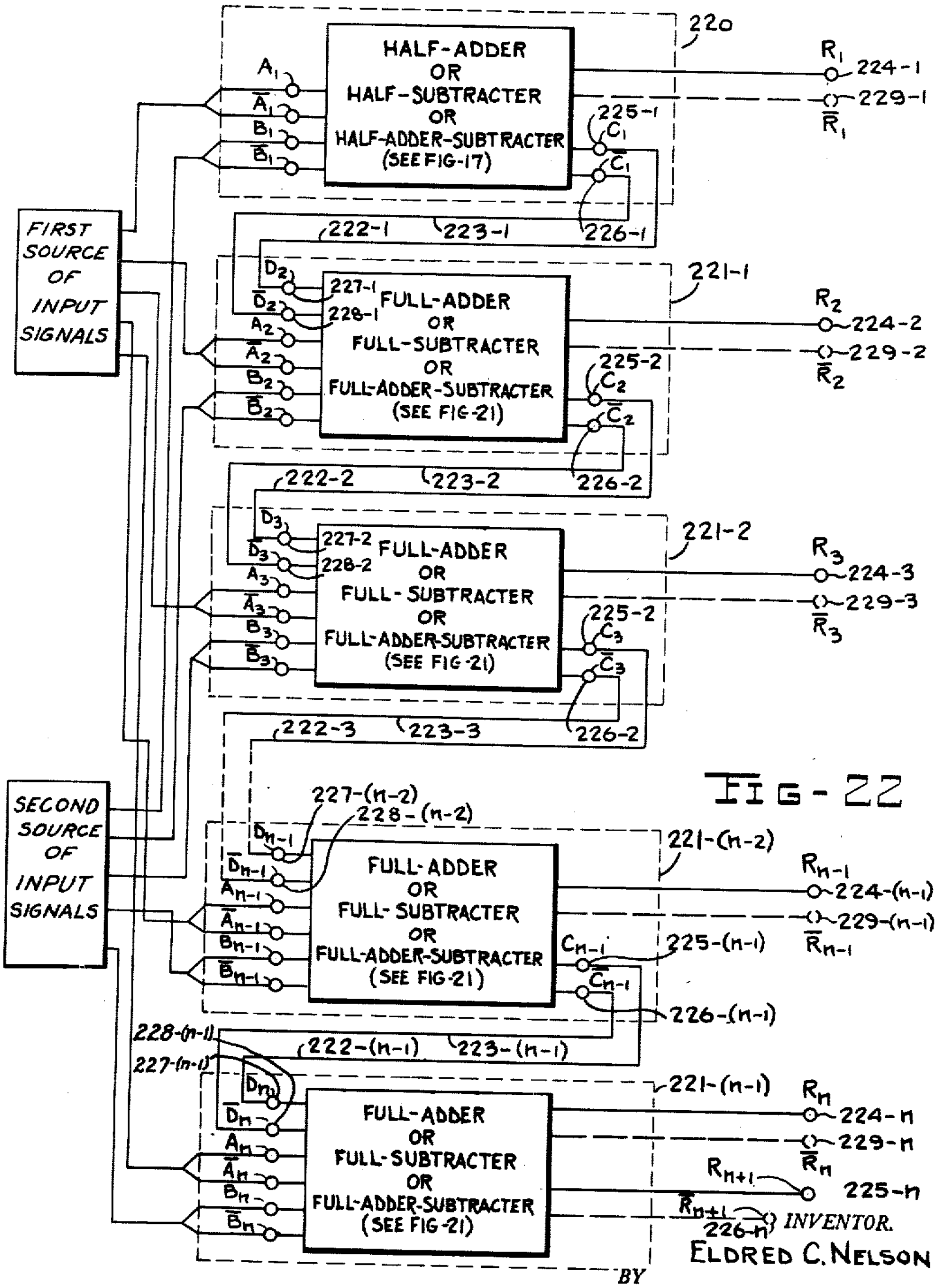
Fig. 22 is a block diagram of a complete parallel adder.

A parallel circuit suitable for adding or subtracting any two N-digit binary numbers is shown in Fig. 22. It consists of one half-adder or half-subtracter, or half adder-subtracter, and a plurality of either full adders or full subtracters or full adder-subtracters. These component circuits may be of the type which supply the complementary result and carry signals or tube circuits may be used to supply the complements of the output signals, if desired. In this figure, the complementary carry signal networks are assumed to be present; the complementary result signal output terminal is shown dotted to indicate that it is optional. Assuming that the complementary result signals are not desired, the block indicated by bracket 220 may be considered to consist either of the structure shown in Fig. 10 for the half-adder with a complementary carry digit network added, or the structure shown in Fig. 12 of the half-subtracter with a complementary carry digit network added, or the structure shown in Fig. 17 for the half adder-subtracter with the complementary result signal omitted. The plurality of blocks as indicated by 221–1, 221–2 . . . 221–($n-1$) may be considered to consist of the structures shown in either Fig. 18 or Fig. 19 for the full adder with the addition of the complementary carry signal, or the structure shown in either Fig. 20 or Fig. 21 of the full adder-subtracter, or the subtracter circuit contained in the circuits of Fig. 20 or 21. If the complementary result signals are to be generated, a complementary result signal network must, of course, be added to each circuit. The output signals from the circuit 220, appearing at terminals 225–1 and 226–1, are fed into the input terminals 227–1, 228–1 of the circuit 221–1 by conductors 222–1 and 223–1, respectively. In turn, the primary and complementary output carry signals appearing at terminals 225–2 and 226–2 of circuit 221–1 are fed to the input terminals 227–2 and 228–2 of the circuit 221–2 by conductors 222–2 and 223–2, respectively. The same order of connection between the successive circuits 221–2, 221–3 . . . 221–($n-2$), 221–($n-1$) is followed throughout as indicated for the connections between 221–1 and 221–2. The result signals of the individual circuits, $R_1$, $R_2$, $R_3$ . . . $R_n$ will appear at terminals 224–1, 224–2, 224–3 . . . 224–($n-1$), 224–($n$). The primary carry signal which forms part of the result is denoted $R_{n+1}$ and appears at terminal 225–($n$) of the final circuit, 221–($n-1$). If the complementary result signals are to be generated, these signals, $\overline{R}_1$, $\overline{R}_2$, $\overline{R}_3$ . . . $\overline{R}_n$, will appear at terminals 229–1, 229–2, 229–3 . . . 229–$n$. The complement of $R_{n+1}$, $\overline{R}_{n+1}$, is produced by the complementary carry signal network of the final circuit, 221–($n-1$), at terminal 226–$n$.

The operation of the circuit is as follows, considering first an adder circuit; a subtracter circuit will operate identically. The digits to be added are fed in pairs to the pairs of A and B terminals at the left. The first pair of signals, $A_1$ and $B_1$, are fed into a half-adder circuit, as indicated by block 220, which forms the result and carry signals, $R_1$ and $C_1$, and the complement of $C_1$, $\overline{C}_1$. Signals $C_1$ and $\overline{C}_1$ are fed into the second circuit, 221–1, which is a full adder. This second circuit adds signals $A_2$ and $B_2$ and the carry signal, $C_1$, from the sum of the first pair of digits. It produces $R_2$, $C_2$, and $\overline{C}_2$. $C_2$ and $\overline{C}_2$ are fed into the third circuit, 221–2, which is also a full-adder, and so forth up to the last or $(N-1)$th full adder circuit, 227–($n-1$). This last full adder circuit produces the result digit $R_n$ of the addition of the three digits, $A_n$, $B_n$, and the carry digit of the previous addition $C_{n-1}$. The final carry digit is called $R_{n+1}$ and is presented as the final digit of the sum. A sample operation will be carried through to illustrate the operation of a parallel adder. Suppose it is desired to add the two three-digit binary numbers 110 and 101 using a 3 digit parallel adder.

$$\begin{array}{rr} & 110 \\ & +101 \\ \text{Sum} & \overline{1011} \end{array}$$

In a series adder this would be carried out in four binary time intervals as discussed above, first adding 1+0 to give 1, carry 0, next adding 0+1 to give 1, and adding in the previous carry of 0, etc. In a parallel adder the addition is carried out simultaneously, but it is necessary to use one half-adder and two full-adders. The applied signals are the three digit pairs: 10, 01, 11, of 110 and 101 reading from right to left in each number. The first digit pair is 01, taking the zero as the last digit of 110 and 1 as the last digit of 101, etc. Now let A correspond to the first digit of a digit pair and B to the second, then:

$$A_1=1$$
$$B_1=0$$
$$A_2=0$$
$$B_2=1$$
$$A_3=1$$
$$B_3=1$$

The half-adder gives the following outputs in response to input signals $A_1$, $\overline{A}_1$, $B_1$ and $\overline{B}_1$:

$$R_1=1$$
$$C_1=0$$
$$\overline{C}_1=1$$

as predicted by the rules of binary addition. $C_1$, $\overline{C}_1$, $A_2$, $\overline{A}_2$, $B_2$ and $\overline{B}_2$ combined in the first full-adder to give:

$$R_2=1$$
$$C_2=0$$
$$\overline{C}_2=1$$

$C_2$, $\overline{C}_2$, $A_3$, $\overline{A}_3$, $B_3$, and $\overline{B}_3$ are combined in the second full-adder to give:

$$R_3=0$$
$$C_3=1$$

Now $C_3$, since it is the last signal, is fed out of the adder as a "result" signal. It may be denoted as $R_4$. It should be noted that no necessity exists for delay lines in a parallel adder, as all operations take place during the same binary time interval.

Since the entire operation must take place in one time interval, a limitation on the number of circuits which may be cascaded in a parallel adder is the length of time it takes for a signal applied as $A_1$ or $B_1$ to reach the $(N-1)$th circuit. In this regard, the circuits of this invention which employ germanium crystal diodes have a marked advantage over the equivalent tube circuits, because of the negligible delay introduced by the crystal diode circuits.

To write the generalized equations which define the class of parallel adder circuits, it is simplest to use a series of equations, each representing one of the half or full adder circuits. The input signals, D and $\overline{D}$ of each circuit are written in terms of the carry signals of the previous circuit. The carry signal of the previous circuit is given in terms of the A, B signals applied to that circuit and the carry digit from the circuit previous to that, etc. In this way all of the possible parallel adder circuits are precisely defined, but without excessively cumbersome equations. The equations for the class of parallel adders which generate only the primary result signal, R, are as follows:

$$R_1=A_1.\overline{B}_1.F_1+\overline{A}_1.B_1.G_1+K_1$$
$$C_1=A_1.B_1.M_1+S_1$$
$$\overline{C}_1=(\overline{A}_1+\overline{B}_1).M_1''+S_1''$$
$$R_2=A_2.\overline{B}_2.\overline{C}_1.F_2+\overline{A}_2.B_2.\overline{C}_1.G_2+\overline{A}_2.\overline{B}_2.C_1.H_2+A_2.B_2.C_1.J_2+K_2$$
$$C_2=A_2.B_2.M_2+A_2.C_1.P_2+B_2.C_1.Q_2+S_2$$
$$\overline{C}_2=\overline{A}_2.\overline{B}_2.M_2''+\overline{A}_2.\overline{C}_1.P_2''+\overline{B}_2.\overline{C}_1.Q_2''+S_2''$$
$$R_3=A_3.\overline{B}_3.\overline{C}_2.F_3+\overline{A}_3.B_3.\overline{C}_2.G_3+\overline{A}_3.\overline{B}_3.C_2.H_3+A_3.B_3.C_2.J_3+K_3$$
$$C_3=A_3.B_3.M_3+A_3.C_2.P_3+B_3.C_2.Q_3+S_3$$
$$\overline{C}_3=\overline{A}_3.\overline{B}_3.M_3''+\overline{A}_3.\overline{C}_2.P_3''+\overline{B}_3.\overline{C}_2.Q_3''+S_3''$$

.
.
.

$$R_n=A_n.\overline{B}_n.\overline{C}_{n-1}.F_n+\overline{A}_n.B_n.\overline{C}_{n-1}.G_n+\overline{A}_n.\overline{B}_n.C_{n-1}.H_n+A_n.B_n.C_{n-1}.J_n+K_n$$
$$R_{n+1}=A_n.B_n.M_n+A_n.C_{n-1}.P_n+B_n.C_{n-1}.Q_n+S_n$$
$$\overline{R}_{n+1}=\overline{A}_n.\overline{B}_n.M_n''+\overline{A}_n.\overline{C}_{n-1}.P_n''+\overline{B}_n.\overline{C}_{n-1}.Q_n''+S_n''$$

where $F_m$, $G_m$, $H_m$, $J_m$, $K_m$, $M_m$, $P_m$, $Q_m$, $M_m''$, $P_m''$, $Q_m''$, and $S_m''$ are functions of the input signals $A_m$, $\overline{A}_m$, $B_m$, $\overline{B}_m$, $C_{m-1}$ and $\overline{C}_{m-1}$, having the values $$F_m=F_1, F_2, \ldots F_n=1$$
$$G_m=G_1, G_2, \ldots G_n=1$$
$$H_m=H_1, H_2, \ldots H_n=1$$
$$J_m=J_1, J_2, \ldots J_n=1$$
$$K_m=K_1, K_2, \ldots K_n=0$$
$$M_m=M_1, M_2, \ldots M_n=1$$
$$P_m=P_1, P_2, \ldots P_n=1$$
$$Q_m=Q_1, Q_2, \ldots Q_n=1$$
$$S_m=S_1, S_2, \ldots S_n=0$$
$$M_m''=M_1'', M_2'', \ldots M_n''=1$$
$$P_m''=P_1'', P_2'', \ldots P_n''=1$$
$$Q_m''=Q_1'', Q_2'', \ldots Q_n''=1$$
$$S_m''=S_1'', S_2'', \ldots S_n''=1$$

for all values of the input signals.

Here it is to be understood that in the equation for $R_2$, the expressions for $C_1$ and its complement $\overline{C}_1$ in terms of $A_1$, $\overline{A}_1$, $B_1$, and $\overline{B}_1$ may be substituted to give $R_2$ in terms of the $A_1$, $B_1$ input signals only. To get the expressions for $R_3$, $R_4$, . . . $R_n$, $R_{n+1}$ in terms of the A, B signals, a similar process may be carried out. It is more convenient, however, to express the equations for the parallel adder as they appear above, with the substitutions left implicit. This implicit form is just as precise as the more complex form in which the substitutions for the C signals are carried out. All possible parallel adders may be directly obtained from the equations above by different choices of $F_m$, $G_m$, $H_m$, $J_m$, $K_m$, $M_m$, $P_m$, $Q_m$, $S_m$, $M_m''$, $P_m''$, $Q_m''$, and $S_m''$, and the use of the identities (5), (6), and (7).

A parallel subtracter simply involves the use of half and full subtracters in the place of adders. The equations for the parallel subtracter may thus be written in terms of the half and full subtracter equations. Since the R functions for the adder and subtracter are identical, $R_1$, $R_2$, . . . $R_n$ will be the same for the parallel adder and subtracter. The only difference is in the carry signals which are given in generalized form for the subtracter as $$C_1=\overline{A}_1.B_1.M'+S_1'$$
$$\overline{C}_1=(A_1+\overline{B}_1).M_1'''+S_1'''$$
$$C_2=\overline{A}_2.B_2.M_2'+\overline{A}_2.C_1.P_2'+B_2.C_1.Q_2'+S_2'$$
$$\overline{C}_2=A_2.\overline{B}_2.M_2'''+A_2.\overline{C}_1.P_2'''+\overline{B}_2.\overline{C}_1.Q_2'''+S_2'''$$
$$C_3=\overline{A}_3.B_3.M_3'+\overline{A}_3.C_2.P_3'+B_3.C_2.Q_3'+S_3'$$
$$\overline{C}_3=A_3.\overline{B}_3.M_3'''+A_3.\overline{C}_2.P_3'''+\overline{B}_3.\overline{C}_2.Q_3'''+S_3'''$$

.
.
.

$$R_{n+1}=\overline{A}_n.B_n.M_n+\overline{A}_n.C_{n-1}.P_n+B_n.C_{n-1}.Q_n+S_n$$
$$\overline{R}_{n+1}=A_n.\overline{B}_n.M_n'''+A_n.\overline{C}_{n-1}.P_n'''+\overline{B}_n.\overline{C}_{n-1}.Q_n'''+S_n'''$$

where $M_m'$, $P_m'$, $Q_m'$, $S_m'$, $M_m'''$, $P_m'''$, $Q_m'''$, and $S_m'''$ are functions of the signals $A_m$, $\overline{A}_m$, $B_m$, $\overline{B}_m$, $C_{m-1}$, and $\overline{C}_{m-1}$ having the values:

$$M_m'=M_1', M_2', \ldots M_n'=1$$
$$P_m'=P_1', P_2', \ldots P_n'=1$$
$$Q_m'=Q_1', Q_2', \ldots Q_n'=1$$

$$S_m'=S_1', S_2', \ldots S_n'=0$$
$$M_m'''=M_1''', M_2''', \ldots M_n'''=1$$
$$P_m'''=P_1''', P_2''', \ldots P_n'''=1$$
$$Q_m'''=Q_1''', Q_2''', \ldots Q_n'''=1$$
$$S_m'''=S_1''', S_2''', \ldots S_n'''=0$$

for all values of the inputs signals.

The parallel adder-subtracter requires a group of full adder-subtracters in place of the full adders. The individual full adder-subtracter units are each supplied with a switch. The equations for the R signals are the same as for the adder, and the carry signal equations are given by $$C_1=A(A_1.B_1.M_1+S_1)+\bar{a}(\bar{A}_1.B_1.M_1'+S_1')$$
$$\bar{C}_1=a(\bar{A}_1+\bar{B}_1).M_1''+S_1''+\bar{a}(\bar{A}_1+\bar{B}_1).M_1'''+S_1'''$$
$$C_2=a(A_2.B_2.M_2+A_2.C_1.P_2+B_2.C_1.Q_2+S_2) + \bar{a}(\bar{A}_2.B_2.M_2'+\bar{A}_2.C_1.P_2'+B_2.C_1.Q_2'+S_2')$$
$$\bar{C}_2=a(\bar{A}_2.\bar{B}_2.M_2''+\bar{A}_2.\bar{C}_1.P_2''+\bar{B}_2.\bar{C}_1.Q_2''+S_2'') +\bar{a}(A_2.\bar{B}_2.M_2'''+A_2.\bar{C}_1.P_2'''+\bar{B}_2.\bar{C}_1.Q_2'''+S_2''')$$

.
.
.
.

$$R_{n+1}=a(A_n.B_n.M_n+A_n.C_{n-1}.P_n+B_n.C_{n-1}.Q_n+S_n) +\bar{a}(\bar{A}_n.B_n.M_n+A_n.C_{n-1}.P_n+B_n.C_{n-1}.Q_n+S_n)$$

where the identity functions, $M_m$, $R_m$, etc. have the values given above for the parallel adder and subtracter circuits.

In Fig. 22 the terminals at which the complementary result signals, $\bar{R}_1$, $\bar{R}_2$, $\bar{R}_3 \ldots \bar{R}_n$, appear are shown in dotted form. These signals are the same, whether the circuit is an adder, subtracter, or adder-subtracter. The circuits which must be added to each unit to supply these $\bar{R}$ signals are defined by the following equations:

$$\bar{R}_1=\bar{A}_1.\bar{B}_1.T_1+A_1.B_1.V_1+X_1$$
$$\bar{R}_2=\bar{A}_2.\bar{B}_2.C_1.T_2+A_2.B_2.\bar{C}_1.U_2+A_2.\bar{B}_2.C_1.V_2 +\bar{A}_2.B_2.C_1.W_2+X_2$$

.
.
.
.

$$\bar{R}_n=\bar{A}_n.\bar{B}_n.C_{n-1}.T_n+A_n.B_n.\bar{C}_{n-1}.U_n+A_n.\bar{B}_n.C_{n-1}.V_n +\bar{A}_n.B_n.C_{n-1}.W_n+X_n$$

The $\bar{R}_{n+1}$ signal is supplied by the complementary carry signal network of the last full adding or subtracting circuit.

The Fig. 22 circuit corresponds to the implicit form of the equations for R and C. It is analogous to the circuit of Fig. 18 which corresponded to the Equations 12, 13, and 14. The circuit of Fig. 19 corresponded to Equations 16 and 18, which in turn were derived by carrying out the substitutions of A and B in Equations 12, 13, and 14. Analogous forms of the parallel adding and subtracting circuits could be derived by substituting in for $A_m$ and $B_m$ in the successive R and C equations. There is an infinite class of such circuits depending on the choices of the identity functions $F_m$, $G_m$, etc.

It is here re-emphasized that for each output signal function of addition and subtraction, there exists an infinite class of circuits. The circuits disclosed in the figures which are included in this specification are, in each case, merely representative forms of the various classes, as determined by evaluating the constants of the generalized equations. For example: Fig. 19 illustrates one possible circuit embodiment of the infinite class of series adders which produce output signals R and C as defined by the generalized equations given in connection with Fig. 19; Figs. 10 and 11 illustrate two possible circuit embodiments of the infinite class of half-adders producing output signals R and C as defined by the equations given in connection with those figures; etc.

The class of parallel adder-subtracters which employ as components half and full adder-subtracter circuits which produce R and C output signals and their complements $\bar{R}$ and $\bar{C}$, is an interesting class. Among the possible embodiments in this class are parallel circuits having as components or sub-combinations every one of the possible half and full adding and subtracting circuits and their respective components or sub-combinations, such as the circuit which produces $\bar{C}_-$ from three independent input signal variables.

This class of parallel adder-subtracters thus includes among its possible embodiments circuits which include all simpler circuits disclosed herein as components or sub-combinations.

DELAY CIRCUITS FOR USE IN "SERIES" ADDING AND SUBTRACTING CIRCUITS

In the "series" adding and subtracting circuits described above, a delay circuit of some type was interposed between the carry digit output terminals and the D and $\bar{D}$ input terminals. Standard forms of electrical or acoustic delay lines having an inherent delay of one binary time interval may be used. However, for some applications an electrical delay circuit which employs a flip-flop circuit may be preferable. This flip-flop type of delay circuit regenerates the C and $\bar{C}$ signals before supplying them, delayed one binary time interval to the D and $\bar{D}$ inputs. Such a flip-flop delay circuit is illustrated in Fig. 23.

Figure 23:
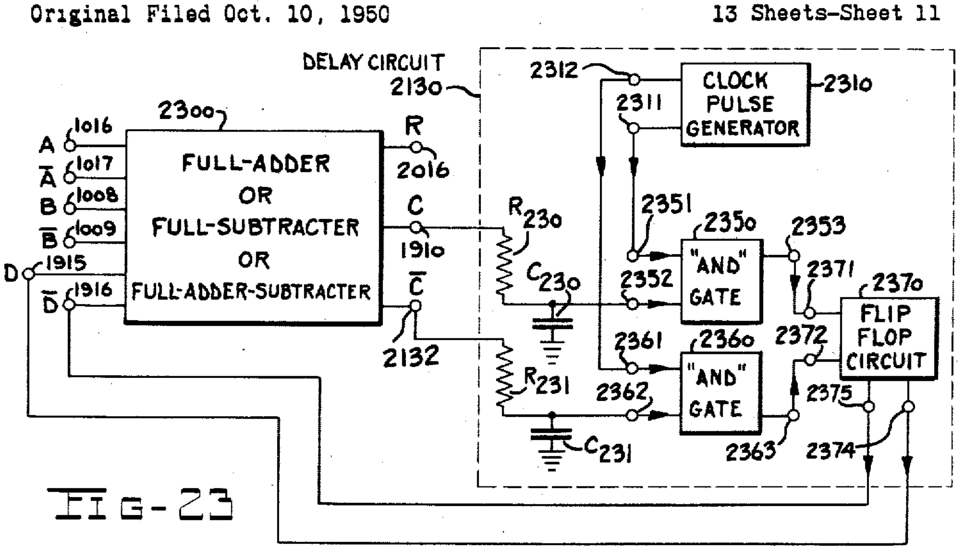
Fig. 23 is a block diagram of a series adder with a flip-flop type of delay circuit.

In Fig. 23, block 2300 is a series adder or subtracter or adder-subtracter having input terminals 1016, 1017, 1008, 1009, 1915, and 1916, and having output terminals 2016, 1910, and 2132. Output terminals 1910 and 2132 are connected through delay circuit 2130 to input terminals 1915 and 1916 to supply the output signals C and $\bar{C}$, delayed one binary time interval, to the input of the circuit 2300 as the signals D and $\bar{D}$. Delay circuit 2130 is comprised as follows. Terminals 1910 and 2132 are connected to resistors $R_{230}$ and $R_{231}$, respectively. The opposite end of resistor $R_{230}$ is connected to one side of a capacitor $C_{230}$ and to one input terminal 2352 of an "and" gate 2350. The opposite end of resistor $R_{231}$ is connected to one side of a capacitor $C_{231}$ and to input terminal 2362 of an "and" gate 2360. A clock pulse generator 2310 has its output terminals, 2311 and 2312, connected to input terminals 2351 and 2361 of "and" gates 2350 and 2360, respectively. The output terminals 2353 and 2363 of "and" gates 2350 and 2360 are connected to the input terminals, 2371 and 2372, respectively, of a flip-flop circuit 2370. The output terminals, 2374 and 2375, of flip-flop circuit 2370 are connected to terminals 1915 and 1916, respectively, of circuit 2300.

Figure 24:
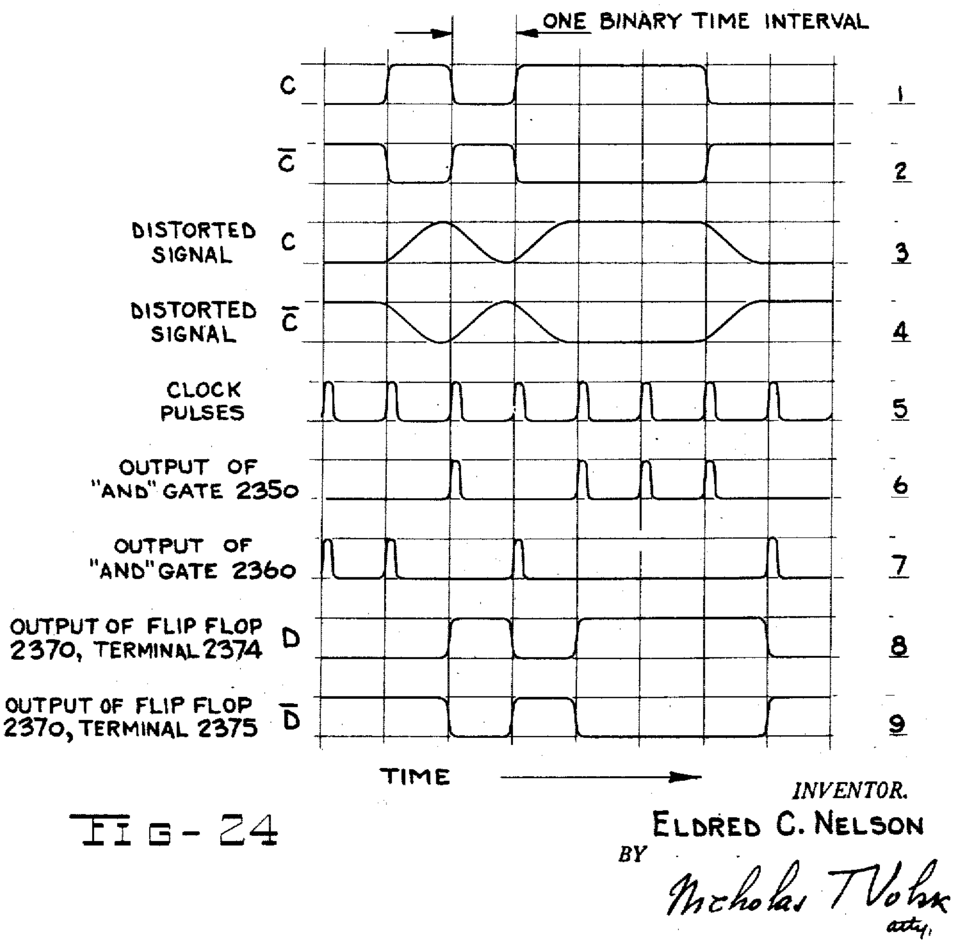
Figs. 24 and 25 show the waveforms of signals appearing at various points in a circuit of the type shown in Fig. 23.

The operation of this circuit may best be explained by use of a series of diagrams showing the waveforms at the various points in the circuit, as shown in Fig. 24. Referring to Fig. 24, the first two lines show the carry signal outputs of circuit 2300, C and $\bar{C}$, corresponding to the binary number, 01011100, just as the signal of Fig. 1 corresponded to the binary number, 010111010. The signals C and $\bar{C}$ are those appearing at terminals 1910 and 2132 of circuit 2300, in Fig. 23. The signals which would appear at terminals 2352 and 2362, in response to the C and $\bar{C}$ signals of lines 1 and 2, are shown in lines 3 and 4, respectively. A swiftly rising voltage at terminal 1910 will cause a current to flow through resistor $R_{230}$ and divide between charging capacitor $C_{230}$ and flowing through the internal resistance of "and" gate 2350 to ground. The internal resistance of "and" gate 2350 to ground is essentially the output resistor, $R_5$, of this gate, and this will, in general, be high in comparison with resistor $R_{230}$; hence it is only necessary to consider the series combination of resistor $R_{230}$ and capacitor $C_{230}$. As the voltage at terminal 1910 is increased, the voltage across capacitor $C_{230}$ will rise exponentially from zero to an asymptote equal to the applied voltage at terminal 1910. The rate of rise is determined by the product of $R_{230}$ and $C_{230}$, the time constant of this circuit. By adjusting the values of resistor $R_{230}$ and capacitor $C_{230}$ any appropriate rate of rise may be obtained. As the voltage falls in 1910, the voltage across capacitor $C_{230}$ will fall exponentially to zero as shown in line 3 of Fig. 24. The effect of the R–C combination is thus to lengthen the rise and fall times of the C signal, the beginnings of each rise and fall remaining at the same point. Signal $\overline{C}$ will be distorted similarly, as shown in line 4. The clock pulses generated by clock pulse generator 2310 rise at the beginning of a binary time interval and fall almost immediately, as shown in line 5. The clock pulses and the distorted C signal are applied to input terminals 2351 and 2352, of "and" gate 2350 which produces an output signal only when both input signals are above some specified value. Consider lines 3 and 5 to be superimposed. The first clock pulse arrives when the distorted C signal is zero, hence no output signal is produced by gate 2350. As the second clock pulse arrives the distorted C signal is starting to rise, but, during the clock pulse interval, the distorted C signal never reaches a value sufficient to cause an output signal to appear at "and" gate 2350, provided the time constant of the RC circuit has been made sufficient large. When the third clock pulse arrives, the C signal is decaying, but at a rate sufficiently slow to provide a substantial signal during the duration of the clock pulse, thus causing an "and" gate output signal at terminal 2353, as shown in line 6. The fourth clock pulse arrives at the beginning of a rise in the distorted C signal and causes no output. The fifth, sixth, and seventh clock pulses arrive while the distorted C signal is sufficiently high to produce an output, causing three more pulses at the output end of gate 2350, as shown. To obtain the waveform of the output signal of "and" gate 2360, consider lines 4 and 5 of Fig. 24 to be superimposed. Whenever both signals are high simultaneously, a pulse will be produced, as shown in line 7.

The output signals from "and" gates 2350 and 2360 are applied to the two input terminals of flip-flop circuit 2370. This flip-flop has the property of producing an output signal at terminal 2375 until a signal is received at terminal 2371, at which time it flips to its other state and produces an output signal at terminal 2374. It remains in this second state until a signal is received at terminal 2372, at which time it flips back to its first state, producing a signal only at terminal 2375. So long as flip-flop circuit 2370 is in its first state, signals received at terminal 2372 do not affect it, and so long as it is in its second state, signals received at terminal 2371 do not affect it. Hence circuit 2370, assumed to be in its normal or first state at the beginning of the series of pulses shown in Fig. 24, remains in its first state so long as the only pulses received appear at terminal 2372. The first two pulses are received at terminal 2372, leaving circuit 2370 unaffected, as shown in lines 8 and 9. The first pulse received from "and" gate 2350 flips the circuit 2370 to its second state to produce a one signal for D, i. e., a positive signal at 2374 and a zero signal at 2375. Next, a pulse is received from gate 2360, flipping circuit 2370 back in its first state. Now in the next interval, a pulse is received from gate 2350, flipping circuit 2370 to its second state. Circuit 2370 remains in its second state until a pulse is received from gate 2360, when it flips back to its first state. This sequence of operations is shown in lines 8 and 9.

Now, compare lines 8 and 9 with lines 1 and 2 in Fig. 24. It is seen that the two output signals of circuit 2370 are the signals C and $\overline{C}$ delayed one binary time interval, i. e. the output signals at terminal 2374 and 2375 are the signals D and $\overline{D}$, respectively. It is to be noted that the output signals of circuit 2370 are always of a satisfactory waveform, thus eliminating any signal degeneration which might be introduced by an ordinary electric or acoustic delay line.

Another feature of delay circuit 2130 is of considerable interest. In the diagram of Fig. 24, it was noted that the first and second pulses, received from gate 2360, and the third and fourth pulses, received from gate 2350, had no effect on circuit 2370. These pulses were in a sense redundant data, i. e. they need not have been generated. It is possible to introduce a change in the carry digit network of the adding or subtracting circuit such that these pulses will not be produced. This change simplifies the carry digit network considerably. The basis for this change is simply that a flip-flop type of delay circuit, as opposed to an electrical or acoustical delay line, maintains its signal output at the same level so long as no new input pulses are received.

In a series adder the carry signals are given by the expressions $$C_{+}=A.B+A.D+B.D$$
$$\overline{C}_{+}=\overline{A}.\overline{B}+\overline{A}.\overline{D}+\overline{B}.\overline{D}$$

When $C_{+}=1$, gate 2350 applies a clock pulse to terminal 2371 of flip-flop circuit 2370 which triggers or flips circuit 2370 into its first state to produce an output signal $D=1$ at terminal 2374. When $\overline{C}_{+}=1$, gate 2360 applies a clock pulse to terminal 2372 which triggers or flips circuit 2370 into its second state to produce an output signal $\overline{D}=1$ at terminal 2375. $C_{+}$ will be 0 when less than two of the signals, A, B, and D, are 1; it will be 1 when two or more of the signals, A, B, and D, are 1. Similarly $\overline{C}_{+}$ will be 0 when less than two of the signals $\overline{A}$, $\overline{B}$, and $\overline{D}$ are 1; $\overline{C}_{+}$ will be 1 when two or more of the signals, $\overline{A}$, $\overline{B}$, and $\overline{D}$, are 1. Now, if the carry signal, $C_{+}$, from the previous addition was 1, circuit 2370 is already in its first state and it is not necessary to send a new 1 signal out from the adder circuit to make circuit 2370 continue to produce a 1 signal at terminal 2374. It is, of course, necessary to avoid producing a 1 signal from the $\overline{C}_{+}$ network, in order to prevent circuit 2370 from changing its state. The terms $A.D$ and $B.D$ of $C_{+}$ can only be 1 when the carry, $C_{+}$ from the previous addition was 1. Hence, provided a 1 signal from the $\overline{C}_{+}$ network is avoided during the period in which D must be 1, the circuits which supply the signals $A.D$ and $B.D$ and combine these signals with $A.B$ can be eliminated, and the carry signal may be generated by a circuit which simply supplies $A.B$. Table 15 shows the eight possible A, B, D signals and the carry signal outputs, $C_{+}$ and $\overline{C}_{+}$, corresponding to these inputs. Also shown are the signals $C_{+}^{*}=A.B$ and $\overline{C}_{+}^{*}=\overline{A}.\overline{B}$ corresponding to the various input signal combinations.

*Table 15*

| A | B | D | $C_{+}^{*}=A.B$ | $\overline{C}_{+}=\overline{A}.\overline{B}$ | $C_{+}=A.B+A.D+B.D$ | $\overline{C}_{+}=\overline{A}.\overline{B}+\overline{A}.\overline{D}+\overline{B}.\overline{D}$ |
|---|---|---|---|---|---|---|
| 0 | 0 | 0 | 0 | 1 | 0 | 1 |
| 0 | 0 | 1 | 0 | 1 | 0 | 1 |
| 0 | 1 | 0 | 0 | 0 | 0 | 1 |
| 1 | 0 | 0 | 0 | 0 | 0 | 1 |
| 0 | 1 | 1 | 0 | 0 | 1 | 0 |
| 1 | 0 | 1 | 0 | 0 | 1 | 0 |
| 1 | 1 | 0 | 1 | 0 | 1 | 0 |
| 1 | 1 | 1 | 1 | 0 | 1 | 0 |

It is seen that the only differences between $C_+^*$ and $C_+$ occur when $D=1$ and either A or B is 1 and both A and B are not 1. For these two cases, D is already 1 and no new signal is required to maintain circuit 2370 in its first state. It is also noted that, in these two cases, $\overline{C}_+$ and $\overline{C}_+^*$ are both 0, hence circuit 2370 will not be flipped to its other state by one of these signals.

The circuit which produces $\overline{C}_+$ may be replaced by a simpler $\overline{C}_+^*$ circuit, where $C_+^*=\overline{A}.\overline{B}$. The two terms of $\overline{C}_+$, $\overline{A}.\overline{D}$. and $\overline{B}.\overline{D}$, are only 1 when $\overline{D}$ is 1, and the circuits which supply these two signals are unnecessary when a flip-flop type of delay circuit is employed, since it will continue to produce a 1 signal without further application of input pulses. In Table 15 it is seen that the only cases in which $C_+^*$ and $\overline{C}_+$ differ are for $D=0$, i. e. $\overline{D}=1$, and $A=0$, $B=1$ and $A=1$, $B=0$. For these two cases $\overline{C}_+^*=0$ and $\overline{C}_+=1$. $C_+$ and $C_+^*$ are both 0 for these two cases, hence no pulse will be received to flip circuit 2370 out of second state, $\overline{D}=1$. Thus the overall operation of a series adder with a flip-flop type of delay circuit will be the same whether a $\overline{C}_+^*$ or a $\overline{C}_+$ network is employed.

Figure 25:
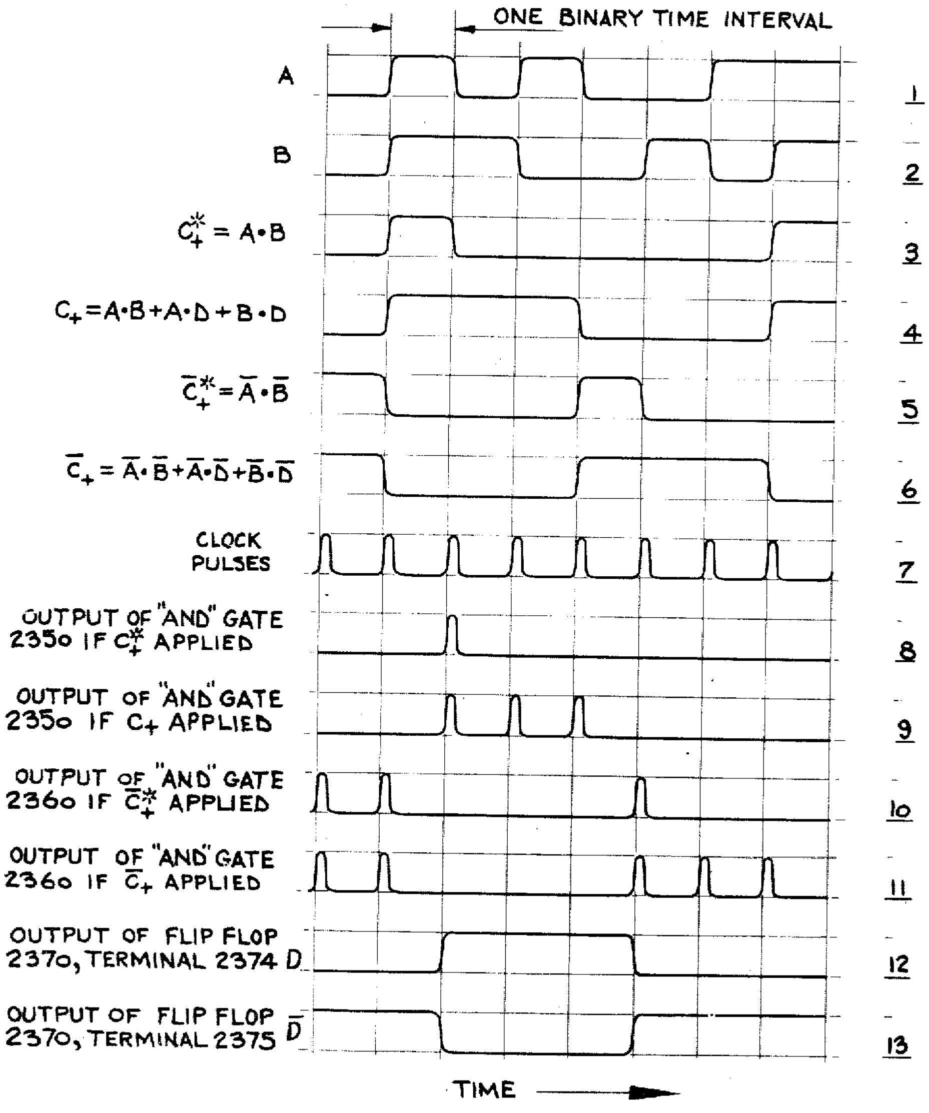

An example of a typical time sequence of signals is shown in Fig. 25. It is assumed the two binary numbers, 11001010, represented by the A signal, and 101001100, represented by the B signal are to be added. It is assumed that the previous addition produced no carry, so that flip-flop circuit 2370 is in its second state initially, i. e. a positive signal appears at terminal 2375 and no signal at terminal 2374. If the carry networks are of the usual type, the signals will be $C_+$ and $\overline{C}_+$, as shown in lines 4 and 6. If the modified carry networks which produce signals $C_+^*$ and $\overline{C}_+^*$ are used, the waveforms will be as shown in lines 3 and 5. These four waveforms may be obtained from the rules in Table 15. The waveforms for signals $C_+^*$ and $\overline{C}_+^*$ follow directly from the values of signals A, B, $\overline{A}$, and $\overline{B}$. The value of signal $C_+$ is obtained from the values of signals A, B, and the value of signal $C_+$ in the previous binary time interval. For example, it is assumed that the initial state of the circuit 2370 is the second state with an output signal at terminal 2375. Thus in the first time interval signals A, B, and D are 0, making signal $C_+$, 0. In the second interval signals A and B are 1 and signal D is 0 because signal $C_+$ was 0 in the first interval, hence, from Table 15, signal $C_+$ is 1 in the second interval, etc. The values of signal $\overline{C}_+$ can be obtained from a consideration of the values of signals $\overline{A}$, $\overline{B}$, and the value of signal $\overline{C}_+$ in the prior time interval. Now, consider the waveforms of lines 3, 4, 5, and 6 to be shifted the width of a clock pulse to the right. This is the effect of the R–C networks, $R_{230}$, $C_{230}$, $R_{231}$, $C_{231}$, as explained in detail in connection with Figs. 23 and 24. Actually, the waveforms are distorted to produce an equivalent effect. Now, "and" gate 2350 will produce an output signal having a waveform as shown in line 8 if the clock pulses are applied to one input terminal and the distorted $C_+^*$ waveform is applied to the other terminal. The only coincidence in time of positive signals on both input terminals will occur at the beginning of the third binary time interval when the $C_+^*$ signal is decaying from the positive value it had during the second interval. If the $C_+$ signal is applied to "and" gate 2350 instead of $C_+^*$, the resulting output waveform will be as shown in line 9. Two additional pulses are obtained during the additional time that signal $C_+$ remains at a positive value in the third and fourth intervals. Lines 10 and 11 represent the two possible outputs of "and" gate 2360 in response to signals $\overline{C}_+^*$ and $\overline{C}_+$ and the clock pulses. These two waveforms are obtained by superimposing lines 5 and 7 and 6 and 7, respectively, with lines 5 and 6 shifted to the right the width of a clock pulse. "And" gate 2360 produces an output signal whenever positive signal inputs are received simultaneously. Line 12 represents the output of flip-flop circuit 2370 at terminal 2374 in response to either the waveforms of lines 8 and 10, $C_+^*$ and $\overline{C}_+^*$, or the waveforms of lines 9 and 11, $C_+$ and $\overline{C}_+$, applied at the input terminals 2371 and 2372, respectively. Line 13 represents the output at terminal 2375 whether the inputs are $C_+^*$ and $\overline{C}_+^*$ or $C_+$ and $\overline{C}_+$. If the inputs to the "and" gates are $C_+^*$ and $\overline{C}_+^*$, circuit 2370, assumed to be in its second state initially, remains in this state as the first two $\overline{C}_+^*$ pulses on line 10 arrive. The $C_+^*$ pulse of line 8 flips circuit 2370 to its first state, producing a signal at terminal 2374 and no signal at terminal 2375. Circuit 2370 remains in its first state until the next pulse is received from "and" gate 2360, the third $\overline{C}_+^*$ pulse shown in line 10, when it flips back to its second state. If the inputs to the "and" gates are signals $C_+$ and $\overline{C}_+$, circuit 2370 performs precisely the same cycle. The second and third $C_+$ pulses in line 9 have no effect since circuit 2370 is already in its first state. The fourth and fifth $\overline{C}_+$ pulses in line 11 also produce no effect since, when these pulses arrive, circuit 2370 is already in its second state. In Fig. 25, the second and third pulses in line 9 are the result of producing a one $C_+$ output signal for the two conditions $A=0$, $B=1$, $D=1$, and $A=1$, $B=0$, $D=1$, which are the conditions in the third and fourth time intervals of Fig. 25, respectively. These are just the two conditions in Table 15 in which $C_+$ differs from $C_+^*$. Similarly the fourth and fifth pulses in line 11 of Fig. 25 are the result of producing a one $\overline{C}_+$ output signal for the two conditions $A=0$, $B=1$, $D=0$, and $A=1$, $B=0$, $D=0$, the conditions occurring in the sixth and seventh time intervals of Fig. 25, respectively. In Table 15, these latter two conditions are the only conditions in which $\overline{C}_+$ and $\overline{C}_+^*$ differ. Thus these redundant pulses produced by the $C_+$ and $\overline{C}_+$ networks may be eliminated by the use of the networks corresponding to the equations:

$$C_+^*=A.B$$
$$\overline{C}_+^*=\overline{A}.\overline{B}$$

Figure 26:
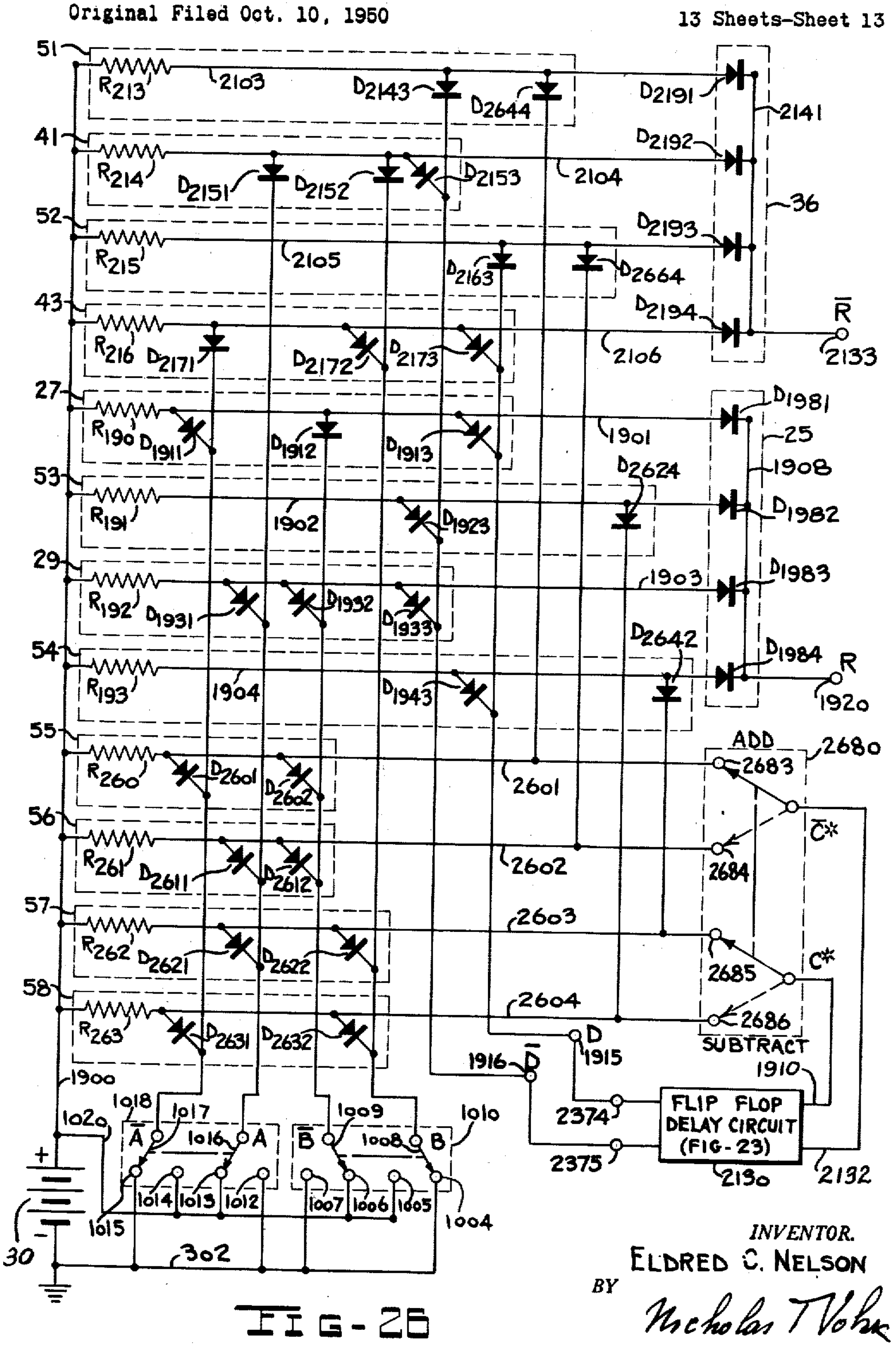
Fig. 26 is a schematic diagram of a series adder-subtracter having modified carry signal networks and a flip-flop type of delay circuit.

These networks are, respectively, a two-terminal "and" gate having its input terminals connected to sources of signals A and B, and a two-terminal "and" gate having its input terminals connected to sources of signals $\overline{A}$ and $\overline{B}$. The circuits corresponding to the $C_+$ and $\overline{C}_+$ equations were shown in Fig. 21. As seen there, each required nine diodes. The $C_+^*$ and $\overline{C}_+^*$ networks, on the other hand, require only two diodes each, representing a total saving of fourteen diodes in a circuit having both primary and complementary carry signal networks. A modified series adder-subtracter circuit is shown in Fig. 26 which produces the signals $C_+^*$ and $\overline{C}_+^*$. A detailed description of this circuit will be given after the modified circuits for the carry signal networks for subtraction have been explained; however, it may be noted here that the circuit used to produce signal $C_+^*$ is "and" gate 57 and the circuit used to produce signal $\overline{C}_+^*$ is "and" gate 55.

The carry signals for subtraction are given by the equations:

$$C_-=\overline{A}.B+\overline{A}.D+B.D$$
$$\overline{C}_-=A.\overline{B}+A.\overline{D}+\overline{B}.\overline{D}$$

As in the case of addition, the signals which are one only when signal D is one are redundant if a flip-flop delay circuit is used. Table 16 shows the values of signals $C_-$, $\overline{C}_-$, $C_-^*$, and $\overline{C}_-^*$ for the eight A, B, D signal combinations that are possible, where $$C_-^*=\overline{A}.B$$
$$\overline{C}_-^*=A.\overline{B}$$

*Table 16*

| A | B | D | $C_-^*=\overline{A}.B$ | $\overline{C}_-^*=A.\overline{B}$ | $C_-=\overline{A}.B+\overline{A}.D+B.D$ | $\overline{C}_-=A.\overline{B}+A.\overline{D}+\overline{B}.\overline{D}$ |
|---|---|---|---|---|---|---|
| 0 | 0 | 0 | 0 | 0 | 0 | 1 |
| 0 | 0 | 1 | 0 | 0 | 1 | 0 |
| 0 | 1 | 0 | 1 | 0 | 1 | 0 |
| 1 | 0 | 0 | 0 | 1 | 0 | 1 |
| 0 | 1 | 1 | 1 | 0 | 1 | 0 |
| 1 | 0 | 1 | 0 | 1 | 0 | 1 |
| 1 | 1 | 0 | 0 | 0 | 0 | 1 |
| 1 | 1 | 1 | 0 | 0 | 1 | 0 |

Here the only differences between signals $C_-$ and $C_-^*$ are for the cases $A=0$, $B=0$, $D=1$, and $A=B=D=1$. For these two cases $D=1$, hence circuit 2370 will produce a one signal at terminal 2374 without receiving an additional pulse, and $C_-^*$ will be as satisfactory as $C_-$. For both of these cases signals $C_-^*$ and $\overline{C}_-$ are 0 and hence will not operate circuit 2370. The only differences between signals $\overline{C}_+^*$ and $\overline{C}_-$ are for the cases $A=B=D=0$ and $A=B=1$, $D=0$. For these two cases $\overline{D}=1$, hence circuit 2370 will produce a one signal at terminal 2375 without receiving an additional pulse, and $\overline{C}_-^*$ will be as satisfactory as $\overline{C}_-$. For both of these latter cases, both signals $C_-$ and $C_-^*$ are 0 and will not operate circuit 2370.

The networks corresponding to the equations for $C_-^*$ and $\overline{C}_-^*$ are in each case two-terminal "and" gates, in their simplest form, thus making possible a saving of fourteen diodes in the construction of a series subtracter circuit. In Fig. 26 the circuit used to produce $C_-^*$ is "and" gate 58 and the circuit used to produce $\overline{C}_-^*$ is "and" gate 56.

A series adder-subtracter which uses the modified carry networks may be made with either a switch at the input or output as explained in connection with Figs. 14 and 15 in the case of the half-adder-subtracter. As in the case of the half-adder-subtracter the carry networks here are so simple it may not be of too much importance which arrangement is used. The equations for the carry network of an adder-subtracter using the modified circuits are as follows:

$$C^*=a(A.B)+\overline{a}(\overline{A}.B)$$
$$C^*=a(\overline{A}.\overline{B})+\overline{a}(A.\overline{B})$$

where $$a=1$$
$$\overline{a}=0$$

for addition and $$a=0$$
$$\overline{a}=1$$

for subtraction.

The complete circuit diagram for an adder-subtracter using the modified carry networks is shown in Fig. 26. The equations which correspond to this circuit are as follows:

$$R=A.\overline{B}.\overline{D}+(\overline{A}.B).\overline{D}+\overline{A}.\overline{B}.D+(A.B).D$$
$$\overline{R}=(\overline{A}.\overline{B}).\overline{D}+A.B.\overline{D}+(A.\overline{B}).D+\overline{A}.B.D$$
$$C^*=a(A.B)+\overline{a}(\overline{A}.B)$$
$$\overline{C}^*=a(\overline{A}.\overline{B})+\overline{a}(A.\overline{B})$$

where $$a=1$$
$$\overline{a}=0$$

for addition and $$a=0$$
$$\overline{a}=1$$

for subtraction. Use has been made of the fact that all of the modified carry signals can be used in forming the R and $\overline{R}$ signals. Thus the $(A.B).D$ term of the R equation is formed by a two-terminal "and" gate which combines the $C_+^*$ signal, $A.B$, with signal D. A switch on the output is used. By the use of the C signals in forming the R signals, the number of diodes required is reduced. Thus, Fig. 26 requires only four more diodes than would be necessary in the R and $\overline{R}$ networks alone. This expedient may be extended even further. Thus, instead of using three diodes in "and" circuit 41, a two-terminal "and" circuit may be used, with one terminal connected to the output terminal of "and" circuit 57. In the two-terminal circuit, diodes $D_{2151}$ and $D_{2152}$ would be replaced by a single diode having its cathode connected to lead 2603. Similarly, "and" circuits 43, 27, and 29 may be replaced by two-terminal "and" circuits. The "and" circuit replacing circuit 43 would have one input terminal connected to lead 2604 while the "and" circuit replacing circuit 27 would have one input terminal connected to lead 2601. One input terminal of the "and" circuit replacing circuit 29 would be connected to lead 2602.

In Fig. 26 the $\overline{R}$ circuit is composed of "and" circuits 51, 41, 52, and 43, individually comprising a resistor $R_{213}$, diodes $D_{2143}$, $D_{2644}$, lead 2103; a resistor $R_{214}$, diodes $D_{2151}$, $D_{2152}$, $D_{2153}$, lead 2104; a resistor $R_{215}$, diodes $D_{2163}$, $D_{2664}$, lead 2105; and a resistor $R_{216}$, diodes $D_{2171}$, $D_{2172}$, $D_{2173}$, lead 2106, respectively, and "or" circuit 36 having its input terminals connected to the output terminals of "and" circuits 51, 41, 52, and 43, respectively. The R circuit is composed of "and" circuits 27, 53, 29, and 54, individually comprising a resistor $R_{190}$, diodes $D_{1911}$, $D_{1912}$, $D_{1913}$, lead 1901; a resistor $R_{191}$, diodes $D_{1923}$, $D_{2624}$, lead 1902; a resistor $R_{192}$, diodes $D_{1931}$, $D_{1932}$, $D_{1933}$, lead 1903; and a resistor $R_{193}$, diodes $D_{1943}$, $D_{2642}$, lead 1904, respectively, and "or" circuit 25 having its input terminals connected to the output terminals of "and" circuits 27, 53, 29, and 54, respectively. "And" circuit gate resistors $R_{213}$, $R_{214}$, $R_{215}$, $R_{216}$, $R_{190}$, $R_{191}$, $R_{192}$, and $R_{193}$ each have one end tied to bus 1900. "And" circuits 55, 56, 57, and 58 are composed of a resistor $R_{260}$, diodes $D_{2601}$, $D_{2602}$, lead 2601; a resistor $R_{261}$, diodes $D_{2611}$, $D_{2612}$, lead 2602; a resistor $R_{262}$, diodes $D_{2621}$, $D_{2622}$, lead 2603; and a resistor $R_{263}$, diodes $D_{2631}$, $D_{2632}$, lead 2604, respectively. Each of the gate resistors, $R_{260}$, $R_{261}$, $R_{262}$, and $R_{263}$, is connected to bus 1900. Leads 2601, 2602, 2603, and 2604 are connected to fixed contact points 2683, 2684, 2685, and 2686, respectively, of a double-pole double-throw switch 2680 which further includes movable switch arms 2132 and 1910 which may contact points 2683 and 2685, respectively, in a first "add" position, and may contact points 2684 and 2686, respectively, in a second "subtract" position. Movable switch arms 2132 and 1910 are connected to the two input terminals of flip-flop delay circuit 2130 which is a device of the character shown in Fig. 23. The output terminals 2374 and 2375 of circuit 2130 are connected to terminals 1915 and 1916, respectively. The cathodes of diodes $D_{1943}$, $D_{1913}$, $D_{2173}$, and $D_{2163}$ are connected to terminal 1915. The cathodes of diodes $D_{1933}$, $D_{1923}$, $D_{2153}$, and $D_{2143}$ are connected to terminal 1916. The cathodes of diodes $D_{2644}$, $D_{2664}$, $D_{2624}$, and $D_{2642}$ are connected to leads 2601, 2602, 2604, and 2603, respectively, which are the output leads of "and" gates 55, 56, 58, and 57, respectively. The cathodes of diodes $D_{2631}$, $D_{2601}$, $D_{1911}$, and $D_{2171}$ are connected to movable switch arm 1017 of switch 1018. The cathodes of diodes $D_{2621}$, $D_{2611}$, $D_{1931}$, and $D_{2151}$ are connected to movable switch arm 1016 of switch 1018. The cathodes of diodes $D_{2612}$, $D_{2602}$, $D_{1932}$, and $D_{1912}$ are connected to movable switch arm 1009 of switch 1010. The cathodes of diodes $D_{2632}$, $D_{2622}$, $D_{2172}$, and $D_{2152}$ are connected to movable switch arm 1008 of switch 1010. Switches 1018 and 1010 have connections to the battery B and lead 1900 through leads 1020 and 302, as in Fig. 21.

The operation of the circuit is as follows. "And" gates 55, 56, 57, and 58 form the signals $\bar{A}.\bar{B}$, $A.\bar{B}$, $A.B$, and $\bar{A}.B$, respectively, which are supplied to the output terminals 2683, 2684, 2685, and 2686, respectively, as the modified carry signals $\bar{C}_{+}*$, $\bar{C}_{-}*$, $C_{+}*$, $C_{-}*$, respectively. "And" gates 51, 41, 52, and 43 form the signals $(\bar{A}.\bar{B}).\bar{D}$, $A.B.\bar{D}$, $(A.\bar{B}).D$, and $\bar{A}.B.D$, respectively, where the signals $\bar{A}.\bar{B}$ and $A.\bar{B}$ used in "and" gates 51 and 52 are obtained from the outputs of "and" gates 55 and 56, respectively. The outputs of "and" gates 51, 41, 52, and 43 are fed into "or" gate 36 which supplies the signal R at its output. "And" gates 27, 53, 29, and 54 form the signals $\bar{A}.\bar{B}.D$, $(\bar{A}.B).\bar{D}$, $A.\bar{B}.\bar{D}$, and $(A.B).D$, respectively, where the signals $\bar{A}.B$ and $A.B$ used in "and" gates 53 and 54 are obtained from the outputs of "and" gates 57 and 58, respectively. The outputs of "and" gates 27, 53, 29, and 54 are fed into "or" gate 25 which supplies the signal R at its output. Either signals $C_{+}*$ and $\bar{C}_{+}*$ or signals $C_{-}*$ and $\bar{C}_{-}*$ are fed into the flip-flop delay circuit 2130, depending on the position of switch 2680. The outputs of delay circuit 2130 are the signals D and $\bar{D}$ which are supplied to the input terminals 1915 and 1916.

The circuits for the series adder and series subtracter which use the modified carry networks are not shown separately. The circuit for the adder is simply the circuit of Fig. 26 with the switch 2680 in the "add" position. The circuit for the subtracter is the circuit of Fig. 26 with switch 2680 in the "subtract" position.

It is possible to write the equations for the modified carry networks in generalized form just as was done for the ordinary carry networks. It does not seem desirable to repeat the equations for the R and $\bar{R}$ networks here, no change being required in those networks as a result of the modification of the carry networks. The equations for the adder are $$C_{+}*=A.B.F+C$$
$$\bar{C}_{+}*=\bar{A}.\bar{B}.H+J$$

where F, G, H and J are functions of the input signals, A, $\bar{A}$, B, $\bar{B}$, D and $\bar{D}$, having the values:

$$F=1$$
$$G=0$$
$$H=1$$
$$J=0$$

for all values of the input signals.

The equations for the subtracter are $$C_{-}*=\bar{A}.B.F+G$$
$$\bar{C}_{-}*=A.\bar{B}.H+J$$

where F, G, H, and J are functions of the input signals, A, $\bar{A}$, B, $\bar{B}$, D and $\bar{D}$, having the values:

$$F=1$$
$$G=0$$
$$H=1$$
$$J=0$$

for all values of the input signals.

The equations for the adder-subtracter are $$C*=a(A.B.F+G)+\bar{a}(\bar{A}.B.H+J)$$
$$\bar{C}*=a(\bar{A}.\bar{B}.F+G)+\bar{a}(A.\bar{B}.H+J)$$

and where $a$ and $\bar{a}$ are quantities having the values:

$$a=1$$
$$\bar{a}=0$$

for addition and $$a=0$$
$$\bar{a}=1$$

for subtraction, and where F, G, H, J, K, L, M, and N are functions of the input signals A, $\bar{A}$, B, $\bar{B}$, D, and $\bar{D}$, having the values:

$$F=1 \qquad K=1$$
$$G=0 \qquad L=0$$
$$H=1 \qquad M=1$$
$$J=0 \qquad N=0$$

for all values of the input signals.

I claim as my invention:

1. In an electronic digital computer, the combination comprising: first, second, third, and fourth input leads; first and second "and" circuits each having an output terminal and two input terminals, the input terminals of said first "and" circuit being connected to said first and fourth input leads, the input terminals of said second "and" circuit being connected to said second and third input leads each of said "and" circuits including as the principal gating elements only two unidirectionally conducting devices poled to conduct from the respective output terminal to each of the respective input terminals; an "or" circuit having an output terminal and two input terminals, said input terminals being respectively connected to the output terminals of said first and second "and" circuits, said "or" circuit including as the principal gating elements two unidirectionally conducting devices poled to conduct from the respective input terminals to the output terminal; and means for simultaneously applying first, second, third and fourth input signals to the corresponding input leads, said first and second input signals representing a first binary digit and its complement respectively, and said third and fourth input signals representing a second binary digit and its complement respectively, thereby to produce an output signal representing the result digit of a binary addition or subtraction of said first and second binary digits at the output terminal of said "or" circuit.

2. An electronic computer element comprising, in combination: a first source for simultaneously producing first and second input signals representing a first binary digit and its complement, respectively; a second source for simultaneously producing third and fourth input signals representing a second binary digit and its complement, respectively; first and second "and" circuits, each having only two input terminals and an output terminal; means for applying said first and fourth input signals to said two input terminals, respectively, of said first "and" circuit; means for applying said second and third input signals to said two input terminals, respectively, of said second "and" circuit; an "or" circuit having two input terminals and one output terminal, said two input terminals of said "or" circuit being connected to the output terminals of said first and second "and" circuits, respectively, thereby to produce an output signal representing the result digit of a binary addition of said first and second binary digits at the output terminal of said "or" circuit; a third "and" circuit having only two input terminals and an output terminal; and means for applying said first and third input signals to said two input terminals, respectively, of said third "and" circuit thereby to produce an additional output signal representing the carry digit of a binary addition of said first and second binary digits at the output terminal of said third "and" circuit.

3. An electronic computer element comprising first and second sources of input signals, said first source producing simultaneously first and second signals representative of a first binary digit, said second source producing simultaneously third and fourth signals representative of a second binary digit, said second and fourth signals being complementary to said first and third signals respectively; first, second and third "and" circuits, each having at least two input terminals and one output terminal; means for applying said first and fourth signals to said two input terminals, respectively, of said first "and" circuit; means for applying said second and third signals to said two input terminals, respectively, of said second "and" circuit; a first "or" circuit having at least two input terminals and one output terminal, said two input terminals of said first "or" circuit being connected to the output terminals of said first and second "and" circuits, respectively, whereby there is produced at the output terminal of said first "or" circuit a first output signal representing the result digit of a binary addition or subtraction of said first and second binary digits; means for applying said first and third signals to said two input terminals, respectively, of said third "and" circuit whereby there is produced at the output terminal of said third "and" circuit a second output signal representing the carry digit of the binary addition of said first and second binary digits; a first additional output terminal; and switch means for connecting said first additional output terminal to the output terminal of said second "and" circuit in a first position, and to the output terminal of said third "and" circuit in a second position, a third output signal being produced at the output terminal of said second "and" circuit, said third output signal representing the carry digit of a binary subtraction of said second digit from said first digit.

4. The electronic computer element described in claim 3 which also includes second and third "or" circuits, each having at least two input terminals and one output terminal; means for applying said first and fourth input signals to said two input terminals, respectively, of said second "or" circuit; means for applying said second and fourth input signals to said two input terminals, respectively, of said third "or" circuit; a second additional output terminal; and switch means for connecting said second additional output terminal to the output terminal of said second "or" circuit in a first position and to the output terminal of said third "or" circuit in a second position for obtaining a fourth output signal at said second additional output terminal when said last-named switch means is in said first position and a fifth output signal at said second additional output terminal when said last-named switch means is in said second position, said fourth and fifth output signals being, respectively, the complements of said third and second output signals.

5. The electronic computer element described in claim 4 which also includes a fourth "and" circuit having at least two input terminals and one output terminal; means for applying said second and fourth input signals to said two input terminals, respectively, of said fourth "and" circuit; a fourth "or" circuit having at least two input terminals and one output terminal, said two input terminals of said fourth "or" circuit being connected to the output terminals of said third and fourth "and" circuits, respectively, whereby a sixth output signal is produced at the output terminal of said fourth "or" circuit, said sixth output signal being the complement of said first output signal.

6. An electronic computer element comprising first and second sources of input signals, said first source producing simultaneously first and second signals representative of a first binary digit, said second source producing simultaneously third and fourth signals representative of a second binary digit, said second and fourth signals being complementary to said first and third signals, respectively; first, second, third, and fourth "and" circuits each having two input terminals and one output terminal; means for applying said first and fourth input signals to said two input terminals, respectively, of said first "and" circuit; means for applying said second and third input signals to said two input terminals, respectively, of said second "and" circuit; means for applying said first and third input signals to said two input terminals, respectively, of said third "and" circuit; means for applying said second and fourth input signals to said two input terminals, respectively, of said fourth "and" circuit; and first and second "or" circuits each having two input terminals and one output terminal, the two input terminals of said first "or" circuit being connected to the output terminals of said first and second "and" circuits, respectively, the two input terminals of said second "or" circuit being connected to the output terminals of said third and fourth "and" circuits, respectively, whereby there is produced at the output terminal of said first "or" circuit a first output signal representing the result digit of a binary addition or subtraction of said first and second binary digits, and at the output terminal of said second "or" circuit a second output signal which is complementary to said first output signal.

7. An electronic computer element comprising first and second sources of input signals, said first source producing simultaneously first and second signals representative of a first binary digit, said second source producing simultaneously third and fourth signals representative of a second binary digit, said second and fourth signals being complementary to said first and third signals, respectively; first and second "and" circuits each having at least two input terminals and one output terminal; means for applying said first and fourth input signals to said two input terminals, respectively, of said first "and" circuit; means for applying said second and third input signals to said two input terminals, respectively, of said second "and" circuit; a first "or" circuit having at least two input terminals and one output terminal, said two input terminals of said first "or" circuit being connected to the output terminals of said first and second "and" circuits, respectively, whereby a first output signal is produced at the output terminal of said first "or" circuit, said first output signal representing the result digit of a binary addition or subtraction of said first and second binary digits; a second "or" circuit having at least two input terminals and one output terminal; and means for applying said first and fourth input signals to said two input terminals, respectively, of said second "or" circuit whereby a second output signal is produced at the output terminal of said second "or" circuit, said second output signal being the complement of the signal representing the carry digit of a binary subtraction of said second digit from said first digit.

8. The electronic computer element described in claim 7 which also includes third and fourth "and" circuits, each having at least two input terminals and one output terminal; means for applying said first and third input signals to said two input terminals, respectively, of said third "and" circuit; means for applying said second and fourth input signals to said two input terminals, respectively, of said fourth "and" circuit; a third "or" circuit having at least two input terminals and one output terminal, the two input terminals of said third "or" circuit being connected to the output terminals of said third and fourth "and" circuits, respectively, whereby a third output signal is produced at the output terminal of said third "or" circuit, said third output signal being the complement of said first output signal.

9. An electronic computer element comprising first and second sources of input signals, said first source producing simultaneously first and second signals representative of a first binary digit, said second source producing simultaneously third and fourth signals representative of a second binary digit, said second and fourth signals being complementary to said first and third signals, respectively; first and second "and" circuits, each having at least two input terminals and one output terminal;

means for applying said first and fourth input signals to said two input terminals, respectively, of said first "and" circuit; means for applying said second and third input signals to said two input terminals, respectively, of said second "and" circuit; a first "or circuit having at least two input terminals and one output terminal, said two input terminals of said first "or" circuit being connected to the output terminals of said first and second "and" circuits, respectively, whereby a first output signal is produced at the output terminal of said first "or" circuit, said first output signal representing the result digit of a binary addition or subtraction of said first and second binary digits; a third "and" circuit having at least two input terminals and one output terminal; means for applying said first and third signals to said two input terminals, respectively, of said third "and" circuit to produce a second output signal at the output terminal of said third "and" circuit, said second output signal representing the carry digit of a binary addition of said first and second binary digits; a second "or" circuit having at least two input terminals and one output terminal; and means for applying said second and fourth input signals to said two input terminals, respectively, of said second "or" circuit to produce a third output signal at the output terminal of said second "or" circuit, said third output signal being the complement of said second output signal.

10. The electonic computer described in claim 9 which also includes a fourth "and" circuit having at least two input terminals and one output terminal; means for applying said second and fourth input signals to said two input terminals, respectively, of said fourth "and" circuit; and a third "or" circuit having at least two input terminals and one output terminal, said two input terminals of said third "or" circuit being connected to the output terminals of said third and fourth "and" circuits, respectively, whereby a fourth output signal is produced at the output terminal of said third "or" circuit, said fourth output signal being the complement of said first output signal.

11. An adder circuit comprising two sources of input signals, each source supplying simultaneously one primary and one complementary signal, said signals representing a pair of binary digits to be added; first and second half adder circuits, each having four input terminals and first and second output terminals and being operable in response to the application to its input terminals of a set of four signals representing a pair of binary digits and their complements for producing at said first output terminal a result digit output signal and at said second output terminal a carry digit output signal, said first half adder circuit additionally including a third output terminal for producing the complement of the result digit output signal; means connecting said two sources to said first half adder circuit for applying a different input signal to each of its input terminals; means connecting said first and third output terminals of said first half adder circuit to two of the input terminals of said second half adder circuit; an "or" circuit having two input terminals respectively connected to the second output terminals of said first and second half adder circuits, and an output terminal for producing a total carry digit signal; generating means for generating an output signal complementary to said total carry digit signal; delay means for delaying signals one binary time interval; means for applying the total carry digit signal and the output signal of said generating means to said delay means; and means for applying the delayed signals from said delay means to the remaining input terminals of said second half adder whereby the result digit signal produced at the first output terminal of said second half adder is representative of the digits of the binary sum of the pairs of binary digits represented by said input signals.

12. A subtracter circuit comprising two sources of input signals, each source supplying simultaneously one primary and one complementary signal, said signals representing a pair of binary digits to be subtracted; first and second half subtracter circuits, each having four input terminals and first and second output terminals and being operable in response to the application to its input terminals of a set of four signals representing a pair of binary digits and their complements for producing at said first output terminal a result digit output signal and at said second output terminal a carry digit output signal, said first half subtracter circuit additionally including a third output terminal for producing the complement of the result digit output signal; means connecting said two sources to said first half subtracter circuit for applying a different input signal to each of its input terminals; means connecting said first and third output terminals of said first half subtracter circuit to two of the input terminals of said second half subtracter circuit; an "or" circuit having two input terminals respectively connected to the second output terminals of said first and second half subtracter circuits, and an output terminals for producing a total carry digit signal; generating means for generating an output signal complementary to said total carry digit signal; delay means for delaying signals one binary time interval; means for applying the total carry digit signal and the output signal of said generating means to said delay means; and means for applying the delayed signals from said delay means to the remaining input terminals of said second half subtracter whereby the result digit signal produced at the first output terminal of said second half subtracter is representative of the digits of the binary difference of the pairs of binary digits represented by said input signals.

13. An adder-subtracter circuit comprising two sources of input signals, each source supplying simultaneously one primary and one complementary signal, said signals representing a pair of binary digits to be added or subtracted; first and second half adder-subtracter circuits, each having four input terminals and first and second output terminals and being operable in response to the application to its input terminals of a set of four signals representing a pair of binary digits and their complements for producing at said first output terminal a result digit output signal and at said second output terminal a carry digit output signal, said first half adder-subtracter circuit additionally including a third output terminal for producing the complement of the result digit output signal; means connecting said two sources to said first half adder-subtracter circuit for applying a different input signal to each of its input terminals; means connecting said first and third output terminals of said first half adder-subtracter circuit to two of the input terminals of said second half adder-subtracter circuit; an "or" circuit having two input terminals respectively connected to the second output terminals of said first and second half adder-subtracter circuits, and an output terminal for producing a total carry digit signal; generating means for generating an output signal complementary to said total carry digit signal; delay means for delaying signals one binary time interval; means for applying the total carry digit signal and the output signal of said generating means to said delay means; and means for applying the delayed signals from said delay means to the remaining input terminals of said second half adder-subtracter whereby the result digit signal produced at the first output terminal of said second half adder-subtracter is representative of the digits of the binary sum or difference of the pairs of binary digits represented by said input signals.

14. In an electronic computer, the combination comprising first, second and third sources of input signals, said first source producing simultaneously first and second input signals representative of a first binary digit, said second source producing simultaneously third and fourth input signals representative of a second binary digit, said third source producing simultaneously fifth and sixth input signals representative of a third binary digit, each of said signals having only two voltage levels, one voltage level being indicative of binary one and the remaining voltage level of binary zero, and said second, fourth, and sixth signals being complementary to said first, third and fifth signals, respectively; first, second, third and fourth "and" circuits, each having three input terminals, one output terminal and including three unidirectionally conducting devices as the principal gating elements, said unidirectionally conducting devices being poled to conduct from the respective output terminal to each of the respective input terminals; means connected between said sources and the input terminals of said "and" circuits for applying to said first, second, third and fourth "and" circuits, respectively, said first, third and fifth input signals, said second, fourth and fifth input signals, said second, third and sixth input signals, and said first, fourth and sixth input signals; an "or" circuit having one output terminal and four input terminals and including four unidirectionally conducting devices poled to conduct from the respective input terminals to the otuput terminal; and means connecting the four input terminals of said "or" circuit to the respective output terminals of said first, second, third and fourth "and" circuits thereby to produce an output signal constituted only of said one voltage level indicative of binary one and of said remaining voltage level indicative of binary zero at the output terminal of said "or" circuit, said output signal representing the result digit of a binary addition of said first, second and third binary digits, or the result digit of a binary subtraction of said third digit from the difference between said first and second digits.

15. In an electronic computer, the combination comprising first, second and third sources of input signals, said first source producing simultaneously first and second input signals representative of a first binary digit, said second source producing simultaneously third and fourth input signals representative of a second binary digit, said third source producing simultaneously fifth and sixth input signals representative of a third binary digit, each of said signals having only two voltage levels, one voltage level being indicative of binary one and the remaining voltage level of binary zero, and said second, fourth and sixth signals being complementary to said first, third and fifth signals, respectively; means for providing a source of bias potential relative to a substantially fixed potential, the polarity and magnitude of said bias potential relative to said fixed potential being substantially the same as that of said one voltage level relative to said remaining voltage level; first, second, third and fourth "and" circuits, each having three input terminals, one output terminal, a gating resistor connected from said one output terminal to said source of bias potential, and three diodes connected from said one output terminal to each of the respective input terminals and poled to allow current to normally flow through the respective gating resistor; means connected between said sources and the input terminals of said "and" circuits for applying to said first, second, third and fourth "and" circuits, respectively, said first, third and fifth input signals, said second, fourth and fifth input signals, said second, third and sixth input signals, and said first, fourth and sixth input signals; an "or" circuit having one output terminal, four input terminals and a diode connected from each of the four input terminals to the one output terminal, the four input terminals of said "or" circuit being connected to the respective output terminals of said first, second, third and fourth "and" circuits and the diodes of said "or" circuit being poled to allow current to normally flow through the gating resistor of the respective "and" circuit whereby an output signal of only said one and of said remaining voltage levels indicative of binary one and zero, respectively, is produced at the output terminal of said "or" circuit, said output signal representing the result digit of a binary addition of said first, second and third binary digits, or the result digit of a binary subtraction of said third digit from the difference between said first and second digits.

16. In an electronic computer, the combination comprising: first, second, and third sources of input signals, said first source producing simultaneously first and second input signals representative of a first binary digit, said second source producing simultaneously third and fourth input signals representative of a second binary digit, said third source producing simultaneously fifth and sixth input signals representative of a third binary digit, said second, fourth, and sixth signals being complementary to said first, third, and fifth signals, respectively; first, second, third, and fourth "and" circuits, each having three input terminals and one output terminal; means connected between said sources and the input terminals of said "and" circuits for applying to said first, second, third, and fourth "and" circuits, respectively, said first, third, and fifth input signals, said second, fourth, and fifth input signals, said second, third, and sixth input signals, and said first, fourth and sixth input signals; a first "or" circuit having one output terminal and four input terminals, the four input terminals of said first "or" circuit being connected to the output terminals of said first, second, third, and fourth "and" circuits, respectively, whereby a first output signal is produced at the output terminal of said first "or" circuit, said first output signal representing the result digit of a binary addition of said first, second, and third binary digits, or the result digit of a binary subtraction of said third digit from the difference between said first and second digits; fifth, sixth, and seventh "and" circuits, each having at least two input terminals and one output terminal; means for connecting the two input terminals of said fifth, sixth, and seventh "and" circuits to said sources to impress on said fifth, sixth, and seventh "and" circuits, respectively, said second and third input signals, said second and fifth input signals, and said third and fifth input signals; a second "or" circuit having one output terminal and three input terminals, the three input terminals of said second "or" circuit being connected to the output terminals of said fifth, sixth, and seventh "and" circuits, respectively, whereby a second output signal is produced at the output terminal of said second "or" circuit, said second output signal representing the carry digit of a binary subtraction of said third binary digit from the difference between said first and second binary digits; and means for generating a third output signal complementary to said second output signal and delay means responsive to said second and third output signals for delaying said second and third output signals one binary time interval thereby to provide said fifth and sixth input signals, respectively.

17. In an electronic computer, the combination comprising: first, second, and third sources of input signals, said first source producing simultaneously first and second input signals representative of a first binary digit, said second source producing simultaneously third and fourth input signals representative of a second binary digit, said third source producing simultaneously fifth and sixth input signals representative of a third binary digit, said second, fourth, and sixth signals being complementary to said first, third, and fifth signals, respectively; first, second, third, and fourth "and" circuits, each having three input terminals and one output terminal; means connected between said sources and the input terminals of said "and" circuits for applying to said first, second, third, and fourth "and" circuits, respectively, said first, third, and fifth input signals, said second, fourth, and fifth input signals, said second, third, and sixth input signals, and said first, fourth and sixth input signals; a first "or" circuit having one output terminal and four input terminals, the four input terminals of said first "or" circuit being connected to the output terminals of said first, second, third, and fourth "and" circuits, respectively, whereby a first output signal is produced at the output terminal of said first "or" circuit, said first output signal representing the result digit of a binary addition of said first, second, and third binary digits, or the result digit of a binary subtraction of said third digit from the difference between said first and second digits; fifth, sixth, and seventh "and" circuits; each having at least two input terminals and one output terminal; means for connecting the two input terminals of said fifth, sixth, and seventh "and" circuits to said sources to impress on said fifth, sixth, and seventh "and" circuits, respectively, said first and third input signals, said first and fifth input signals, and said third and fifth input signals; a second "or" circuit having one output terminal and three input terminals, the three input terminals of said second "or" circuit being connected to the output terminals of said fifth, sixth, and seventh "and" circuits, respectively, whereby a second output signal is produced at the output terminal of said second "or" circuit representing the carry digit of a binary addition of said binary digits; and means for generating a third output signal complementary to said second output signal and delay means responsive to said second and third output signals for providing signals delayed one binary time interval with respect to said second output signal, whereby said delay means constitutes said third source of input signals.

18. The combination claimed in claim 17 wherein said means for connecting the input terminals of said fifth, sixth and seventh "and" circuits to said sources includes a switching means having a first position corresponding to the addition operation and a second position corresponding to the subtraction operation, said switching means being operable in its second position to impress on said fifth, sixth, and seventh "and" circuits, respectively, said second and third input signals, said second and fifth input signals, and said third and fifth input signals, whereby said second output signal represents the carry digit of a binary subtraction of said third binary digit from the difference between said first and second binary digits when said switching means is in said second position.

19. The combination claimed in claim 17 wherein said means for generating said third output signal includes eighth, ninth, and tenth "and" circuits, each having at least two input terminals and one output terminal; means for connecting the two input terminals of said eighth, ninth, and tenth "and" circuits to said sources to apply to said eighth, ninth, and tenth "and" circuits, respectively, said first and fourth input signals, said first and sixth input signals, and said fourth and sixth input signals; and a third "or" circuit having one output terminal and at least three input terminals, said three input terminals of said third "or" circuit being connected to the output terminals of said eighth, ninth, and tenth "and" circuits, respectively, whereby said third output signal is produced at the output terminal of said third "or" circuit.

20. The combination claimed in claim 17 wherein said means for generating a third output signal includes eighth, ninth, and tenth "and" circuits, each having at least two input terminals and one output terminal; means for connecting the two input terminals of said eighth, ninth, and tenth "and" circuits to said sources to apply to said eighth, ninth, and tenth "and" circuits, respectively, said second and fourth input signals, said second and sixth input signals, and said fourth and sixth input signals; and a third "or" circuit having one output terminal and at least three input terminals, said three input terminals of said third "or" circuit being connected to the output terminals of said eighth, ninth, and tenth "and" circuits, respectively, whereby said third output signal is produced at the output terminal of said third "or" circuit.

21. The combination claimed in claim 20 wherein said means for connecting the input terminals of said fifth, sixth, and seventh "and" circuits to said sources includes a first switching means having a first position corresponding to the addition operation and a second position corresponding to the subtraction operation, said first switching means being operable in its second position for applying to said fifth, sixth, and seventh "and" circuits, respectively, said second and third input signals, said second and fifth input signals, and said third and fifth input signals, whereby said second output signal represents the carry digit of a binary subtraction of said third binary digit from the difference between said first and second binary digits when said first switching means is in its second position; and wherein said means for connecting the input terminals of said eighth, ninth, and tenth "and" circuits to said sources includes second switching means having a first position corresponding to the addition operation and a second position corresponding to the subtraction operation, said second switching means being operable in its second position for applying to said eighth, ninth, and tenth "and" circuits, respectively, said first and fourth input signals, said first and sixth input signals, and said fourth and sixth input signals.

22. The combination in claim 21 which further includes eleventh, twelfth, thirteenth, and fourteenth "and" circuits each having three input terminals and one output terminal, means for connecting the input terminals of said eleventh, twelfth, thirteenth, and fourteenth "and" terminals to said sources to apply to said eleventh, twelfth, thirteenth, and fourteenth "and" circuits, respectively, said second, fourth, and sixth input signals, said first, third, and sixth input signals, said first, fourth, and fifth input signals, and said second, third, and fifth input signals; and a fourth "or" circuit having four input terminals and one output terminal, the four input terminals of said fourth "or" circuit being connected to the output terminals of said eleventh, twelfth, thirteenth, and fourteenth "and" circuits, respectively, whereby a fourth output signal is produced at the output terminal of said fourth "or" circuit, said fourth output signal being the complement of said first output signal.

23. In an electronic computer, the combination comprising: first, second, and third sources of input signals, said first source producing simultaneously first and second input signals representative of a first binary digit, said second source producing simultaneously third and fourth input signals representative of a second binary digit, said third source producing simultaneously fifth and sixth input signals representative of a third binary digit, said second, fourth, and sixth signals being complementary to said first, third, and fifth signals, respectively; first, second, third, and fourth "and" circuits, each having three input terminals and one output terminal; means connected between said sources and the input terminals of said "and" circuits for applying to said first, second, third, and fourth "and" circuits, respectively, said first, third, and fifth input signals, said second, fourth, and fifth input signals, said second, third, and sixth input signals, and said first, fourth and sixth input signals; a first "or" circuit having one output terminal and four input terminals, the four input terminals of said first "or" circuit being connected to the output terminals of said first, second, third, and fourth "and" circuits, respectively, whereby a first output signal is produced at the output terminal of said first "or" circuit, said first output signal representing the result digit of a binary addition of said first, second, and third binary digits, or the result digit of a binary subtraction of said third digit from the difference between said first and second digits; fifth, sixth, seventh, and eighth "and" circuits, each having at least three input terminals and one output terminal; means for connecting the three input terminals of said fifth, sixth, seventh and eighth "and" circuits to said sources to apply to said fifth, sixth, seventh, and eighth "and" circuits, respectively, said second, fourth and sixth input signals, said first, third, and sixth input signals, said first, fourth, and fifth input signals, and said second, third, and fifth input signals; and a second "or" circuit having four input terminals and one output terminal, the four input terminals of said second "or" circuit being connected to the output terminals of said fifth, sixth, and eighth "and" circuits, respectively, whereby a second output signal is produced at the output terminal of said second "or" circuit, said second output signal being the complement of said first output signal.

24. An adder circuit comprising first and second sources of input signals, said first source supplying first and second input signals representing in time sequence the digits of a first binary number, said second source supplying third and fourth input signals representing in time sequence the digits of a second binary number to be added to said first binary number, said second and fourth signals being complementary to said first and third signals, respectively; first and second "and" circuits, each having one output terminal and first, second, and third input terminals; third, fourth, fifth, and sixth "and" circuits, each having one output terminal and first and second input terminals; means electrically connecting said first, second, fifth and sixth "and" circuits to said sources to apply to the first and second input terminals of said first, second, fifth, and sixth "and" circuits, respectively, said first and fourth input signals, said second and third input signals, said first and third input signals, and said second and fourth input signals; means electrically connecting the output terminals of said fifth and sixth "and" circuits to the first input terminals of said third and fourth "and" circuits, respectively; seventh and eighth "and" circuits, each having first and second input terminals and one output terminal; a clock pulse generator electrically connected to said seventh and eighth "and" circuits for applying clock pulses to the first input terminals of said seventh and eighth "and" circuits; means supplying the output signals of said fifth and sixth "and" circuits to the second input terminals of said seventh and eighth "and" circuits, respectively; a flip-flop circuit having first and second input terminals and first and second output terminals, the first and second input terminals of said flip-flop circuit being connected to the output terminals of said seventh and eighth "and" circuits, respectively, the first output terminal of said flip-flop circuit being connected to the second input terminals of said third and fourth "and" circuits for supplying thereto a carry signal representative of the carry digit of a binary addition of the digits represented by the input signals and the carry digit supplied in the previous binary time interval, the second output terminal of said flip-flop circuit being connected to the third input terminals of said first and second "and" circuits for supplying thereto a signal complementary to said carry signal; and a first "or" circuit having four input terminals and one output terminal, said four input terminals of said first "or" circuit being connected to the output terminals of said first, second, third, and fourth "and" circuits, respectively, whereby there is produced at the output terminal of said first "or" circuit a first output signal representing in time sequence the digits of the binary sum of said first and second binary numbers.

25. The adder circuit defined in claim 24 which also includes ninth and tenth "and" circuits, each having first, second, and third input terminals and one output terminal; means connecting said ninth and tenth "and" circuits to said sources to apply to the first and second input terminals of said ninth and tenth "and" circuits said first and fourth input signals and said second and third input signals, respectively; means electrically coupling the third input terminals of said ninth and tenth "and" circuits to the first output terminal of said flip-flop circuit; eleventh and twelfth "and" circuits, each having first and second input terminals and one output terminal; means connecting the first input terminals of said eleventh and twelfth "and" circuits to the output terminals of said fifth and sixth "and" circuits, respectively; means connecting the second input terminals of said eleventh and twelfth "and" circuits to the second output terminal of said flip-flop circuit; a second "or" circuit having four input terminals and one output terminal, said four input terminals of said second "or" circuit being connected to the output terminals of said ninth, tenth, eleventh, and twelfth "and" circuits, respectively, whereby a second output signal is produced at the output terminal of said second "or" circuit, said second output signal being the complement of said first output signal.

26. A subtractor circuit comprising first and second sources of input signals, said first source supplying first and second input signals representing in time sequence the digits of a first binary number, said second source supplying third and fourth input signals representing in time sequence the digits of a second binary number to be subtracted from said first binary number, said second and fourth signals being complementary to said first and third signals, respectively; first and second "and" circuits, each having one output terminal and first, second, and third input terminals; third, fourth, fifth and sixth "and" circuits, each having one output terminal and first and second input terminals; means electrically connecting said first, second, fifth and sixth "and" circuits to said sources to apply to the first and second input terminals of said first, second, fifth, and sixth "and" circuits, respectively, said first and third input signals, said second and fourth input signals, said second and third input signals, and said first and fourth input signals; means electrically connecting the output terminals of said fifth and sixth "and" circuits to the first input terminals of said third and fourth "and" circuits, respectively; seventh and eighth "and" circuits, each having first and second input terminals and one output terminal; a clock pulse generator electrically connected to said seventh and eighth "and" circuits for applying clock pulses to the first input terminals of said seventh "and" circuits; means supplying the output signals of said fifth and sixth "and" circuits to the second input terminals of said seventh and eighth "and" circuits, respectively; a flip-flop circuit having first and second input terminals and first and second output terminals, the first and second input terminals of said flip-flop circuit being connected to the output terminals of said seventh and eighth "and" circuits, respectively, the first output terminal of said flip-flop circuit being connected to the third input terminals of said first and second "and" circuits for supplying thereto a carry signal representative of the carry digit of a binary subtraction of the digits represented by the input signals and the carry digit supplied in the previous binary time interval, the second output terminal of said flip-flop circuit being connected to the second input terminals of said third and fourth "and" circuits for supplying thereto a signal complementary to said carry signal; and a first "or" circuit having four input terminals and one output terminal, said four input terminals of said first "or" circuit being connected to the output terminals of said first, second, third, and fourth "and" circuits, respectively, whereby there is produced at the output terminal of said first "or" circuit a first output signal representing in time sequence the digits of the binary difference of said first and second binary numbers.

27. A parallel adder circuit for electronically performing a binary addition of two N-digit binary numbers, said adder circuit comprising first and second sources of input signals, said first source supplying N pairs of complementary signals respectively representing the digits of one binary number, and said second source supplying N pairs of complementary signals respectively representing the digits of the other binary number; a half-adder circuit connected to said sources to receive signals representative of a first pair of corresponding binary digits, said half-adder circuit producing a result digit output signal and primary and complementary carry digit output signals; a series of $N-2$ full-adder circuits connected to said sources to receive signals representative of the second through $(N-1)$th pairs of corresponding binary digits, respectively, each of said $N-2$ full adder circuits producing a result digit output signal and primary and complementary carry digit output signals; means connected between said half-adder circuit and the first full-adder circuit for applying the primary and complementary carry digit output signals of said half-adder circuit to said first full-adder circuit; means connected between successive full-adder circuits for applying the primary and complementary carry digit output signals of each of said $N-2$ full-adder circuits to the next successive full-adder circuit; a final $(N-1)$th full-adder circuit connected to said sources to receive signals representative of the Nth pair of corresponding binary digits, said $(N-1)$th full-adder circuit producing a result digit output signal and a primary carry digit output signal whereby the binary sum of said two numbers is produced, the digits of said sum being simultaneously represented by the result digit signals of said half-adder, said $N-2$ full-adders, and said $(N-1)$th full-adder, and by the carry digit signal of said $(N-1)$th full-adder.

28. A parallel subtracter circuit for electronically performing a binary subtraction of two N-digit binary numbers, said subtracter circuit comprising first and second sources of input signals, said first source supplying N pairs of complementary signals respectively representing the digits of one binary number, and said second source supplying N pairs of complementary signals respectively representing the digits of the other binary number; a half-subtracter circuit connected to said sources to receive signals representative of a first pair of corresponding binary digits, said half-subtracter circuit producing a result digit output signal and primary and complementary carry digit output signals; $N-2$ full-subtracter circuits connected to said sources to receive signals representative of the second through $(N-1)$th pairs of corresponding binary digits, each of said $N-2$ full-subtracter circuits producing a result digit output signal and primary and complementary carry digit output signals; means connected between said half-subtracter circuit and the first full-subtracter circuit for applying the primary and complementary carry digit output signals of said half-subtracter circuit to said first full-subtracter circuit; means connected between successive full-subtracter circuits for applying the primary and complementary carry digit output signals of each of said $N-2$ full-subtracter circuits to the next successive full-subtracter circuit; a final $(N-1)$th full-subtracter circuit connected to said sources to receive signals representative of the Nth pair of corresponding binary digits, said $(N-1)$th full-subtracter circuit producing a result digit output signal and a binary carry digit output signal whereby the binary difference of said two numbers is produced, the digits of said difference being simultaneously represented by the result digit signals of said half-subtracter, said $N-2$ full-subtracters, and said $(N-1)$th full-subtracter, and by the carry digit signal of said $(N-1)$th full-subtracter.

29. A parallel adder-subtracter circuit for electronically performing a mathematical operation of addition or subtraction upon two N-digit binary numbers, said adder-subtracter circuit comprising first and second sources of input signals, said first source supplying N pairs of complementary signals respectively representing the digits of one binary number, and said second source supplying N pairs of complementary signals respectively representing the digits of the other binary number; a half-adder-subtracter circuit connected to said sources to receive signals representative of a first pair of corresponding binary digits, said half-adder-subtracter circuit producing a result digit output signal and primary and complementary carry digit output signals; $N-2$ full-adder-subtracter circuits connected to said sources to receive signals representative of the second through $(N-1)$th pairs of corresponding binary digits, respectively, each of said $N-2$ full-adder-subtracter circuits producing a result digit output signal and primary and complementary carry digit output signals; means connected between said half-adder-subtracter circuit and the first full-adder-subtracter circuit for applying the primary and complementary carry digit output signals of said half-adder-subtracter circuit to said first full-adder-subtracter circuits; means connected between successive full-adder-subtracter circuits to supply the primary and complementary carry digit output signals of each of said $N-2$ full-adder-subtracter circuits to the next successive full-adder-subtracter circuit; a final $(N-1)$th full-adder-subtracter circuit connected to said sources to receive signals representative of the Nth pair of corresponding binary digits, said $(N-1)$th full-adder subtracter circuit producing a result digit output signal and a primary carry digit output signal whereby the binary sum or difference of said two numbers is produced, the digits of said sum or difference being simultaneously represented by the result digit signals of said half-adder-subtracter, said $N-2$ full-adder-subtracters, and said $(N-1)$th full-adder-subtracter, and by the carry digit signal of said $(N-1)$th full-adder-subtracter.

References Cited in the file of this patent

UNITED STATES PATENTS 2,609,143 Stibitz ---------------- Sept. 2, 1952

OTHER REFERENCES

Progress Report #2 on the EDVAC, Moore School of Electrical Engineering, Univ. of Pa., June 30, 1946 (declassified February 13, 1947, by OCM, item 31420), pages 1-1-3 to 1-1-5, 1-1-7 to 1-1-13, Figs. PY-0-105, PY-0-128, PY-0-174, PY-0-176, PY-0-177, PY-0-178, PY-0-213.

Electronic Anti-Aircraft Fire Control Predictor (RCA Research Labs., April 14, 1942), listed Office Publication Board, Comm. Dept., OPB 80702, November 7, 1947, pages 71 to 74, Figs. 3.20 to 3.21.

Hartree: Calculating Instruments and Machines, Univ. of Illinois Press; copyright August 15, 1949, pages 97 to 114.

Engineering Research Associates (ERA), High-Speed Computing Devices, McGraw-Hill Book Co. Inc., N. Y.; copyright 1950.

A Functional Description of the EDVAC-Moore School of Electrical Engineering, Univ. of Pa., November 1, 1949, volume I, pages 4-10 to 4-18, Figs. 104-3LD-2, 104-3LC3; volume II, pages A4.1 to A4.23.

UNITED STATES PATENT OFFICE

Certificate of Correction

Patent No. 2,803,401 — August 20, 1957

Eldred C. Nelson

It is hereby certified that error appears in the printed specification of the above numbered patent requiring correction and that the said Letters Patent should read as corrected below.

Column 5, line 30, for "signal A" read —signal $\overline{A}$—; column 9, line 71, for "A and B" read —$\overline{A}$ and $\overline{B}$—; column 12, line 36, after "gate" strike out "and"; column 15, line 35, for "hense" read —hence—; column 16, lines 41 and 42, the equation should read as shown below instead of as in the patent—

$$\overline{A}.\overline{B}+A.B=F_8 \text{ is } (A+B).(\overline{A}+\overline{B})=A.\overline{A}+A.\overline{B}+B.\overline{A}+B.\overline{B}=A.\overline{B}+B.\overline{A}=F_9$$

line 48, for "correlation has" read —correlation had—; column 17, line 24, for "$A.B$, $A.B$, $A.B$, $A.B$" read —$A.B$, $\overline{A}.B$, $A.\overline{B}$, $\overline{A}.\overline{B}$—; column 21, lines 68 to 73 inclusive, the equation should appear as shown below instead of as in the patent—

$$R=(A+B).(\overline{A}+\overline{B})$$
$$C=A.B.A+A.B.\overline{A}+A.B.B+A.B.\overline{B}+B.B.\overline{B}+A.A.\overline{A}+\overline{A}.\overline{B}.B+\overline{A}.\overline{B}.A$$
$$C=(A+B).(\overline{A}.A+\overline{A}.\overline{B}+A.B+B.\overline{B})$$
$$C=(A+B).(\overline{A}+B).(A+\overline{B})$$

column 24, line 7, for "$R=\overline{A}.B.+A.\overline{B}$" read —$R=\overline{A}.B+A.\overline{B}$—; line 16, for "1002" read —1022—; line 29, for "Ae" read —As—; line 53, for "$H=A.\overline{A}+B.\overline{B}=0$" read —$H=A.\overline{A}.+B.\overline{B}=0$—; column 27, line 13, for "Fig. 14 is" read —Fig. 14 it—; column 28, line 15, for "circuits 9" read —circuit 9—; column 31, lines 19 and 20, should read as shown below instead of as in the patent—

$$(17)\quad C=A.B+R_o.D=A.B+(A.\overline{B}+\overline{A}.B).D=A.B+A.\overline{B}.D+\overline{A}.B.D$$

line 69, for "$R_o$ is also generated" read —$\overline{R}_o$ is also generated—; column 34, line 32, for "product" read —produce—; line 42, for "where F." read —where F,—; line 63, for "unit" read —first—; column 36, line 43, should appear as shown below instead of as in the patent—

$$D.A+D.\overline{B}+D.D).(A.\overline{A}+A.\overline{B}+A.\overline{D}+$$

column 37, line 12, for "$C_+$" read —$C_\pm$—; column 38, line 7, for "2123" read —2132—; line 31, the equation should appear as shown below instead of as in the patent—

$$R=A.\overline{B}.\overline{D}.F_1+\overline{A}.B.\overline{D}.G_1+\overline{A}.\overline{B}.D.H_1+A.B.D.J_1+K_1$$

line 55, extreme right-hand portion, strike out the upside down printed matter; line 56, the equation should appear as shown below instead of as in the patent—

$$\overline{C}_+=\overline{A}\,\overline{B}\,M_2+\overline{A}\,\overline{D}\,N_2+\overline{B}\,\overline{D}\,P_2+Q_2$$

column 45, line 4, for "falls in" read —falls at—; line 24, for "sufficient" read —sufficiently—; columns 45 and 46, Table 15, fifth column thereof, in the heading thereto, for "$\overline{C}_+=\overline{A}.\overline{B}$" read —$\overline{C}_+^*=\overline{A}.\overline{B}$—; column 47, lines 10 and 16, for "$C_+^*$", in each occurrence, read —$\overline{C}_+^*$—; column 49, lines 50 to 52 inclusive, should appear as shown below instead of as in the patent—

$$C^*=a(A.B)+\overline{a}(\overline{A}.B)$$
$$\overline{C}^*=a(\overline{A}.\overline{B})+\overline{a}(A.\overline{B})$$

column 51, line 29, for "signal R" read —signal $\overline{R}$—; column 52, lines 3 and 4, the equations should appear as shown below instead of as in the patent—

$$C^*=a(A.B.F+G)+\overline{a}(\overline{A}.B.H+J)$$
$$\overline{C}^*=a(\overline{A}.\overline{B}.K+L)+\overline{a}(A.\overline{B}.M+N)$$

column 55, line 5, for '" or circuit' read—"or" circuit—; column 56, line 20, for "terminals" read —terminal—; column 64, line 19, for "circuits" read —circuit—.

Signed and sealed this 19th day of November 1957.

[SEAL]

Attest:

KARL H. AXLINE,
*Attesting Officer.*

ROBERT C. WATSON,
*Commissioner of Patents.*